(12) United States Patent
Smith, Jr. et al.

(10) Patent No.: US 12,060,170 B2
(45) Date of Patent: Aug. 13, 2024

(54) FLEXIBLE ENGINE MONITORING

(71) Applicant: General Electric Company, Schenectady, NY (US)

(72) Inventors: Philip Taylor Smith, Jr., Cincinnati, OH (US); Christina Marie Britton, Montgomery, OH (US); Jeffrey Charles Siefke, Cleves, OH (US); Laurence James Stoate, Laverstock (GB); Nana Katherine Noel, Loveland, OH (US)

(73) Assignee: General Electric Company, Cincinnati, OH (US)

( * ) Notice: Subject to any disclaimer, the term of this patent is extended or adjusted under 35 U.S.C. 154(b) by 67 days.

(21) Appl. No.: 17/491,607

(22) Filed: Oct. 1, 2021

(65) Prior Publication Data

US 2022/0106059 A1   Apr. 7, 2022

Related U.S. Application Data

(60) Provisional application No. 63/088,475, filed on Oct. 7, 2020.

(51) Int. Cl.
*B64F 5/60* (2017.01)
*F02C 7/00* (2006.01)

(52) U.S. Cl.
CPC .............. *B64F 5/60* (2017.01); *F02C 7/00* (2013.01); *F05D 2220/323* (2013.01); *F05D 2260/83* (2013.01)

(58) Field of Classification Search
CPC ..................................... B64F 5/60; F02C 7/00
See application file for complete search history.

(56) References Cited

U.S. PATENT DOCUMENTS

| 4,881,184 A | * | 11/1989 | Abegg, III | ................ F02C 9/28 |
| | | | | 702/182 |
| 6,138,081 A | * | 10/2000 | Olejack | ................ G01M 15/00 |
| | | | | 702/182 |

(Continued)

FOREIGN PATENT DOCUMENTS

| CN | 107077141 | 8/2017 |
| CN | 110550229 | 12/2019 |

(Continued)

OTHER PUBLICATIONS

French Application No. FR2109526, Filed Sep. 10, 2021, Title: Flexibilities in a geared gas turbine engine, (Ref. B-024242).

(Continued)

*Primary Examiner* — Topaz L. Elliott
*Assistant Examiner* — Ryan C Clark
(74) *Attorney, Agent, or Firm* — Fitch, Even, Tabin & Flannery LLP

(57) ABSTRACT

Systems, methods, computer-readable medium, vehicles, and engines provided herein include or implement flexible engine monitoring features. In one aspect, a user-modifiable file containing selected parameters is uploaded to a vehicle having a propulsion system, such as an engine. A computing device associated with the engine generates, without modifying reporting software or any other software, a parameter reporting list that includes the selected parameters. During operation, parameter values for the selected parameters are recorded. In another aspect, a data query is transmitted to an aerial vehicle while in-flight. The data query includes a user-modifiable file that contains selected parameters for which parameter values are to be recorded. A computing device associated with the engine generates, without modifying reporting software or any other software, a parameter reporting list that includes the selected parameters. Recorded parameter values for the selected parameters are (Continued)

transmitted in-flight to a remote station. In another aspect, a vehicle receives a data communication that includes a user-modifiable file containing data indicating a target condition and one or more selected parameters for which parameter values are to be recorded when the target condition is met. A computing device associated with an engine of the vehicle generates, without modifying reporting software or any other software, a parameter reporting list that includes the selected parameters. When the condition is met, parameter values for the selected parameters are recorded.

20 Claims, 24 Drawing Sheets

(56) References Cited

U.S. PATENT DOCUMENTS

| | | | |
|---|---|---|---|
| 8,712,634 | B2 | 4/2014 | Followell et al. |
| 8,798,817 | B2 | 8/2014 | O'Dell et al. |
| 8,942,882 | B2 | 1/2015 | Swearingen et al. |
| 9,576,404 | B2 | 2/2017 | Ziarno et al. |
| 9,963,244 | B2 | 5/2018 | Tucker |
| 10,023,324 | B2 | 7/2018 | Jayathirtha et al. |
| 10,075,228 | B2 | 9/2018 | Klippert et al. |
| 10,124,752 | B2 | 11/2018 | Boggio |
| 10,760,485 | B2 * | 9/2020 | Jacobs ............. G05B 19/41855 |
| 10,796,018 | B2 * | 10/2020 | Perez Zarate ......... G06F 21/606 |
| 2010/0143090 | A1 * | 6/2010 | Smith ....................... F02C 7/12 415/1 |
| 2011/0196593 | A1 * | 8/2011 | Jiang .................. G05B 23/0283 701/100 |
| 2012/0166249 | A1 * | 6/2012 | Jackson ............. G06Q 10/0635 705/7.28 |
| 2013/0197725 | A1 | 8/2013 | O'Dell |
| 2017/0259942 | A1 | 9/2017 | Ziarno |
| 2018/0130269 | A1 | 5/2018 | Scheid |
| 2018/0155060 | A1 * | 6/2018 | Dauenhauer ............ G07C 5/085 |
| 2018/0155061 | A1 * | 6/2018 | Bewlay .................. B64D 27/10 |
| 2018/0273211 | A1 | 9/2018 | Chang et al. |
| 2018/0297718 | A1 * | 10/2018 | Adibhatla .............. G07C 5/006 |
| 2018/0308297 | A1 | 10/2018 | Ciaburri et al. |
| 2019/0367190 | A1 * | 12/2019 | Bewlay ..................... B64F 5/60 |

FOREIGN PATENT DOCUMENTS

| | | | |
|---|---|---|---|
| CN | 111077872 | | 4/2020 |
| DE | 102015009678 A1 * | 1/2016 | ............. G01M 7/00 |
| FR | 3129375 | | 5/2023 |
| FR | 3129428 | | 5/2023 |
| FR | 3129432 | | 5/2023 |
| FR | 3129436 | | 5/2023 |
| FR | 3129690 | | 6/2023 |
| FR | 3129970 | | 6/2023 |
| FR | 3129972 | | 6/2023 |
| FR | 3130313 | | 6/2023 |
| FR | 3130323 | | 6/2023 |
| FR | 3130747 | | 6/2023 |
| FR | 3130874 | | 6/2023 |
| FR | 3130875 | | 6/2023 |
| FR | 3130877 | | 6/2023 |
| FR | 3130879 | | 6/2023 |
| FR | 3130894 | | 6/2023 |
| FR | 3130895 | | 6/2023 |
| FR | 3130896 | | 6/2023 |
| FR | 3130897 | | 6/2023 |
| FR | 3132279 | | 8/2023 |
| FR | 3132729 | | 8/2023 |
| FR | 3132743 | | 8/2023 |
| FR | 3133367 | | 9/2023 |
| FR | 3133368 | | 9/2023 |
| JP | 2016114986 A * | 6/2016 | |

OTHER PUBLICATIONS

French Application No. FR2109530, Filed Sep. 10, 2021, Title: Flexibilities in a geared gas turbine engine, (Ref. B-024243).

French Application No. FR2109787, Filed Sep. 17, 2021, Title: Aircraft Turbine Engine With an Off-Axis Propeller, (Ref. B-024794).

* cited by examiner

FLEXIBLE ENGINE MONITORING

FIELD

The subject matter of the present disclosure relates generally to monitoring and communicating engine data, and more particularly, to monitoring and communicating engine data for aircraft engines.

BACKGROUND

An aircraft can include one or more engines for propulsion. Each engine can have one or more associated Electronic Engine Controllers (EECs). The EECs can function as the control unit(s) of a Full Authority Digital Engine Control (FADEC) system. Particularly, EECs can control their respective engines during operation and can record Continuous Engine Operating Data (CEOD) related to their associated engine and the aircraft. Recorded CEOD files can contain a detailed record of the engine conditions during operation. Specifically, the CEOD file can contain recorded values or settings for various parameters, such as fuel flow rate, ambient temperature, and pressures and temperatures at various stations of the engine.

Conventionally, over 10,000 parameters have existed in FADEC systems. However, typically only 300-400 parameters are included in the CEOD file, e.g., due to cost, among other reasons. In some instances, it may be desirable to record other parameters besides the 300-400 baseline parameters. For instance, a field event may occur in which the engine performs in an unexpected way. In such an instance, to further investigate the cause of the unexpected behavior, it may be desirable to record parameters other than the baseline parameters so that an attempt can be made to determine the root cause of the unexpected behavior. Moreover, it also may be desirable to change when or how frequently existing baseline parameters or a subset thereof are captured. For instance, it may be desirable to change the data capture rate of some or all of the baseline parameters when a predetermined condition is met. In the past, the FADEC parameters have been fixed within the software code of the FADEC system. Accordingly, updating CEOD parameter lists has proven challenging, costly, and time consuming, e.g., due to a lengthy certification process of the software code. Indeed, even the most streamlined software release processes to implement minor changes in FADEC parameters have conventionally taken over one month to complete.

Accordingly, improved methods, systems, and engines that address one or more of the challenges noted above would be useful.

BRIEF DESCRIPTION

Aspects and advantages of embodiments of the present disclosure will be set forth in part in the following description, or may be learned from the description, or may be learned through practice of the embodiments.

In one aspect, a vehicle is provided. The vehicle includes a propulsion system, one or more sensors, and a computing system having one or more memory devices and one or more processors. The one or more processors are configured to receive a user-modifiable file containing data indicating one or more selected parameters to record. The one or more processors are further configured to generate, by executing reporting software on at least one of the one or more processors, a parameter reporting list containing the one or more selected parameters without modifying the reporting software. Moreover, the one or more processors are configured to receive sensor data from the one or more sensors. In addition, the one or more processors are configured to record parameter values for the one or more selected parameters in the generated parameter reporting list based at least in part on the received sensor data.

In another aspect, an aerial vehicle is provided. The aerial vehicle includes an engine, one or more sensors, and a computing system having one or more memory devices and one or more processors communicatively coupled with the one or more memory devices. The one or more processors are configured to: receive a data query transmitted to the aerial vehicle while the aerial vehicle is performing a mission, the data query including a user-modifiable file containing data that indicates one or more selected parameters for which parameter values are to be recorded during the mission; generate, by executing reporting software, a parameter reporting list containing the one or more selected parameters without modifying the reporting software; receive, from the one or more sensors, sensor data; and record, while the aerial vehicle is performing the mission, the parameter values for the one or more selected parameters in the generated parameter reporting list based at least in part on the received data.

In yet another aspect, a vehicle is provided. The vehicle includes a propulsion system, one or more sensors, and a computing system having one or more memory devices and one or more processors communicatively coupled with the one or more memory devices. The one or more processors are configured to: receive a data communication that includes a user-modifiable file containing data indicating a target condition and one or more selected parameters for which parameter values are to be recorded when the target condition is met; generate, by executing reporting software on at least one of the one or more processors, a parameter reporting list containing the one or more selected parameters without modifying the reporting software; receive sensor data from the one or more sensors; determine whether the target condition is met based at least in part on the received sensor data; record, upon determining that the target condition is met, the parameter values for the one or more selected parameters in the generated parameter reporting list based at least in part on the received sensor data.

Other example aspects of the present disclosure are directed to systems, methods, aircrafts, engines, controllers, devices, non-transitory computer-readable media for recording and communicating engine data. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
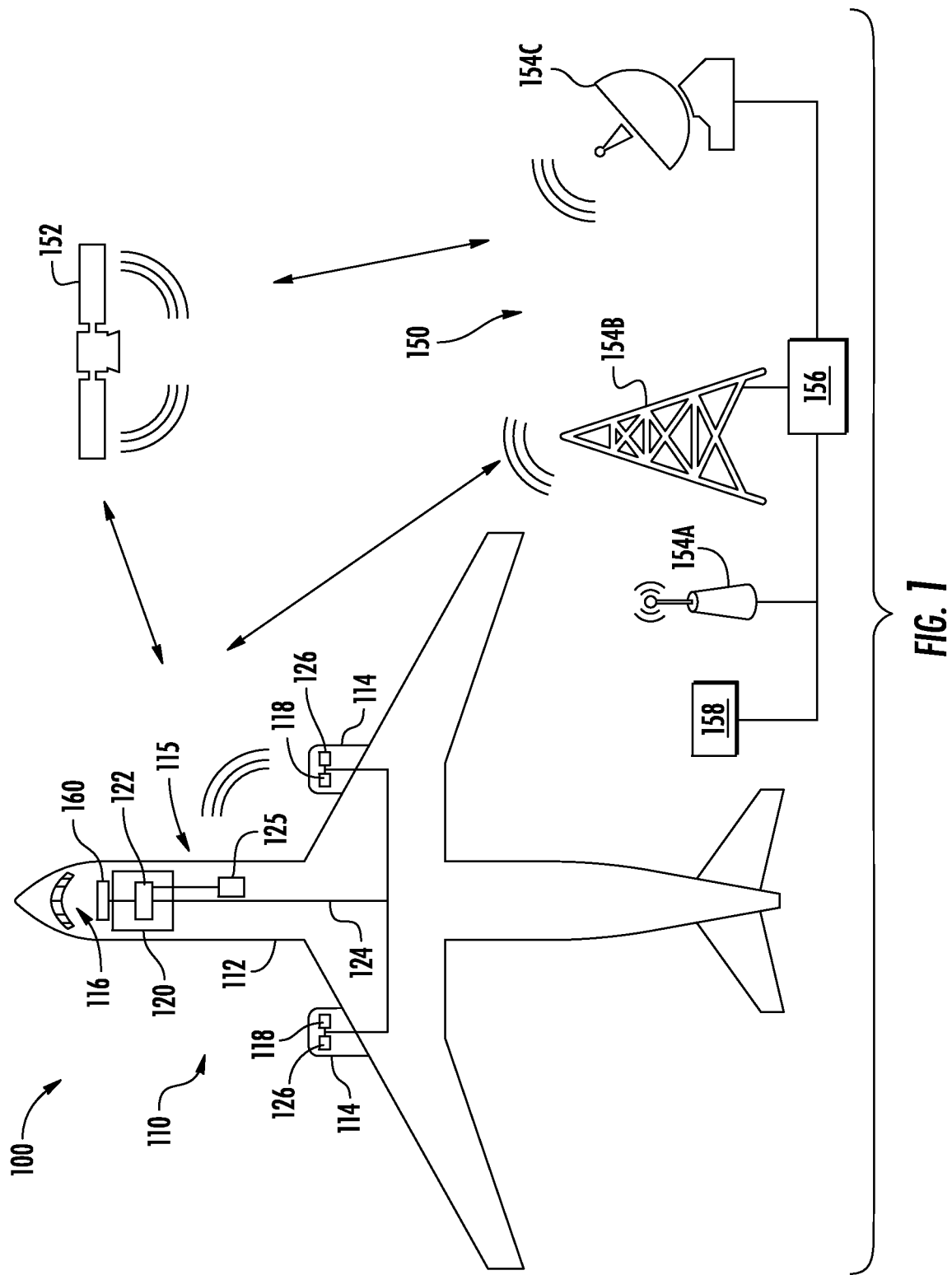
FIG. 1 provides a schematic view of a data acquisition system according to example embodiments of the present disclosure.

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made in the present disclosure without departing from the scope of the present subject matter. For instance, features illustrated or described as part of one embodiment can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to systems, methods, aircrafts, engines, controllers, computing devices, non-transitory computer-readable media for flexible monitoring of engine(s), such as aircraft gas turbine engines. Such flexible engine monitoring systems, methods, aircrafts, engines, controllers, computing devices, and non-transitory computer-readable media provide a flexible approach to selecting parameters, recording parameter values for the selected parameters, and communicating the recorded parameter values, e.g., to a remote station. The flexible engine monitoring aspects described herein provide improvements in selecting parameters, recording parameter values for the selected parameters, and communicating the recorded parameter values over conventional techniques in the art.

In one aspect, a number of selected parameters can be added to a parameter reporting list stored in a computing device associated with an engine of a vehicle so that parameter values for the selected parameters can be recorded during engine operation. A user-modifiable file is uploaded to the aircraft and the selected parameters are added to the parameter reporting list. The user-modifiable file can be modified by a suitable entity, such as, without limitation, vehicle or aircraft operators, leasing entities, airframers, or propulsion system or engine manufacturers. In some embodiments, a parameter reporting list is created using the selected parameters. Values for the selected parameters can be recorded on the next engine power cycle, the next computing device power up, or immediately after the user-modifiable file is uploaded. The data sampling rate for the selected parameters may also be customized, among other parameter settings associated with the selected parameters. One engine or a whole fleet can be targeted. Notably, neither reporting software nor any other engine software is modified in adding the selected parameters to the parameter reporting list. In this way, lengthy certification processes are not needed despite the addition of the new parameters to the parameter reporting list.

In another aspect, an entity (e.g., an airline operator or engine monitoring center) can transmit an in-flight parameter data query to an aircraft. The data query can contain a user-modifiable file that includes a list of one or more defined or selected parameters for which parameter values are to be recorded by a computing device associated with the engine during engine operation, e.g., during the same flight in which the data query is received at the aircraft. The user-modifiable file can also include various parameter settings associated with the selected parameters, such as the time period of interest or recording window in which parameter values for the selected parameters are to be recorded and data sampling rates or a frequency at which parameter values are to be recorded. The user-modifiable file can be modified by a suitable entity, such as, without limitation, vehicle or aircraft operators, leasing entities, airframers, or propulsion system or engine manufacturers. Reporting software executable by a computing device associated with the engine, such as an engine controller, can access the user-modifiable file and can generate a parameter reporting list using the selected parameters and their associated parameter settings. The parameter reporting list can also include baseline parameters, which are parameters for which values are typically recorded during normal engine operation. Some baseline and/or selected parameters (e.g., altitude, GPS coordinates) may help orient the user to flight and environmental conditions.

Notably, neither the reporting software nor any other engine software is modified in adding the selected parameters to the parameter reporting list. In this way, lengthy certification processes are not needed despite the addition of the new parameters to the parameter reporting list, among other benefits. Parameter values for the parameters of the generated parameter reporting list can be recorded within their respective recording windows and at their specified data sampling rates. The recorded values can be compiled into a query response file. The query response file can be transmitted to a remote station for analysis. The remote station can be an engine monitoring station, for example. The remote station can analyze the recorded parameter values associated with the selected parameters and can send additional data queries to the aircraft to further monitor the engines and/or request that other parameters be monitored. Accordingly, in-flight parameter data queries to aircraft or other vehicles allows for real time or near real parameter queries.

In some embodiments, a computing device associated with an engine is configured to record parameter values for all possible parameters or at least more parameters than the baseline parameters. In such embodiments, an entity can transmit an in-flight parameter data query to an aircraft. The data query can contain a user-modifiable file that includes a list of one or more selected parameters for which recorded parameter values are to be compiled into a query response file based at least in part on a preselected past time window. The past time window can indicate the time period in which recorded parameter values for the selected parameters are to be compiled into the query response file. The past time window is a period of time that has already occurred. Accordingly, the parameter data query transmitted to the vehicle can be a "look back" request. This may allow an entity that has discovered unexpected engine behavior to "look back" at parameter values for selected parameters that were recorded during the past time window, which can be selected as the time period corresponding to the unexpected engine behavior, to better understand the conditions of the engine during the unexpected behavior.

Reporting software executable by a computing device associated with the engine, such as an engine controller, can access the user-modifiable file and can generate a parameter reporting list using the selected parameters. The parameter reporting list can also include baseline parameters, which are parameters for which values are typically recorded during normal engine operation. Notably, neither the reporting software nor any other engine software is modified in adding the selected parameters to the parameter reporting list. In this way, lengthy certification processes are not needed despite the addition of the new parameters to the parameter reporting list, among other benefits. Parameter values for the parameters of the generated parameter reporting list that were recorded during the past time period can be compiled into a query response file. The query response file can be transmitted to a remote station for analysis. The remote station can be an engine monitoring station, for example. The remote station can analyze the recorded parameter values associated with the selected parameters and can send additional data queries to the aircraft to further monitor the engines and/or request that other parameters values recorded during other past time periods be compiled.

In a further aspect, a computing device associated with an engine can self-select parameter values that are to be recorded during engine operation based on one or more target conditions. That is, when specific target conditions are met, parameter values associated with the self-selected parameters can be recorded. A data communication containing a user-modifiable file can be transmitted to a vehicle. The user-modifiable file includes target condition(s) and selected parameters for which parameter values are to be recorded by the computing device associated with the engine when the target condition(s) are met (i.e., when the target condition(s) are true). The target condition(s) can be defined as any target condition or set of target conditions. For instance, the target condition(s) can be triggered or met when the aircraft is traveling in specific geographic regions, when the aircraft is experiencing unusually high FADEC temperatures, and/or when the aircraft has a marginally performing sensor or actuator, among other possible target conditions. The user-modifiable file can also include various parameter settings associated with the selected parameters, such as the data sampling rate at which parameter values for the selected parameters are to be recorded when the target condition(s) are met. The user-modifiable file can be modified by a suitable entity, such as, without limitation, vehicle or aircraft operators, leasing entities, airframers, or propulsion system or engine manufacturers. Reporting software executable by the computing device associated with the engine can access the user-modifiable file and can generate a parameter reporting list using the selected parameters and their associated parameter settings. The parameter reporting list can also include baseline parameters, which are parameters for which values are typically recorded during normal engine operation. Notably, neither the reporting software nor any other engine software is modified in generating the parameter reporting list. In this way, lengthy certification processes are not needed, among other benefits.

During operation, the computing device associated with the engine can monitor the operating and environmental conditions of the engine and/or the vehicle to which the engine is mounted based on received data (e.g., engine sensor data, vehicle data, environmental data, etc.). The computing device associated with the engine can determine whether the target condition(s) are met based on the received data. When the target condition(s) are met, parameter values for the parameters of the generated parameter reporting list can be recorded at their specified data sampling rates. The recorded values can be compiled into a recorded data file. The recorded data file can be transmitted to a remote station for analysis. The remote station can be an engine monitoring station, for example. The remote station can analyze the recorded parameter values associated with the selected parameters and can send further data communications to the aircraft to further monitor the engines and/or request that other parameters be monitored when specific target condition(s) are met. Data communications can be pushed to a number of engines in a fleet. By allowing a computing device associated with an engine to self-select which parameter values are to be recorded based on set target condition(s), parameter values can be intelligently and efficiently recorded by only those engines in the fleet meeting the target condition(s). This provides a significantly faster way to record specific parameters when target condition(s) are met across a fleet of engines and avoids the expense of satellite or other costly extra data for engines not experiencing the identified target condition(s), among other benefits.

FIG. 1 provides a schematic view of an example data acquisition system 100 according to example embodiments of the present disclosure. As shown, the system 100 includes a vehicle, which in this embodiment is an aerial vehicle or aircraft 110. Although the aircraft 110 is depicted as a fixed-wing aircraft, in other example embodiments, the aircraft 110 can be a rotary-wing aircraft, a smaller fixed-wing aircraft, a land-air hybrid aircraft, an unmanned aerial vehicle, or some other type of aircraft. Moreover, the subject matter of the present disclosure may apply to other types of vehicles, including but not limited to land-based vehicles, amphibious vehicles, watercrafts or vehicles, spacecraft, some combination thereof, etc.

As shown in FIG. 1, the aircraft 110 includes a fuselage 112, a propulsion system that includes one or more engine(s) 114, and a cockpit 116. The cockpit 116 can include a flight deck having various instruments and flight displays. The engines 114 provide propulsion and/or on-board power generation for the aircraft 110. The engines 114 can be gas turbine engines. Example gas turbine engines include jet turbine engines, turboprop engines, turbofan engines, unducted turbofan engines, turboshaft engines, or any other suitable engine, including piston or reciprocating engines. Moreover, the subject matter of the present disclosure may apply to other types of engines, including but not limited to rocket engines, reciprocating engines, regenerative heat engines, etc. Moreover, the subject matter of the present disclosure may apply to other types of vehicle propulsion systems, such as electric propulsion systems that include one or more electric machines and one or more propulsors (e.g., propellers) for producing thrust and hybrid electric propulsion systems that utilize one or more engines, one or more electric machines, and in some embodiments, one or more propulsors for producing thrust.

The aircraft 110 includes a computing system 115 having one or more memory devices and one or more processors. The one or more memory devices and one or more processors can be embodied in one or more computing devices 118 associated with the propulsion system. For instance, as shown in FIG. 1, the aircraft 110 includes at least one computing device 118 associated with each engine 114. In some embodiments, multiple computing devices can be associated with each engine 114. In other embodiments, a single computing device can be associated with the engines 114. One or more of the computing devices 118 can include reporting logic embodied in reporting software. In this manner, as will be described herein, the one or more computing devices 118 can receive sensor data and record parameter values for selected parameters based on the received sensor data.

One or more of the computing devices 118 can be part of a Full Authority Digital Engine Control (FADEC) system. The FADEC system can dynamically control operation of the engines 114 and requires minimal, if any, supervision from the pilot(s). The computing devices 118 can include FADEC control logic as well as the FADEC reporting logic noted above. In some embodiments, the computing devices 118 can include Electronic Engine Controllers (EECs) mounted to their respective engines 118. Further, in some embodiments, the one or more computing devices 118 associated with the engines 114 can include non-EEC control boxes, such as Engine Monitoring Units (EMU) or an aircraft mounted box. In other embodiments, the computing devices 118 associated with the engines 114 or the vehicle propulsion system can include a distributed control system having a central controller and a plurality of distributed controllers communicatively coupled with the central controller.

The aircraft 110 includes an avionics bay 120 that houses one or more avionics systems. Examples of avionics systems include communication systems, navigation systems, weather systems, radar systems, air traffic systems, ground proximity warning systems, etc. In some embodiments, the avionics system can include or be in communication with a location system. The location system can include a Global Positioning System (GPS), inertial reference systems, and the like. For this embodiment, a vehicle interface unit 122 of the aircraft 110 is positioned in the avionics bay 120. The vehicle interface unit 122, which in this embodiment is an engine interface unit, interfaces the computing devices 118 with various vehicle systems 160, or aircraft systems in this embodiment. Example vehicle systems 160 include, without limitation, flight management systems, display systems, flight control systems, digital control systems, throttle systems, inertial reference systems, flight instrument systems, auxiliary power systems, fuel monitoring systems, engine vibration monitoring systems, communications systems, flap control systems, a landing system, navigation systems, fuel control systems, as well as other systems. The avionics systems can each include one or more computing devices.

The computing devices 118 and the vehicle interface unit 122 are communicatively coupled or connected via a data communication link 124. The data communication link 124 can be any suitable type of data link, including without limitation, a serial databus, Ethernet link, a wireless communication link, etc. Various parameters recorded by the computing devices 118 can be transmitted over the data communication link 124 from the computing devices 118 to the vehicle interface unit 122, e.g., so that such information can be utilized by the vehicle systems 160 of the aircraft 110. For example, the parameters can include fan speed, core speed, thrust level inputs, engine response to thrust level inputs, vibration, flameout, fuel consumption, ignition state, anti-ice capability, fuel filter state, fuel valve state, oil filter state, as well as other parameters.

The aircraft 110 can include one or more communication units for communicating with remote stations (e.g., other vehicles, entities, devices, a naval station, another air station, a space station, etc.) external to the aircraft 110. For this embodiment, the aircraft 110 includes a communication unit 125 mounted to or within the fuselage 112. In some embodiments, the communication unit 125 can be mounted within the avionics bay 120. The communication unit 125 can be directly communicatively coupled with the vehicle interface unit 122 as shown in FIG. 1, for example. Generally, the communication unit 125 can communicate data to remote stations using one or more wired and/or wireless communication links. As one example, the communication unit 125 can provide the aircraft 110 with an Aircraft Communication Addressing and Reporting System (ACARS) for transmitting and receiving ACARS transmissions. As another example, the one or more computing devices 118 can record data related to the one or more engines 114 (or more generally the propulsion system) and/or aircraft 110 and can communicate (e.g., transmit, send, push, etc.) the data to the communication unit 125 via data communication link 124. The communication unit 125 can then communicate the data to a remote station, e.g., via an antenna of the communication unit 125. The communication unit 125 can include one or more computing devices each having one or more processing devices and one or more memory devices communicatively coupled with the transmission devices thereof.

In some embodiments, additionally or alternatively, one or more communication units can be mounted to the engines 114. As depicted in FIG. 1, a wireless communication unit (WCU) 126 can be mounted to each engine 114. The WCUs 126 can be communicatively coupled with their respective or associated computing devices 118, e.g., via a suitable wired or wireless connection. The one or more computing devices 118 can record data related to the one or more engines 114 (or more generally the propulsion system) and/or aircraft 110 and can communicate (e.g., transmit, send, push, etc.) the data to the one or more WCUs 126. The one or more WCUs 126 can communicate the data to a remote station, via, for instance, an antenna positioned and configured within a nacelle 50 (FIG. 2) enclosing at least a portion of the engine 114. The one or more WCUs 126 can be located within the nacelle 50 (FIG. 2) or another location on the aerial vehicle 100. Moreover, the antenna used for transmitting and receiving communications can be positioned in other locations. For instance, the antenna can be mounted to the fuselage 112 of the aircraft 110. The WCUs 126 can include one or more computing devices each having one or more processing devices and one or more memory devices communicatively coupled with the transmission devices thereof.

Generally, the computing devices 118 can record sensed, calculated, and/or predicted values for various parameters associated with the engines 114 (or more generally the propulsion system) and/or aircraft 110 during operation. That is, the computing devices 118 can record data associated with the propulsion system and/or the aircraft 110 to which the engines 114 are mounted. In embodiments where the propulsion system for the aircraft 110 is a hybrid-electric or electric propulsion system, parameter values associated with the electrical machines and/or other electrical devices and components can be recorded as well. For instance, one or more parameter values associated with an electric machine operatively coupled with an engine can be recorded, such as voltage, current, etc. associated with the electric machine. Further, parameter values associated with the propulsion system of the aircraft 110 can be captured prior to engine start up and/or after engine shutdown in addition to during engine operation. This allows data to be captured relating to engine start up and engine shutdown, respectively. The recorded data can be routed to the communication 125 and/or the WCUs 126 mounted to the engines 114. The recorded data can be routed over the data communication link 124, for example.

As noted above, the communication units 125, 126 can communicate (e.g., transmit, send, push, etc.) the data to a remote station. For this embodiment, the remote station is ground station 150. In other embodiments, however, the remote station can be any suitable station positioned remote from the aircraft 110. The communication units 125, 126 can communicate the data to a remote station automatically or upon a manual request. The communication units 125, 126 can communicate the data wirelessly and/or via a suitable wired connection.

Wireless communication of the data can be performed using any suitable wireless technique and/or protocol. For example, the communication units 125, 126 can communicate wirelessly using peer-to-peer communications, network communications, UHF, VHF, cellular-based communications, satellite-based communications, etc. For instance, as shown in FIG. 1, the communication units 125, 126 can communicate with the ground station 150 via a VHF technique and/or UHF technique via satellite communication (SATCOM) utilizing one or more satellites 152. As further examples, wireless communications can be sent/received using Wi-Fi, cellular, etc., particularly when the aircraft 110 is on or near the ground. Any or all of such networks can be used to transmit data from the aircraft 110 to the ground station 150 and vice versa. In some instances, the communication unit 125 and/or WCUs 126 can communicate with remote stations using wired communication links as noted above. A wired communication link can be coupled with one or more of the communication units 125, 126 or directly with one or more of the computing device(s) 118, for example. In yet other embodiments, the data recorded during flight can be stored on one or more removable memory devices of the communication units 125, 126 and/or ECCs 118. To access the recorded data, the memory devices can be removed from the aircraft 110 post-flight and downloaded or otherwise accessed by a remote computing device.

The ground station 150 can include one or more transceivers. For instance, the one or more ground transceivers can include a satellite dish 154C, a cellular tower 154B, and/or a wireless access point (WAP) 154A as shown in FIG. 1. The ground station 150 can also include one or more remote computing devices 156 communicatively coupled with the one or more transceivers 154A, 154B, and/or 154C. The ground transceivers 154A, 154B, and/or 154C are operable to receive data wireless communications transmitted by the aircraft 110. The data communications can be routed to the ground computing device(s) 156. The ground computing device(s) 156 are operable to receive the data communications. The ground computing device(s) 156 can then perform various operations, such as data analytics, schedule maintenance and/or repair of engine and/or aircraft components, etc. As further shown in FIG. 1, the ground station 150 can include a wired access point 158. The wired access point 158 provides one or more wired communication links to which a communication unit of the aircraft 110 (e.g., communication unit 125 and/or WCUs 126) can connect such that data can be transmitted between the communication units 125, 126 of the aircraft 110 and ground computing device(s) 156. For example, the wired access point 158 can be used to provide a wired download of recorded data post-flight.

Figure 2:
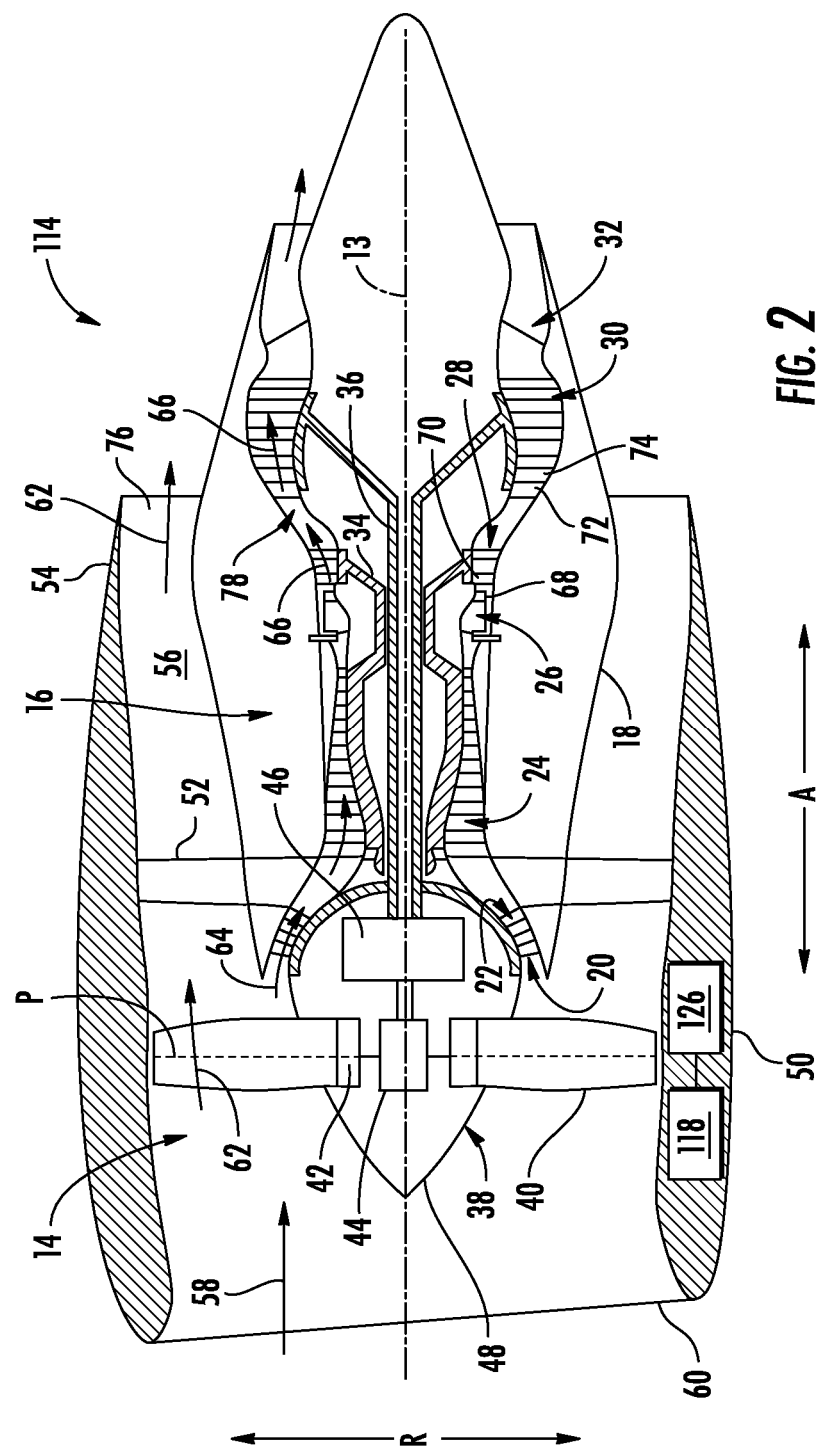
FIG. 2 provides a schematic cross-sectional view of a gas turbine engine of an aircraft of the data acquisition system of FIG. 1.

FIG. 2 provides a schematic cross-sectional view of one of the engines 114 of the aircraft 110 of FIG. 1 according to example embodiments of the present disclosure. For the depicted embodiment of FIG. 2, the engine 114 is configured as a gas turbine engine, or specifically as a high-bypass turbofan jet engine 114, referred to herein as "turbofan engine 114." The turbofan engine 114 defines an axial direction A (extending parallel to an axial or longitudinal centerline 13 provided for reference), a radial direction R, and a circumferential direction (not shown) extending about or around the longitudinal centerline 13.

The turbofan 114 includes a fan section 14 and a core turbine engine 16 disposed downstream from the fan section 14. The depicted core turbine engine 16 includes a substantially tubular outer casing 18 that defines an annular inlet 20. The outer casing 18 encases and the core turbine engine 16 includes, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Accordingly, the LP shaft 36 and HP shaft 34 are each rotary components, rotating about the axial direction A during operation of the turbofan engine 114.

Referring still to the embodiment of FIG. 2, the fan section 14 includes a fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40 in unison. The fan blades 40, disk 42, and pitch change mechanism 44 are together rotatable about the longitudinal axis 13 by LP shaft 36 across a power gear box 46. The power gear box 46 includes a plurality of gears for adjusting the rotational speed of the fan 38 relative to the LP shaft 36 to a more efficient rotational fan speed. More particularly, the fan section includes a fan shaft rotatable by the LP shaft 36 across the power gearbox 46. Accordingly, the fan shaft may also be considered a rotary component, and is similarly supported by one or more bearings.

Referring still to the exemplary embodiment of FIG. 2, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween. The computing device 118 and communicatively coupled WCU 126 are shown mounted to the nacelle 50.

During operation of the turbofan engine 114, a volume of air 58 enters the turbofan through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 114 depicted in FIG. 2 is provided by way of example only, and that in other exemplary embodiments, the turbofan engine 114 may have any other suitable configuration. It should also be appreciated, that in still other exemplary embodiments, aspects of the present disclosure may be incorporated into any other suitable gas turbine engine or other propulsion engine. For example, in other exemplary embodiments, aspects of the present disclosure may be incorporated into, e.g., a turboprop engine, a turboshaft engine, an unducted turbofan engine, or a turbojet engine. Further, in still other embodiments, aspects of the present disclosure may be incorporated into any other suitable turbomachine, including, without limitation, a steam turbine, a turboshaft, a centrifugal compressor, and/or a turbocharger.

Figure 3:
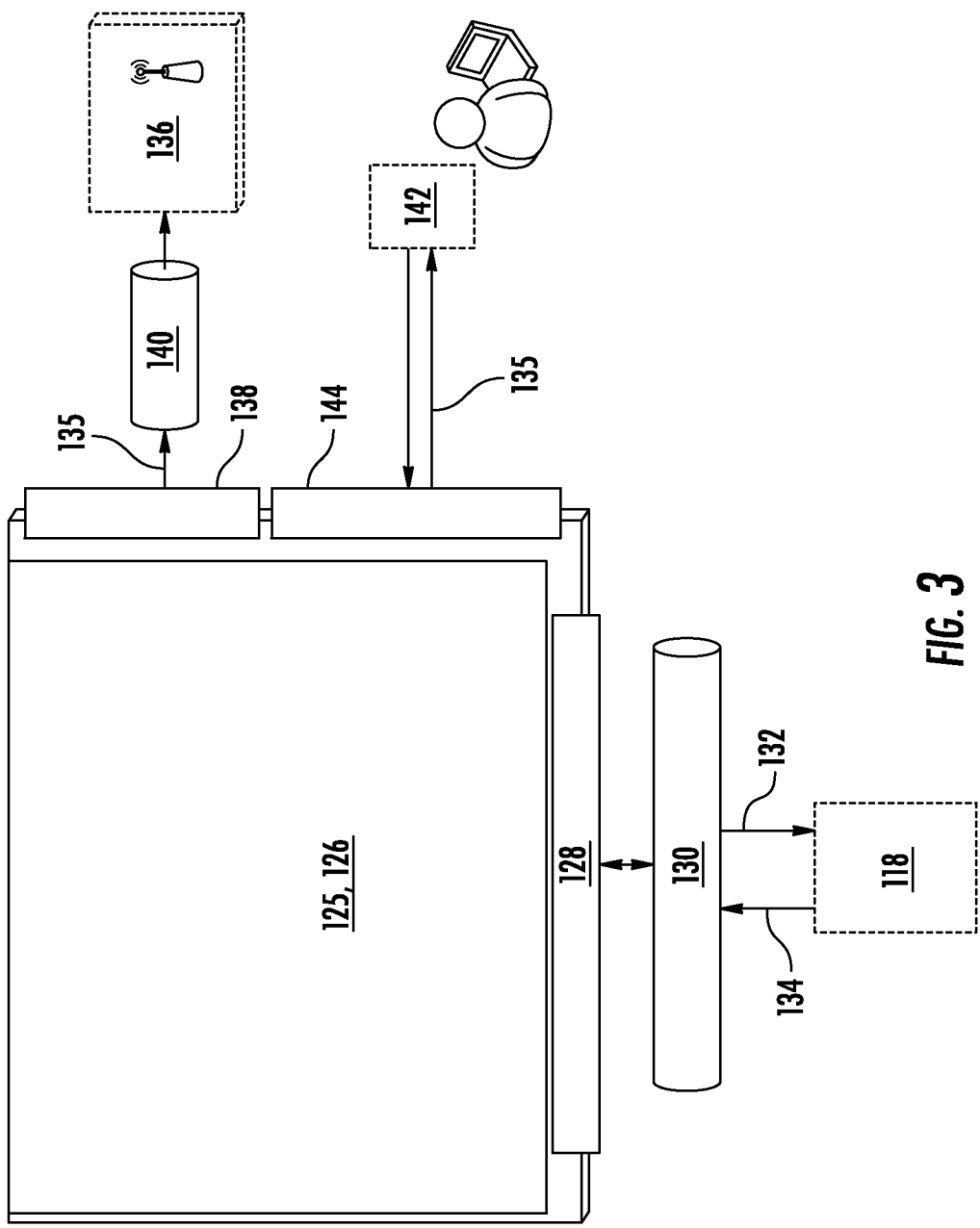
FIG. 3 provides a schematic view of a communication unit of the aircraft of FIG. 1.

FIG. 3 provides a schematic view of one of the communication units 125, 126 of the aircraft 110 of FIG. 1 or the engine 114 of FIG. 2 according to example embodiments of the present disclosure. As shown, the communication units 125, 126 can be in communication with one or more computing devices 118 over a suitable interface 128. In some embodiments, the interface 128 can be, for example, a Telecommunications Industry Association (TIA) TIA-485 interface 128 or an ARINC 664 interface.

In some embodiments, the communication unit 125, 126 and the computing device 118 can communicate via a connection 130 with, for instance, the interface 128. The connection 130 can accommodate other interfaces, such as an Ethernet connection, a wireless connection, or other interface. The connection 130 can be a wired connection, such as an Ethernet connection. The connection 130 can be a wireless connection, such as a Bluetooth® connection. The communication unit 125, 126 can transmit addressing (e.g., memory location, bit size, etc.) information and/or acknowledgements 132 to the computing device 118 via the connection 130. The communication unit 125, 126 can receive data 134 from the computing device 118 via the connection 130 and can store the data in one or more memory devices or memory locations. The data 134 can include recorded values or settings for various parameters, such as thrust level inputs, engine response to thrust level inputs, vibration, flameout, fuel consumption, ignition state, N1 rotation, N2 rotation, N3 rotation, rotor speeds, anti-ice capability, temperatures, pressures, vibration, actuator positions, fuel filter state, fuel valve state, oil filter state, etc.

The communication unit 125, 126 can be configured to communicate data 135, which may include all or some portions of data 134, over a wireless network via an antenna 136 upon a predetermined time or the occurrence of one or more trigger conditions, such as trigger conditions based on signals indicative of an aircraft being on the ground or near the ground. In some embodiments, data 135 is an encrypted version of data 134 or a subset thereof. Further, in some embodiments, the antenna 136 can be integrated into the communication unit 125, 126. The communication unit 125, 126 can include a radio frequency (RF) interface 138. The antenna 136 can be in communication with the RF interface 138 via an RF cable 140. In some embodiments, the antenna 136 can be placed in the nacelle of an aircraft. The nacelle of an aerial vehicle can be made of conductive materials, which can obstruct reception and transmission. In some embodiments, the antenna 136 can be a directional antenna that is oriented near one or more gaps in the nacelle to permit the antenna 136 to communicate directionally outside of the nacelle when the aerial vehicle is landing or upon the occurrence of other trigger conditions.

In some embodiments, the communication unit 125, 126 can include an interface for communicating with a portable device 142. The portal device 142 can be implemented, for instance, on a laptop, tablet, mobile device, or other suitable computing device. The interface can be, for instance, a Generic Stream Encapsulation (GSE) interface 144 or another suitable interface. The portable device 142 can be used by a maintenance person to calibrate, troubleshoot, initialize, test, etc. the communication unit 125, 126.

The communication unit 125, 126 can communicate using wireless communication. The wireless communication can be performed using any suitable wireless technique and/or protocol. For example, the wireless communication can be performed using peer-to-peer communications, network communications, cellular-based communications, satellite-based communications, etc. As another example, the wireless communications can be performed using Wi-Fi, Bluetooth®, ZigBee, etc. The communication unit 125, 126 can also be configured to communicate using wired communication and/or utilize removable memory devices for transmission or exchange of the recorded data.

Updating a Parameter List with Selected Parameters

Figure 4:
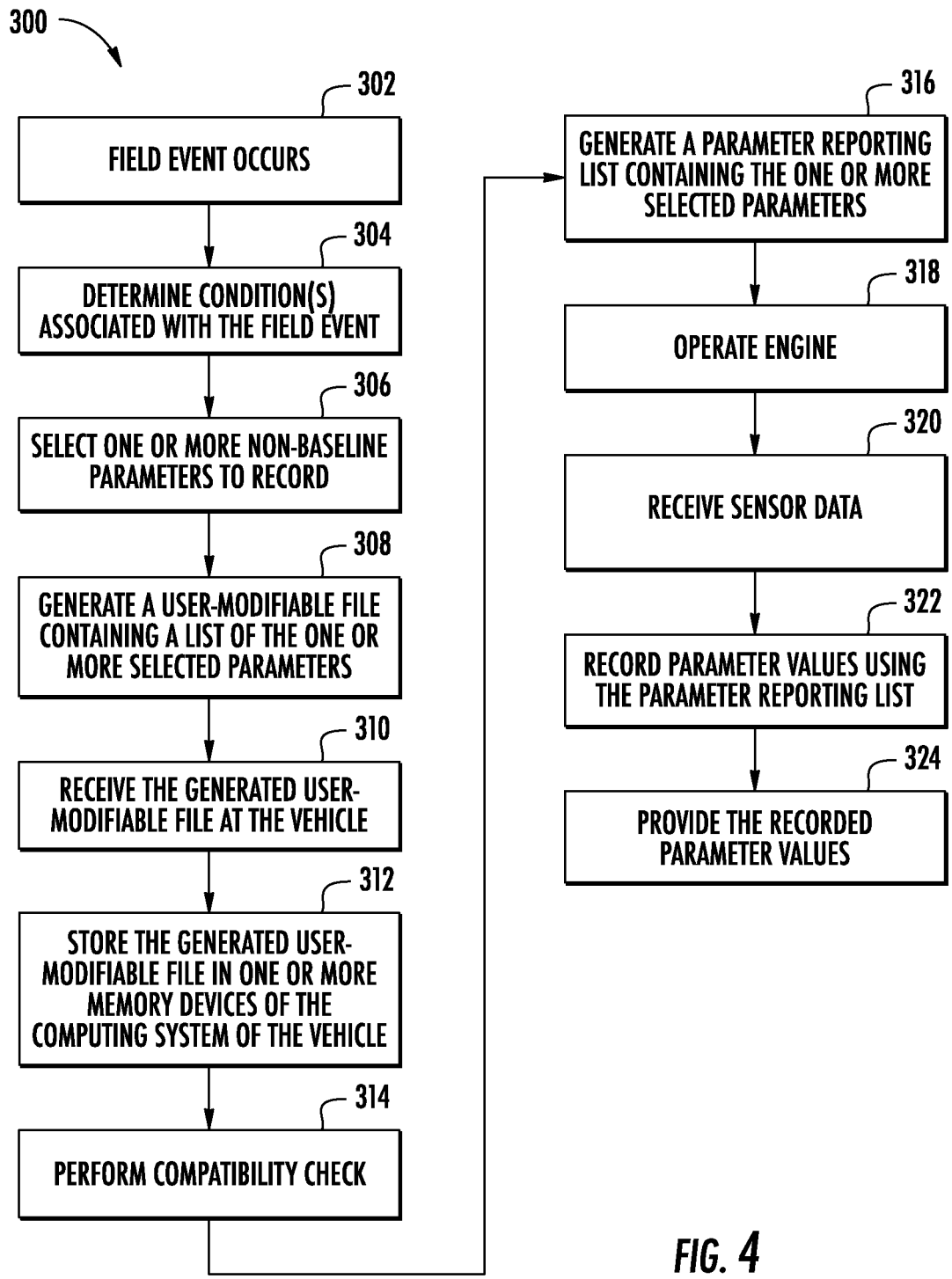
FIG. 4 provides a flow diagram for an example method of monitoring an engine according to example embodiments of the present disclosure.
Figure 5:
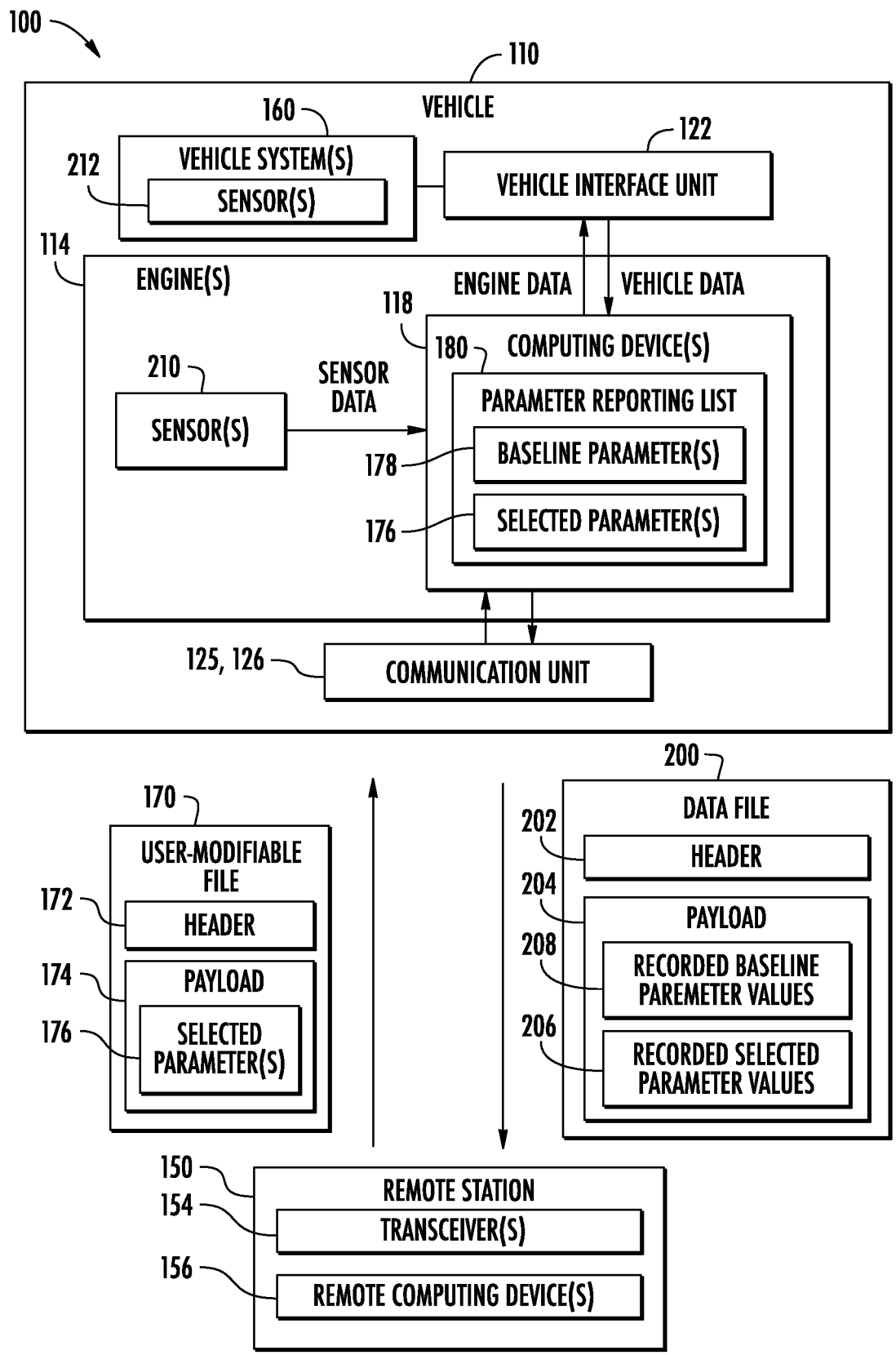
FIG. 5 provides a schematic view of a system configured to implement the method of FIG. 4.
Figure 6:
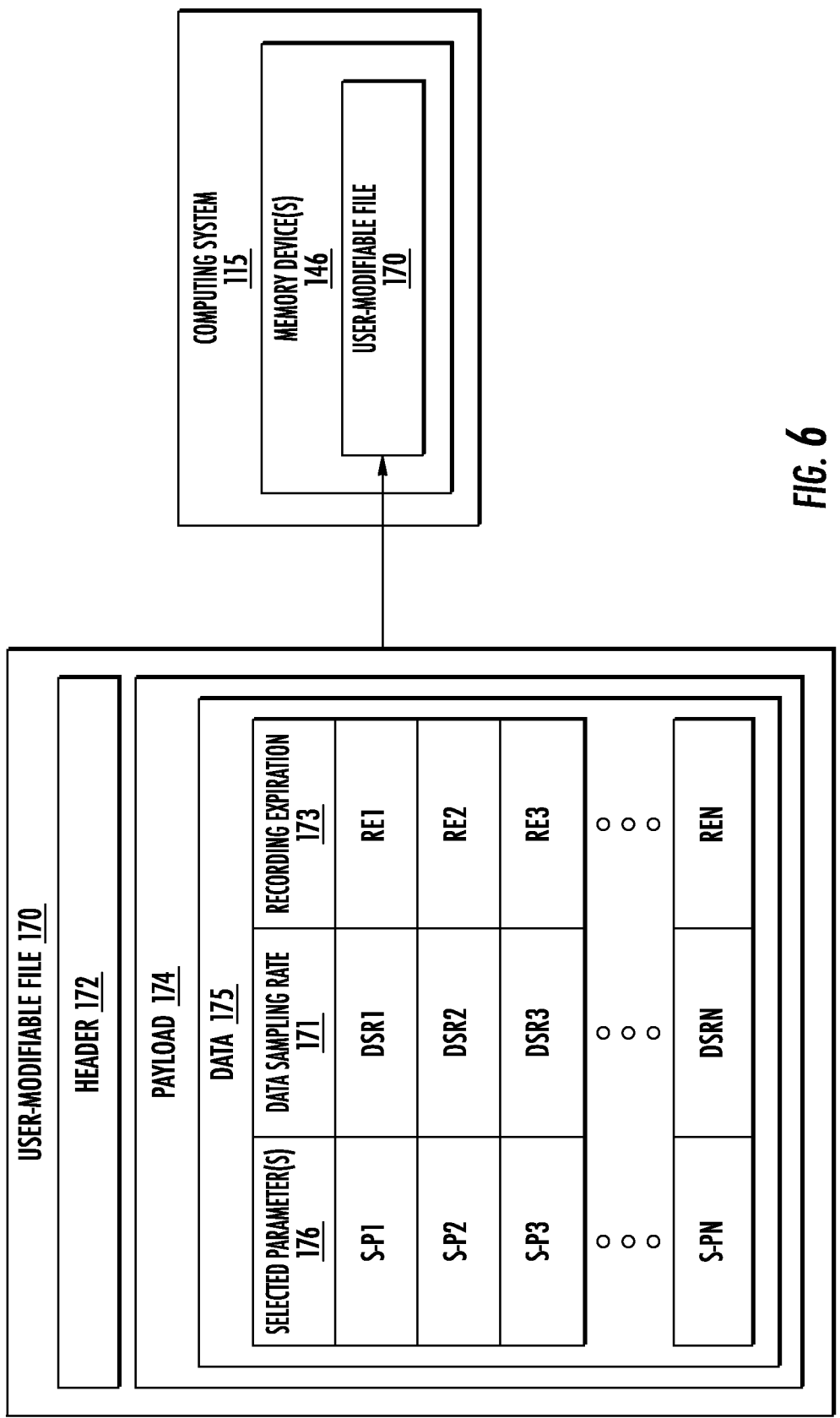
FIG. 6 provides a schematic block diagram depicting a user-modifiable file being stored in one or more memory devices of the computing system of the aircraft of FIG. 1.
Figure 7:
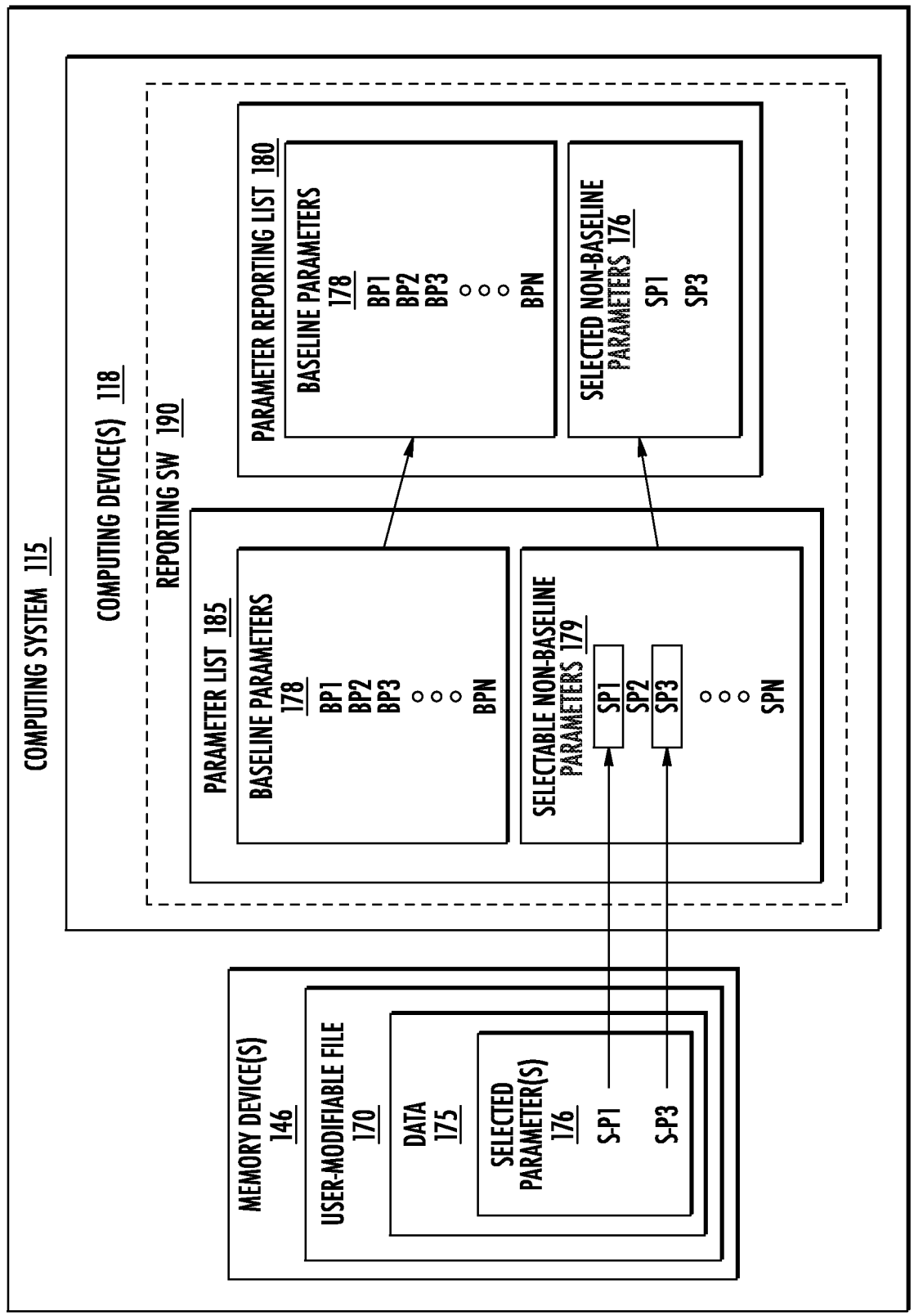
FIG. 7 provides a schematic view of a computing device of the aircraft of FIG. 1 generating a parameter reporting list.

Referring now generally to FIGS. 1, 4, 5, 6, and 7, an example manner in which additional or different parameters can be designated for recording will now be provided. Particularly, an example manner in which selected non-baseline parameters can be designated for recording (i.e., added to a parameter reporting list) will be provided. As noted, in some instances it may be desirable to record values and/or settings for FADEC parameters in addition to values and/or settings associated with the baseline parameters. By adding non-baseline parameters to the parameter reporting list, values and/or settings associated with the non-baseline parameters can be recorded. FIG. 4 provides a flow diagram for an example method (300) of monitoring and communicating engine data of an engine. For instance, the engine can be one or more of the engines 114 of the aircraft 110 of FIG. 1. It will be appreciated that exemplary method (300) can be modified, adapted, expanded, rearranged and/or omitted in various ways without deviating from the scope of the present subject matter. FIG. 5 provides a schematic view of a system 100 for implementing method (300). FIG. 6 provides a schematic block diagram depicting a user-modifiable file being stored in one or more memory devices of the computing system of the aircraft of FIG. 1. FIG. 7 provides a schematic view of a computing device of the aircraft of FIG. 1 generating a parameter reporting list.

At (302), a field event can occur. For instance, one or more of the engines 114 of the aircraft 110 of FIG. 1 can experience unexpected behavior or performance during operation. For example, one or more of the engines 114 of the aircraft 110 can experience an unexpected engine shutdown during flight. As another example, one or more of the engines 114 of the aircraft 110 can experience unexpected behavior during start-up or spooling up of the engines 114. As yet another example, one or more of the engines 114 of the aircraft 110 can experience unexpected behavior during takeoff or during the climb phase of a flight. As a further example, one or more of the engines 114 of the aircraft 110 can experience unexpected behavior in a particular geographic area or in proximity to some natural occurring event, such as a volcanic eruption or a dust storm.

In some implementations, recorded values and/or settings associated with parameters of a downloaded data file can be compared to model parameter values and/or settings for the given engine conditions to determine whether the one or more engines 114 have experienced unexpected behavior during operation. In yet other implementations, a pilot or crewmember of the aircraft 110 can observe unexpected performance of the one or more engines 114. In further implementations, whether the one or more engines 114 have experienced unexpected behavior can be determined in other suitable manners.

At (304), the method (300) includes determining one or more conditions associated with the field event. For instance, a data file associated with the flight in which the one or more engines 114 experienced unexpected behavior can be downloaded to the one or more remote computing devices 156. The one or more remote computing devices 156 can perform an analysis on the recorded values and/or settings associated with the baseline parameters, and based at least in part on the recorded values and/or settings of the baseline parameters, the one or more remote computing devices 156 can determine one or more conditions associated with the field event. For example, the one or more remote computing devices 156 can determine the altitude, ambient outside temperature, the airspeed, the exhaust gas temperature, the fuel flow rate, and/or other recorded parameter values and/or settings that provide a snapshot of the conditions of the one or more engines 114 before, during, and/or after the field event. Based on the determined conditions associated with the field event, as will be explained below, one or more non-baseline parameters can be selected to be recorded for future flights or engine operation.

At (306), the method (300) includes selecting one or more non-baseline parameters to record. For instance, in some implementations, one or more non-baseline parameters can be selected based at least in part on the determined conditions of the field event. Stated differently, one or more non-baseline parameters can be selected to be recorded for future flights or engine operation based at least in part on recorded data indicative of the operating conditions and performance of the one or more engines 114 before, during, and/or after the field event. For example, non-baseline parameters can include, without limitation, various calculated values, such as efficiencies, pressure ratios, margins, etc., as well as temperatures, pressures, speeds, mass flows, etc. at or along particular stations of the engines 114 that are not captured by baseline parameters. For example, it may be desirable to record the pressure at the LP compressor 22 exit, commonly referred to as engine station 2.5. The one or more remote computing devices 156 can select the non-baseline parameters to record during the next flight(s) or cycle(s). In some implementations, the one or more remote computing devices 156 can automatically select the non-baseline parameters based at least in part on the determined conditions of the field event.

In some implementations, it may be desirable to record non-baseline parameters for other reasons, i.e., not in response to a field event. For instance, it may be desirable to perform a study or an investigation on the health of one or more components of the engines 114 to provide additional data for the study. Accordingly, it will be understood that non-baseline parameters need not be selected for recording in response to or based on a field event or the determined conditions associated with the field event.

At (308), the method (300) includes generating a user-modifiable file. As used herein and in the appended claims, generating a file means creating a new file or modifying or updating an existing file. As one example, with specific reference to FIG. 5, the one or more remote computing devices 156 of the remote station 150 can generate the user-modifiable file 170. For this embodiment, the user-modifiable file 170 includes a header 172 and a payload 174. The header 172 includes data (e.g., metadata) such as, without limitation, cryptographic information, a time stamp, a version or release number of the user-modifiable file 170, checksum information, as well as any other useful information.

The payload 174 of the user-modifiable file 170 includes data 175 as depicted in FIG. 6. The data 175 of the payload 174 can include a selected parameter(s) list containing one or more selected parameters 176 to be recorded, e.g., during engine operation. As noted above, the selected parameters 176 can be non-baseline parameters. In some embodiments, the selected parameters 176 can be any selectable parameter. The selected parameters 176 can be represented on or defined by the user-modifiable file 170 in any suitable manner. For instance, each selected parameter 176 can be represented or defined by a memory address or location where a selected parameter 176 is stored or indexed on one or more memory devices of the computing system 115 (FIG. 1) of the aircraft 110 (FIG. 1). In this way, as will be explained below, the selected parameters 176 can be efficiently mapped with selectable parameters of a parameter list stored on one or more memory devices, e.g., of one or more of the computing devices 118.

The data of the user-modifiable file 170 can also include one or more parameter settings associated with the one or more selected parameters 176. For instance, as shown in FIG. 6, the one or more parameter settings associated with the one or more selected parameters 176 can include a data sampling rate 171 indicating a rate or frequency at which parameter values for the one or more selected parameters 176 are to be recorded, e.g., by the computing devices 118 of the FADEC system. The data sampling rate can be any suitable rate, including for example, once per second, three times per second, twenty times a second, etc. The one or more parameter settings associated with the one or more selected parameters 176 can also include a recording expiration 173 indicating when parameter values for the one or more selected parameters 176 are no longer to be recorded, e.g., by the computing devices 118 of the FADEC system. For the embodiment of FIG. 6, the selected parameters list of the data 175 includes a first selected parameter S-P1, a second selected parameter S-P2, a third selected parameter S-P3, and so on to the Nth selected parameter S-PN. As shown, the first selected parameter S-P1 has an associated data sampling rate DSR1 and recording expiration RE1, the second selected parameter S-P2 has an associated data sampling rate DSR2 and recording expiration RE2, the third selected parameter S-P3 has an associated data sampling rate DSR3 and recording expiration RE3, and so on such that the Nth selected parameter S-PN has an associated data sampling rate DSRN and recording expiration REN. The data sampling rates 171 can be the same or different. Likewise, the recording expirations can be the same or different. It will be appreciated that the data of the user-modifiable file 170 can include other parameter settings associated with the one or more selected parameters 176.

At (310), the method (300) includes receiving the generated user-modifiable file. For instance, as shown in FIG. 5, the generated user-modifiable file 170 can be transmitted to the aircraft 110. The user-modifiable file 170 can be transmitted in any suitable manner, such as by any of the transmission techniques described herein. One or more of the communication units 125, 126 can receive the data transmission from one or more transceivers 154 of the remote station 150. The data transmission can include the user-modifiable file 170. The communication units 125, 126 can receive the user-modifiable file 170 by wireless communication, by a wired connection, and/or by manual transfer, e.g., by connecting a removable storage device to a computing device of the aircraft 110. Upon receiving the data transmission, the communication units 125, 126 can route the user-modifiable file 170 to one or more processing devices of the computing system 115 of the aircraft 110. The one or more processing devices of the computing system 115 can receive the user-modifiable file 170, and as will be explained below, the user-modifiable file 170 can then be stored. In other example implementations, the data transmission that includes the generated user-modifiable file 170 can be transmitted directly to the computing devices 118.

At (312), the method (300) includes storing the received user-modifiable file in one or more memory devices of the computing system of the vehicle. For instance, FIG. 6 provides a schematic block diagram depicting the user-modifiable file 170 being stored in one or more memory devices 146 of the computing system 115 of the aircraft 110. In some implementations, the one or more memory devices 146 where the user-modifiable file 170 is stored can be one or more memory devices of one or multiple computing devices 118. Accordingly, the user-modifiable file 170 can be routed to one or more of the computing devices 118. The computing devices 118 can receive and store the user-modifiable file 170, e.g., in one or more memory devices thereof.

In other implementations, the user-modifiable file 170 can be routed to and stored in one or more computing devices onboard the aircraft 110 other than the computing devices 118. As one example, the user-modifiable file 170 can be routed to and received and stored by one or more computing devices positioned within the avionics bay 120. In other implementations, the user-modifiable file 170 can be routed to and received and stored on one or more memory devices of the communication units 125, 126. Further, in some implementations, the memory location where the user-modifiable file 170 is stored is a dedicated memory location that is configured to only store the user-modifiable file 170. In this way, the contents of the user-modifiable file 170 can be more easily found, accessed, and read, e.g., by engine reporting software executed by the computing devices 118.

In some implementations, the data transmission and/or user-modifiable file 170 is encrypted. In such implementations, one or more of the communication units 125, 126 can decrypt the received data transmission and/or user-modifiable file 170. The decrypted user-modifiable file 170 can then be routed to the computing devices 118 of the FADEC system or some other computing device(s) of the aircraft 110 as noted above. In some implementations, the user-modifiable file 170 is decrypted by the computing devices 118 or by some other intermediary computing device instead of the communication units 125, 126.

At (314), the method (300) can include performing a compatibility check on the contents of the user-modifiable file. For instance, once the user-modifiable file 170 is received at (310) and then stored at (312), the computing device(s) 118 and/or other computing device(s) of the aircraft 110 can determine the integrity and/or compatibility of the contents of the user-modifiable file 170 with the hardware, software, firmware, etc. of the computing device(s) 118. In one aspect of performing the compatibility check at (314), the computing device(s) and/or computing devices 118 can determine whether the user-modifiable file 170 was successfully uploaded by performing one or more data integrity operations, e.g., cyclic redundancy checks, checksum checks, cryptographic checksums and digital signatures, etc. In some implementations, if the user-modifiable file 170 does not pass the data integrity operation(s), the user-modifiable file 170 can be ignored. On the other hand, if the user-modifiable file 170 passes the data integrity operation(s), the computing device(s) and/or computing devices 118 can proceed to (316). In some implementations, (314) can be performed prior to (312). In some other implementations, (314) can be performed before and after performing (312).

At (316), the method (300) includes designating, by reporting software executed on at least one of the one or more computing devices of the aircraft (e.g., the computing devices 118), parameters to record without modifying the reporting software, wherein the parameters to record include the one or more selected parameters. In some implementations, designating parameters to record includes generating a parameter reporting list, wherein the parameters on the parameter reporting list designate the parameters to be recorded. The parameter reporting list can contain or include the one or more selected parameters noted in the user-modifiable file 170 and one or more baseline parameters 178. For instance, one or more of the computing devices 118 can generate or modify a parameter reporting list 180 containing the one or more selected parameters 176 received as part of the user-modifiable file 170 along with the one or more baseline parameters 178. That is, the computing devices 118 can generate a list of parameters to be recorded by the computing devices 118. As noted previously, as used herein and in the appended claims, generating a file means creating a new file or modifying or updating an existing file. Accordingly, in some implementations, the computing devices 118 can create a new parameter recording list containing the baseline parameters 178 and selected parameters 176. In other implementations, the computing devices 118 can modify or update an existing parameter list containing the baseline parameters 178 and selected parameters 176.

FIG. 7 provides a schematic block diagram of one computing device 118 generating a parameter reporting list 180. As shown, reporting software 190 (e.g., engine reporting software in this embodiment) is executable by the one or more processing devices of the computing device 118. Particularly, the reporting software 190 includes instructions that, when executed by the one or more processors, cause the one or more processing devices of the computing device 118 to generate the parameter reporting list 180. Further, as will be explained below, the reporting software 190 includes instructions that, when executed, cause the one or more processing devices of the computing device 118 to record values associated with the parameters in the parameter reporting list 180, e.g., during engine operation.

As depicted in FIG. 7, the computing device 118 includes a parameter list 185 that includes parameters that the computing device 118 can record. The parameter list 185 can contain any suitable number of parameters. For this embodiment, the parameter list 185 includes baseline parameters 178 and selectable parameters 179, which can be non-baseline parameters. In some implementations, the baseline parameters 178 are always recorded by the computing device 118, e.g., during engine operation, and the selectable non-baseline parameters are not generally recorded by the computing device 118. In some embodiments, the parameter list 185 is fixed within the reporting software 190 and is modifiable only by changing the source code of the reporting software 190. For the embodiment of FIG. 7, the baseline parameters 178 include a first baseline parameter BP1, a second baseline parameter BP2, a third baseline parameter BP3, and so on to the Nth baseline parameter BPN. The selectable non-baseline parameters 179 include a first selectable parameter SP1, a second selectable parameter SP2, a third selectable parameter SP3, and so on to the Nth selectable parameter SPN.

To generate the parameter reporting list 180, the reporting software 190, when executed, accesses and reads the user-modifiable file 170. Particularly, the reporting software 190 first accesses the user-modifiable file 170, which is stored on the one or more memory devices 146 of the computing system 115. Once accessed, the reporting software 190, when executed, reads the selected parameters 176 contained within the user-modifiable file 170. In some implementations, the reporting software 190 can access and read, but not write, to the user-modifiable file 170. This may prevent inadvertent modification of the user-modifiable file 170. As noted above, the selected parameters 176 can be represented or defined in any suitable manner, such as by a memory address indicating where a selectable parameter is indexed on the computing system 115. For the embodiment of FIG. 7, the selected parameters 176 contained within the user-modifiable file 170 include a first selected parameter S-P1 and a third selected parameter S-P3.

Once the reporting software 190 accesses and reads the user-modifiable file 170, the reporting software 190, when executed, maps the selected parameters 176 contained within the user-modifiable file 170 with the selectable non-baseline parameters 179. In the example embodiment of FIG. 7, the first selected parameter S-P1 corresponds with the first selectable parameter SP1 and the third selected parameter S-P3 corresponds with the third selectable parameter SP3. The first selected parameter S-P1 can be representative of a memory location where the first selectable parameter SP1 is stored on the computing device 118 and the third selected parameter S-P3 can be representative of a memory location where the third selectable parameter SP3 is stored on the computing device 118, for example. Accordingly, the reporting software 190, when executed, maps the first selected parameter S-P1 with the first selectable parameter SP1 and the third selected parameter S-P3 with the third selectable parameter SP3. The mapped parameters are designated for inclusion on the reporting parameter list 180 by the reporting software 190.

In FIG. 7, for example, the mapped first selectable parameter SP1 and third selectable parameter SP3 are designated for inclusion in the generated or modified parameter reporting list 180. As a result, the generated or modified parameter reporting list 180 includes baseline parameters 178, including BP1, BP2, BP3, and BPN, and selected parameters 176, including SP1 and SP3. In the event a selected parameter 176 contained within the user-modifiable file 170 is unable to be mapped to a selectable non-baseline parameter 179, the selected parameter 176 contained within the user-modifiable file 170 can be ignored by the reporting software 190. Further, an error notification can be generated, e.g., by executing the reporting software 190, and the error notification can be provided to a user.

Moreover, in generating the parameter reporting list 180, one or more parameter settings associated with a selected parameter can be included in the generated or modified parameter reporting list 180. As one example, the data sampling rate or frequency at which values for the selected parameter are to be recorded can be linked to the selected parameter in the generated or modified parameter reporting list 180. As another example, an expiration date indicating the time and/or date upon which parameter values for a selected parameter should cease being recorded can be linked to the selected parameter in the generated or modified parameter reporting list 180. It will be appreciated that other parameter settings can be linked to the selected parameters 176 in the generated or modified parameter reporting list 180.

Notably, in generating the parameter reporting list 180, neither the reporting software 190 nor any other engine software is changed, altered, or otherwise modified. That is, the reporting software 190, when executed, can read selected parameters 176 from the uploaded user-modifiable file 170, map the selected parameters 176 to the selectable parameters of the parameter list 185, and designate the mapped parameters for inclusion in the parameter reporting list 180 along with the baseline parameters 178 without changing, altering, or otherwise modifying the reporting software 190 or any other engine software. In this manner, parameters can be added and/or removed from the parameter reporting list 180 without need for lengthy software code certification processes, among other benefits. The user-modifiable file 170 can be made available across multiple flights or missions, resent each flight, or maintained in a memory location that is not a part of the engine control software such that the user-modifiable file 170 can be reread each time the reporting logic or reporting software 190 is executed.

At (318), returning to FIGS. 1, 4, and 5, once the parameter reporting list 180 is generated at (316), the method (300) includes operating the propulsion system. For instance, the propulsion system can include one or more engines, such as the turbofan 114 of FIG. 2. As the engine operates and produces thrust for propulsion of the aircraft 110, the computing devices 118 can record data relating to the engine(s) 114 and aircraft 110. In other embodiments, the propulsion system can include both engines and electric machines, e.g., for driving fans or propellers. In yet other embodiments, the propulsion system can include one or more electric machines operatively coupled with one or more fans or propellers for propulsion. In such embodiments, data relating the electric machines and/or other electrical components associated with the propulsion system can be recorded.

At (320), with the engine operating, the method (300) includes receiving sensor data from one or more sensors. For instance, the computing devices 118 can receive one or more sensor outputs from one or more engine sensors 210. The one or more sensors 210 can sense or measure values for parameters relating to the engine(s) 114, such as e.g., fan speed, core speed, temperatures at various stations along the core air flowpath, etc. Signals from the sensors 210 can be routed to the computing device(s) 118 and processed. The computing device(s) 118 can then calculate or predict values for other parameters, such as exhaust gas temperature, mass flow at various stations of the engine(s) 114, stall margin remaining, etc. In addition, in some implementations, the computing device(s) 118 can receive sensor data from one or more vehicle sensors 212 positioned onboard the aircraft 110. Sensor outputs received from the one or more vehicle sensors 212 can be received as part of vehicle data transmitted to the computing devices 118 (e.g., over data communication link 124 (FIG. 1)) from the vehicle interface unit 122. Moreover, engine data, which includes sensed and calculated values for certain engine parameters, can be transmitted to the vehicle interface unit 122 and ultimately to one or more vehicle systems 160.

At (322), the method (300) includes recording engine operating data. For instance, the reporting software 190, when executed by the computing device(s) 118, can record parameter values for the one or more parameters in the generated parameter reporting list 180 based at least in part on the received sensor data. For instance, the sensed, calculated, and/or predicted parameter values for the engine and/or aircraft parameters, including both baseline parameters 178 and selected parameters 176, can be compiled into a data file 200 as shown in FIG. 5. The computing device(s) 118, and particularly the one or more processors of the computing device(s) 118 executing the instructions of the reporting software 190, can write to the data file 200 continuously or on a rolling basis as data is recorded or at a predetermined interval, such as e.g., every 15 milliseconds, every 25 milliseconds, or every second.

As shown best in FIG. 5, the data file 200 includes a header 202 and a payload 204. The header 202 includes data (e.g., metadata) indicative of, without limitation, cryptographic information, a time stamp, the version or release number of the user-modifiable file 170 used to designate the parameters to record, checksum information, communication logs, error logs, etc. as well as other information. The payload 204 of the data file 200 includes recorded values for the parameters listed in the generated parameter reporting list 180, including recorded selected parameter values 206 associated with the selected parameters 176 and recorded baseline parameter values 208 associated with the baseline parameters 178. The data file 200 can be a binary, machine-readable file, for example. As another example, the data file 200 can be a human-readable file in addition to being machine-readable. As yet another example, the data file 200 can be part human-readable and part binary machine-readable. Further, it will be appreciated that the data file 200 depicted in FIG. 5 is by way of example only, and that in other example implementations, the data file 200 may have other configurations. For instance, in some implementations, the data file 200 may not include a header 202.

In some implementations, the one or more processors of the computing system 115 are configured to record data using the generated parameter reporting list 180 and the received sensor data after the propulsion system starts up or commences a subsequent power cycle. That is, an uploaded user-modifiable file may only be available or active for use after the propulsion system starts up or commences a subsequent power cycle. In such implementations, for example, one or more processors of the computing system 115 can cause the propulsion system to start-up. For instance, one or more processors of the computing device(s) 118 can cause the engine(s) to start-up, i.e., to commence operation. Upon start-up, one or more processors of the computing system 115 can determine whether a user-modifiable file has been uploaded to the aircraft 110, or stated differently, the one or more processors of the computing system 115 can determine whether a user-modifiable file has been received.

In yet other implementations, the one or more processors of the computing system 115 are configured to record data using the generated parameter reporting list 180 and the received sensor data upon a subsequent power up of the computing device(s) 118. That is, an uploaded user-modifiable file may only be available or active for use after a subsequent power up of the computing device(s) 118. Notably, power up of the computing device(s) 118 can occur prior to start up of the propulsion system. In this manner, data can be recorded prior to and during start up of the propulsion system. Furthermore, data can continue to be recorded after shutdown of the propulsion system. Accordingly, in some implementations, data can be recorded the entire time the computing device(s) 118 are powered on, regardless of whether the propulsion system is on or off.

When the one or more processors (e.g., of one or more computing devices) determine that a user-modifiable file has been received, the method (300) proceeds from (312) through (322). Particularly, the method (300) proceeds with designating, by the reporting software 190 executed on at least one of the one or more computing devices of the computing system 115, parameters to record without modifying the reporting software 190 and then recording engine operating data, e.g., for at least the parameters included in the user-modifiable file 170. When the one or more processors (e.g., of one or more computing devices) determine that a user-modifiable file has not been received, the recorded data can contain only data or parameter values associated with baseline parameters 178 parameters. When the one or more processors determine that an existing user-modifiable file is still stored in the dedicated memory location and has not yet expired, the recorded data can contain data or parameter values associated with baseline parameters and parameter values associated with the selected parameters within the existing user-modifiable file.

At (324), the method (300) includes providing the data file. For instance, the data file 200 can be transmitted or otherwise downloaded to other sources in a number of suitable ways. For instance, the data file 200 can be wirelessly transmitted via one or more of the communication devices 125, 126, e.g., to ground station 150, to another aircraft or vehicle, etc. For example, the data file 200 can be wirelessly transmitted in-flight over SATCOM and/or Air to Ground (ATG) technology. As another example, the data file 200 can be wirelessly transmitted post-flight over a cellular, Wi-Fi, and/or Bluetooth® network. In yet other implementations, the data file 200 can be transmitted via a wired connection. In some embodiments, the data file 200 can be transmitted as a single file or can be parsed and sent in portions or data packets. The data file 200 can then be reconstituted, e.g., by the remote computing device(s) 156. In addition, the data file 200 can be decrypted if the data file 200 is encrypted. The reconstituted and decrypted data file 200 can be made available for visualization, analysis, archiving, etc., e.g., by the remote computing device(s) 156. Additionally or alternatively, the data file 200 can be transmitted via one or more wired connections, e.g., to a portable device 142 (FIG. 3). The access terminal can be implemented, for instance, on a laptop, tablet, mobile device, or other suitable computing device. The portable device 142 can be used by maintenance professionals to retrieve the data file 200.

Advantageously, by adding or updating the parameter reporting list in the manner described herein, non-baseline parameters, or more broadly selectable parameters, can be added to the FADEC parameter reporting list and monitored much faster in response to a field or engine event than conventional techniques. Particularly, in accordance with the inventive aspects of the present disclosure, new or updated FADEC parameters can be monitored in response to a field event in hours or days rather than weeks or months. This can be achieved based at least in part by uploading a user-modifiable file to the aircraft that is accessible and readable by reporting software associated with generating and recording data during engine operation. The new FADEC parameters can be designated for recording by the reporting software without modification to the reporting software. In this way, the inventive aspects of the present disclosure provide flexibility to modify the parameters being captured without the need for software changes, which eliminates the need for lengthy software code recertification processes. Moreover, the inventive aspects of the present disclosure described herein leverage existing FADEC architecture that keeps lower level functionality separate from higher critical functions, including engine control software.

Furthermore, the user-modifiable file 170 can be pushed or otherwise sent to aircrafts and/or engines identified as having experienced anomalous or unexpected engine operation or are scheduled or predicted to operate in the determined conditions of the field event. For instance, in some implementations, the method (300) includes identifying one or more vehicles or engines scheduled to operate in the determined conditions of the field event. For instance, the remote computing device(s) 156 can identify each vehicle and/or engine scheduled to operate in the determined conditions of the field event, e.g., based on flight schedule information. In some implementations, the method (300) includes identifying one or more vehicles or engines that have experienced anomalous or unexpected engine operation. Moreover, in such implementations, the method (300) further includes sending the generated user-modifiable file 170 to one or more of the identified one or more vehicles or engines scheduled to operate in the determined conditions of the field event and/or that have experienced anomalous or unexpected engine operation. That is, the generated user-modifiable file 170 can be pushed or otherwise provided to each vehicle and/or engine that is, will be, or predicted to operate in the determined conditions of the field event or that has experienced anomalous or unexpected engine operation. In this way, analytics can be performed, e.g., by the remote computing device(s) 156 using data recorded from multiple engines subject to the determined conditions of the field event and/or that have experienced anomalous or unexpected engine operation associated with certain operating conditions.

Figure 8:
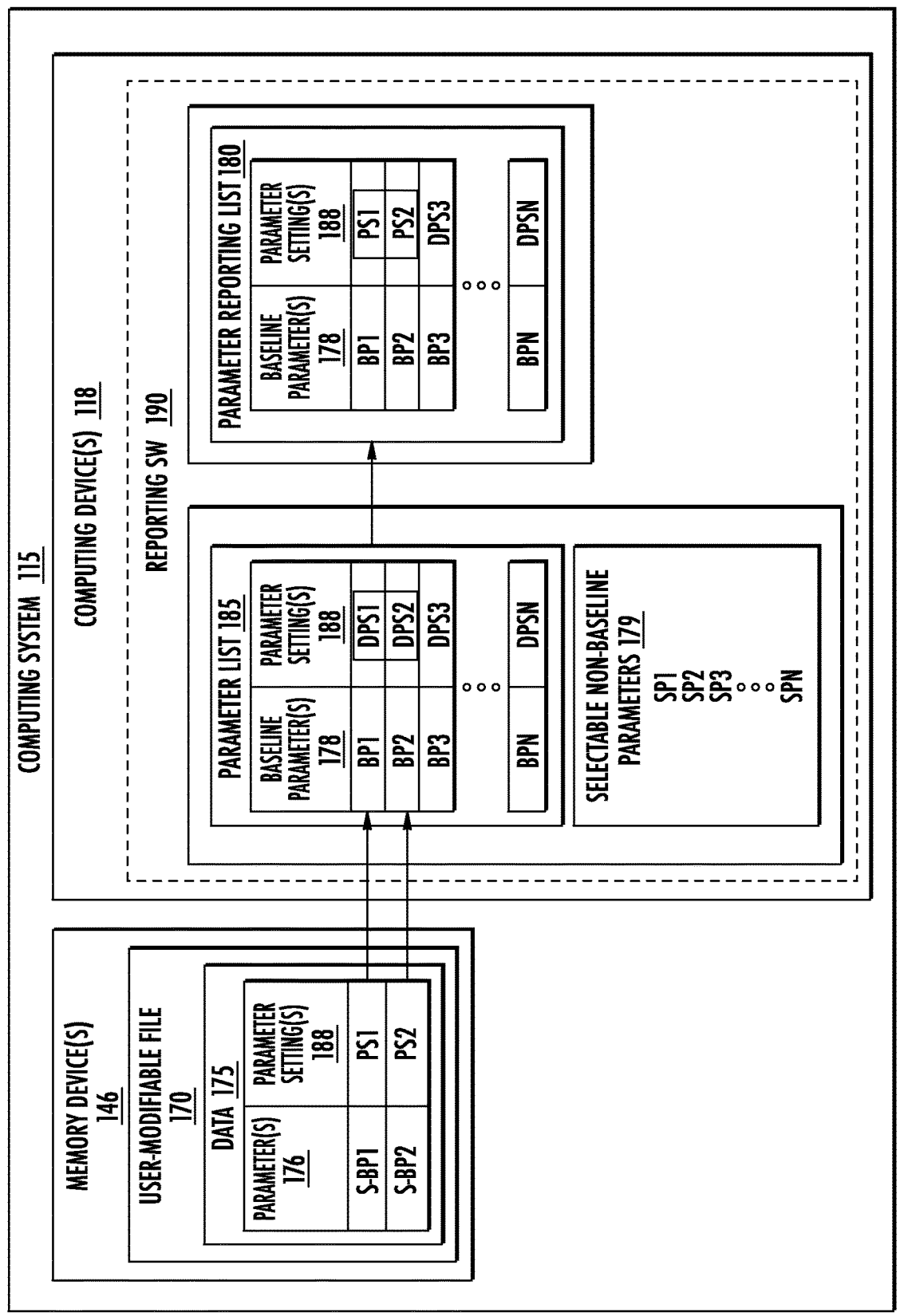
FIG. 8 provides a schematic view of a computing device of a vehicle propulsion system generating a parameter reporting list in which one or more parameter settings are changed.

In some implementations, it may be desirable to change a parameter setting (e.g., a data sampling rate) of one or more of the parameters stored within the parameter list fixed within the reporting software. By way of example, FIG. 8 provides a schematic view of a computing device of a vehicle propulsion system generating a parameter reporting list 180 in which one or more parameter settings are changed. For this embodiment, the computing device can be computing device 118 and the vehicle propulsion system can be engine 114 of aircraft 110 (FIG. 1). The computing system 115 has one or more memory devices and one or more processors.

With reference to FIG. 8, the one or more processors are configured to receive a user-modifiable file 170 containing data 175 that includes parameter settings 188 associated with selected parameter 176. For instance, the user-modifiable file 170 can be received from a communication unit (e.g., communication unit 125 or 126;

FIG. 1). The communication unit can receive the user-modifiable file 170 from a remote station via a data transmission. In this example, the user-modifiable file 170 includes selected parameters 176, including a first selected parameter S-BP1 and a second selected parameter S-BP2. The user-modifiable file 170 also includes parameter settings 188 associated with the selected parameters 176. For instance, a first parameter setting PS1 is associated with the first selected parameter S-BP1 and a second parameter setting PS2 is associated with the second selected parameter S-BP2. The first and second parameter settings PS1, PS2 can represent any suitable parameter setting, such as a data sampling rate.

The one or more processors are configured to access and read the user-modifiable file 170 such that they may link or map, by executing reporting software 190 on at least one of the one or more processors (e.g., of the computing device 118), the parameter setting 188 associated with the selected parameter 176 to a parameter of a parameter list 185. That is, each parameter setting associated with a selected parameter of the user-modifiable file 170 is linked or mapped to a parameter of the parameter list 185. For instance, in this example, the first selected parameter S-BP1 corresponds with a first baseline parameter BP1 having an associated default or present first parameter setting DPS1. The second selected parameter S-BP2 corresponds with a second baseline parameter BP2 having an associated default or present second parameter setting DPS2. Accordingly, the first selected parameter S-BP1 is mapped to the first baseline parameter BP1, and thus, the first parameter setting PS1 is mapped to the first baseline parameter BP1 of the parameter list 185. Similarly, the second selected parameter S-BP2 is mapped to the second baseline parameter BP2, and thus, the second parameter setting PS2 is mapped to the second baseline parameter BP2 of the parameter list 185.

The one or more processors are configured to generate, by executing the reporting software 190 on the at least one of the one or more processors (e.g., of the computing device 118), a parameter reporting list 180 containing the parameter and the parameter setting mapped thereto. Notably, the reporting software 190 is not modified during mapping and generating. Stated another way, the reporting software 190, when executed, is not modified in mapping the parameter settings 188 to the parameters within the parameter list 185 and is not modified in generating the parameter reporting list 180. For the depicted example of FIG. 8, the parameter reporting list 180 is generated by the executed reporting software 190 such that the first baseline parameter BP1 has the first parameter setting PS1 (instead of the first default parameter setting DPS1), and such that the second baseline parameter BP2 has the second parameter setting PS2 (instead of the second default parameter setting DPS2). The parameter settings 188 for the third baseline parameter BP3 and all other parameters within the parameter reporting list 180 remain unchanged as shown.

After generating the parameter reporting list 180, the one or more processors are configured to receive sensor data from one or more sensors (e.g., engine sensors, aircraft sensors, etc.). Further, the one or more processors are configured to record parameter values for the parameters 178 (and in some instances selected parameters 176) in the generated parameter reporting list 180 based at least in part on the received sensor data and their respective parameter settings 188, including parameter settings mapped to their respective parameters 178 (e.g., PS1 and PS2).

The one or more processors can generate, by executing the reporting software 190, a data file that includes the parameter values recorded for the one or more parameters in the generated parameter reporting list 180. The one or more processors can also provide the data file. The one or more processors can cause a communication unit (e.g., the communication unit 125 of FIG. 1) to transmit at least a portion of the data file to a remote station (e.g., the remote station 150 of FIG. 1).

In some implementations, the parameter reporting list 180 becomes active only upon a subsequent start-up of the propulsion system. In such implementations, the one or more processors are configured to record the parameter values for the one or more parameters of the generated parameter reporting list 180 based at least in part on the received sensor data on a subsequent start-up of the propulsion system. In yet other implementations, the parameter reporting list 180 becomes active only upon a subsequent power-up of the computing device(s) 118. In such implementations, the one or more processors are configured to record the parameter values for the one or more parameters of the generated parameter reporting list 180 based at least in part on the received sensor data on a subsequent power-up of the computing device(s) 118.

Moreover, although various embodiments of system 100 and method (300) have been described herein wherein the parameter list 185 distinguishes between baseline and non-baseline parameters, in some implementations, the parameter list 185 does not distinguish between baseline and non-baseline parameters. In such implementations, all possible parameters of the parameter list 185 can be selected and designated for inclusion in the generated parameter reporting list 180.

Figure 9:
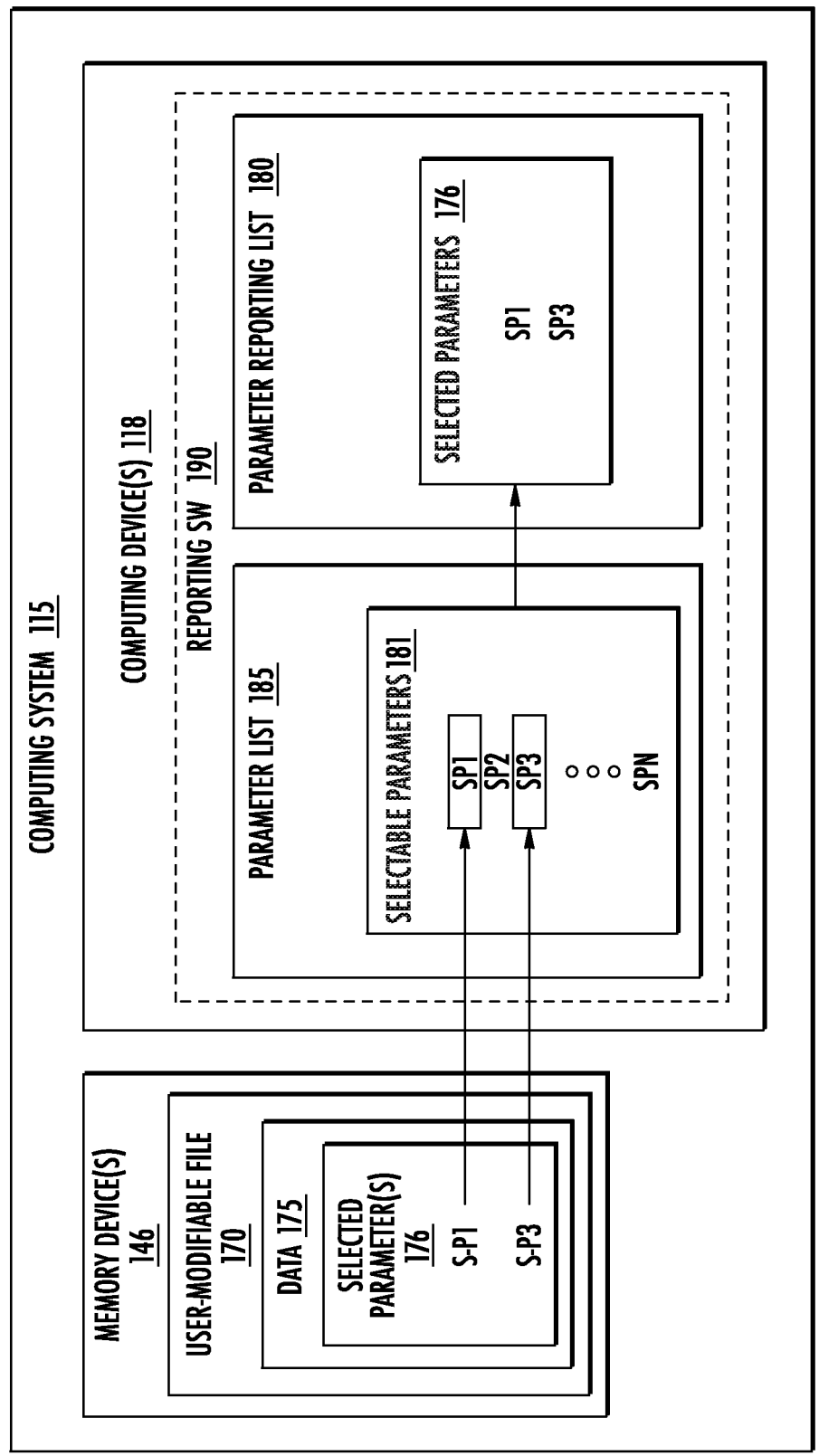
FIG. 9 provides a schematic view of a computing device of a vehicle propulsion system generating a parameter reporting list.

By way of example, FIG. 9 provides a schematic view of a computing device of a vehicle propulsion system generating a parameter reporting list. For this embodiment, the computing device can be computing device 118 and the vehicle propulsion system can be engine 114 of aircraft 110 (FIG. 1). The computing system 115 has one or more memory devices and one or more processors configured to receive a user-modifiable file 170 containing data 175 indicating one or more selected parameters 176 to record, e.g., during operation of the propulsion system. In some implementations, the data 175 of the user-modifiable file 170 indicates the one or more selected parameters 176 to record by representing each of the one or more selected parameters by a memory address. Particularly, the memory addresses representing the one or more selected parameters 176 to record can each indicate a memory location where the one or more selected parameters 176 are stored on the one or more memory devices of the computing system 115 (e.g., memory locations on the one or more memory devices of the computing device 118). In other implementations, the data 175 of the user-modifiable file 170 can indicate the one or more selected parameters 176 to record by other designations, such as by parameter name as defined in the reporting or control software, by part of a parameter name as defined in the reporting or control software, by a specific nomenclature or code as defined in the reporting or control software, by a position of a parameter within a parameter list, etc.

The one or more processors are further configured to generate, by executing reporting software 190 on at least one of the one or more processors, a parameter reporting list 180 containing the one or more selected parameters 176 without modifying the reporting software 190. In some implementations, in generating the parameter reporting list 180, the one or more processors are configured to read the user-modifiable file 170 containing the data 175 indicating the one or more selected parameters 176 to record. For instance, one or more processors of the computing device 118 can access and read the user-modifiable file 170 stored in the one or more memory devices 146, e.g., of a computing device of the computing system 115. In some embodiments, the one or more memory devices 146 are components of the computing device 118. The received user-modifiable file 170 can be stored in a dedicated memory location. For the depicted embodiment of FIG. 9, the selected parameters 176 contained within the data 175 of the user-modifiable file 170 include a first selected parameter S-P1 and a third selected parameter S-P3.

After reading the user modifiable file 170, in generating the parameter reporting list 180, the one or more processors are configured to map the one or more selected parameters 176 with selectable parameters 181 of a parameter list 185 fixed within the reporting software 190. For the embodiment of FIG. 9, the parameter list 185 includes a first selectable parameter SP1, a second selectable parameter SP2, a third selectable parameter SP3, and so on to an Nth selectable parameter SPN. As depicted, the one or more processors map the selected parameters 176 (the first selected parameter S-P1 and the second selected parameter S-P2 in this example) with their respective selectable parameters 181 of the parameter list 185 (the first selectable parameter SP1 and the third selectable parameter SP3 in this example). Accordingly, the selectable parameters 181 of the parameter list 185 that are mapped with the one or more selected parameters 176 are designated for inclusion in the parameter reporting list 180.

In some implementations, the data 175 of the user-modifiable file 170 contains one or more parameter settings associated with the one or more selected parameters 176. As one example, the one or more parameter settings associated with the one or more selected parameters include a data sampling rate indicating a rate at which the parameter values for the one or more selected parameters are to be recorded. As another example, the one or more parameter settings associated with the one or more selected parameters include a recording expiration indicating when the parameter values for the one or more selected parameters are no longer to be recorded. The parameter settings can be linked to their associated selectable parameters 181 and included in the parameter reporting list 180.

Once the parameter reporting list 180 is generated, the one or more processors are further configured to receive sensor data from one or more sensors (e.g., engine sensors, aircraft sensors, etc.). Further, the one or more processors are configured to record parameter values for the one or more selected parameters 176 in the generated parameter reporting list 180 based at least in part on the received sensor data. The one or more processors can generate, by executing the reporting software 190, a data file that includes the parameter values recorded for the one or more selected parameters in the generated parameter reporting list 180. The one or more processors can also provide the data file. The one or more processors can cause a communication unit (e.g., the communication unit 125 of FIG. 1) to transmit at least a portion of the data file to a remote station (e.g., the remote station 150 of FIG. 1). The remote station can be a ground station or a second vehicle, for example.

In some implementations, the parameter reporting list 180 becomes active only upon a subsequent start-up of the propulsion system. In such implementations, the one or more processors are configured to record the parameter values for the one or more selected parameters 176 of the generated parameter reporting list 180 based at least in part on the received sensor data on a subsequent start-up of the propulsion system. In yet other implementations, the parameter reporting list 180 becomes active only upon a subsequent power-up of the computing device(s) 118. In such implementations, the one or more processors are configured to record the parameter values for the one or more selected parameters 176 of the generated parameter reporting list 180 based at least in part on the received sensor data on a subsequent power-up of the computing device(s) 118.

Figure 10:
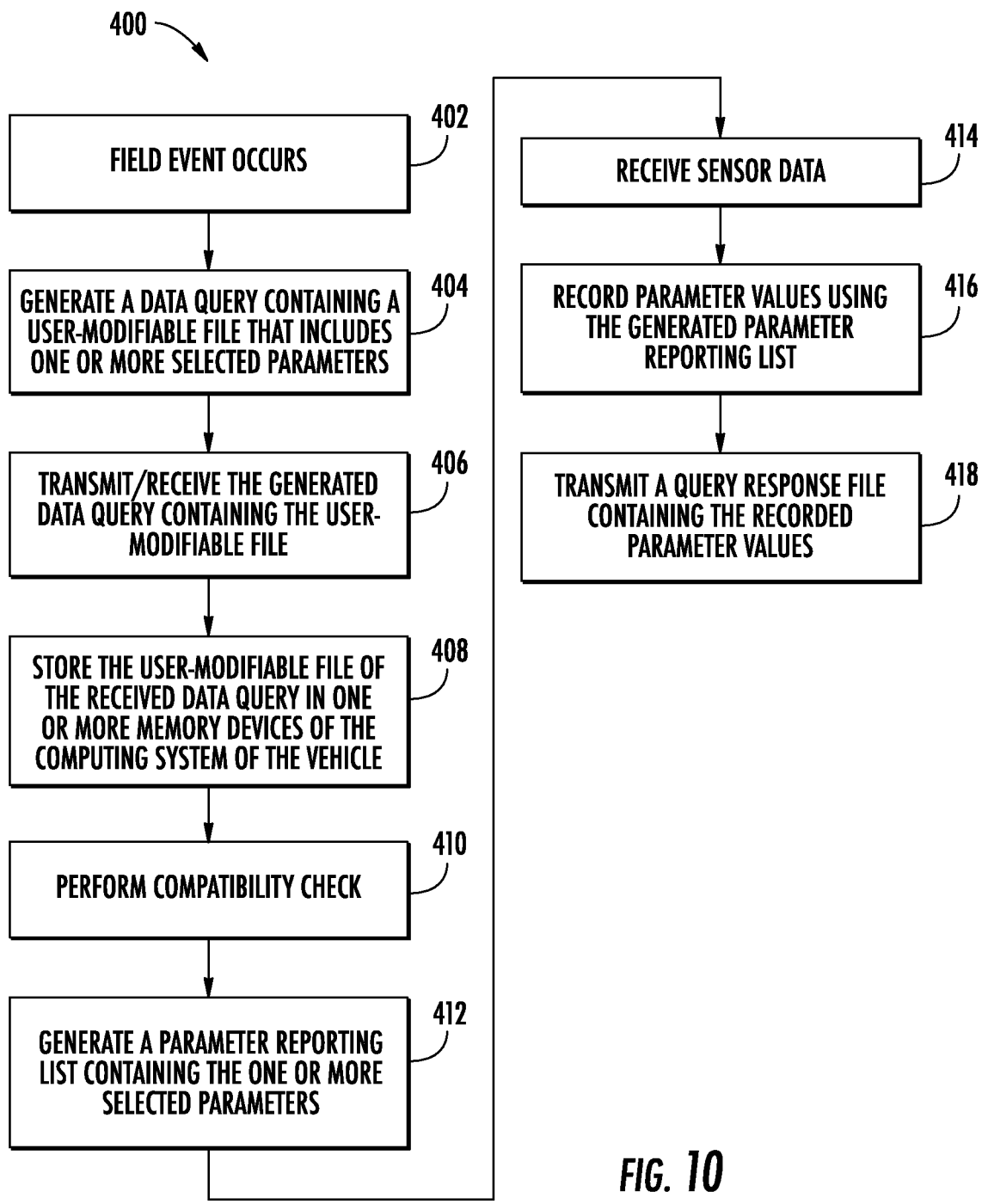
FIG. 10 provides a flow diagram for an example method of querying a FADEC system, recording parameter values associated with selected parameters contained within the query, and transmitting the recorded data according to example embodiments of the present disclosure.
Figure 11:
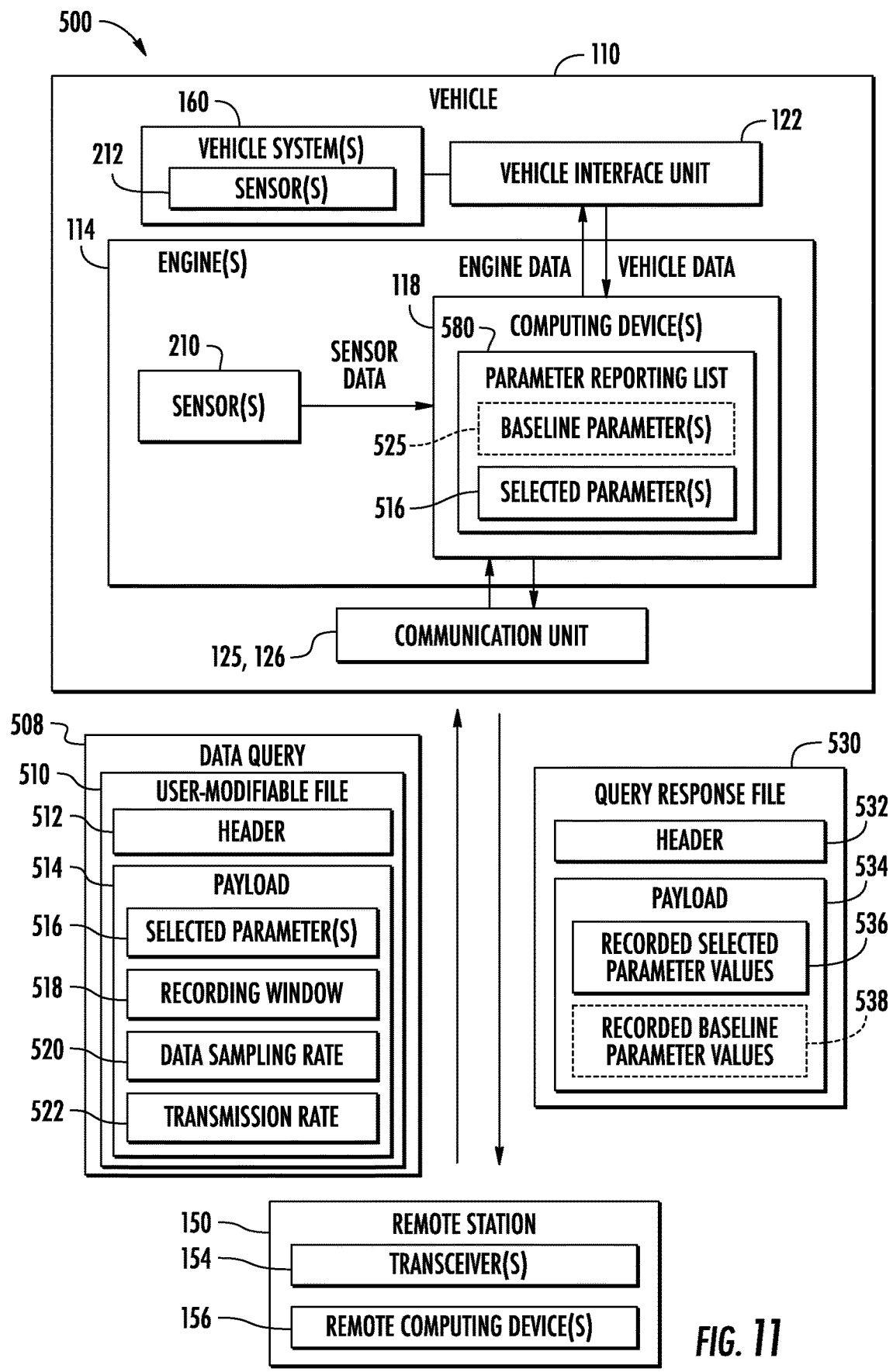
FIG. 11 provides a schematic view of a system configured to implement the method of FIG. 10.
Figure 12:
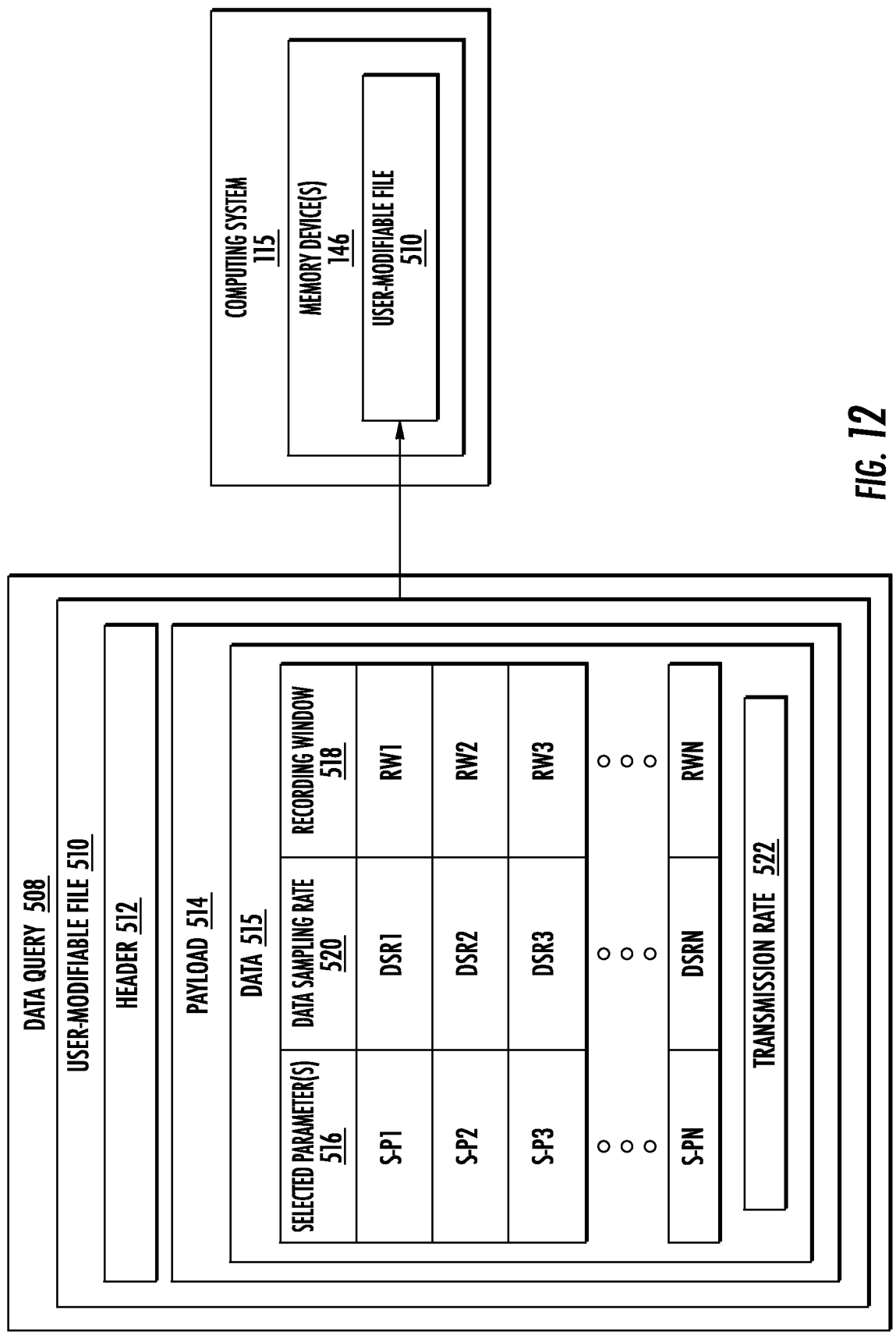
FIG. 12 provides a schematic block diagram depicting a user-modifiable file of a data query being stored in one or more memory devices of the computing system of an aircraft.
Figure 13:
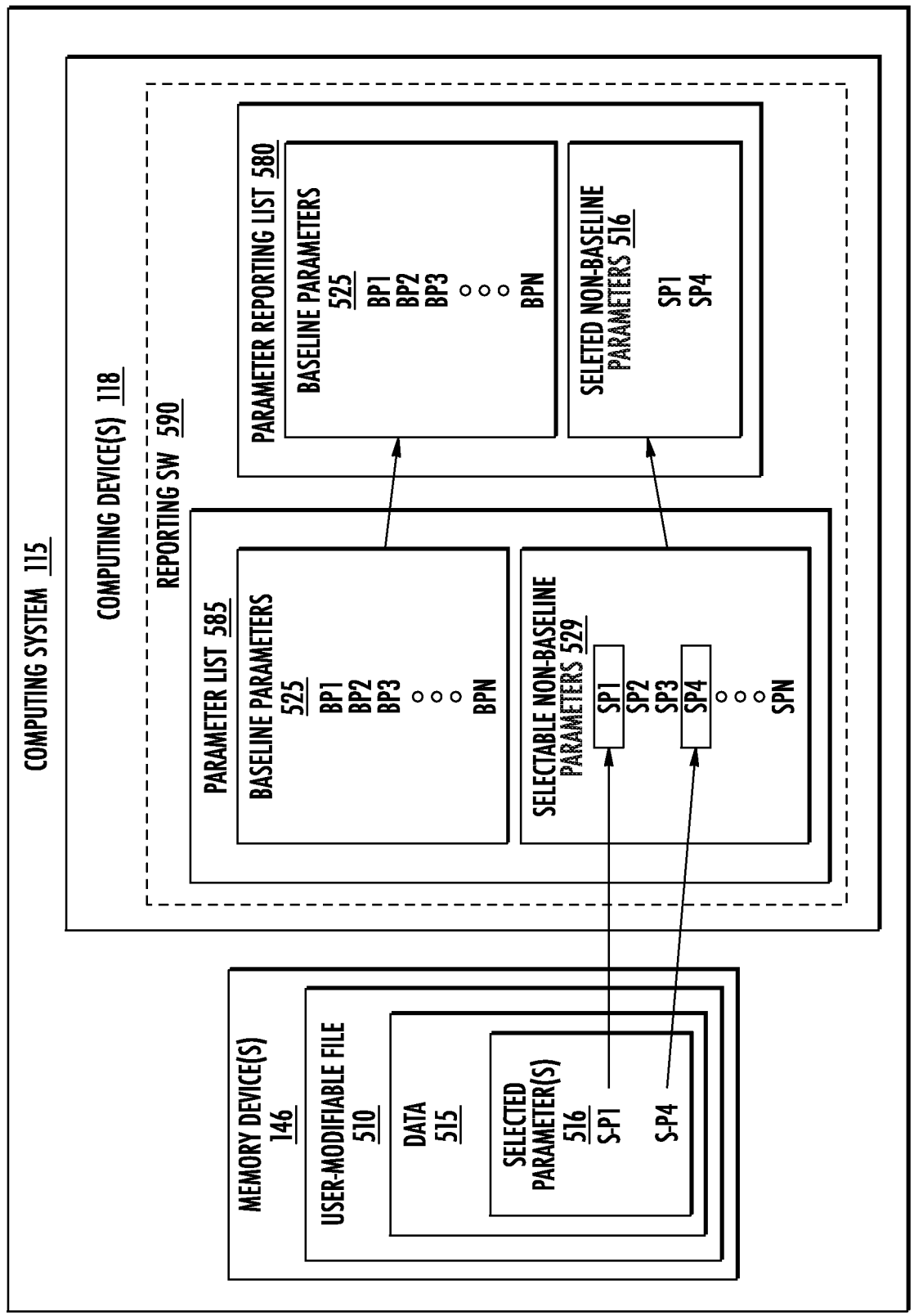
FIG. 13 provides a schematic view of a computing device associated with an engine of an aircraft generating a parameter reporting list.

Updating a Parameter List with Selected Parameters and Transmitting Engine Data During Flight Referring now generally to FIGS. 1, 10, 11, 12, and 13, an example manner in which a FADEC system can be queried in-flight or on the ground to record select FADEC parameter values within a particular recording window will now be provided. Further, an example manner in which a FADEC system can transmit the recorded FADEC parameter values will also be provided. In some instances, as noted above, a field event can occur in which an engine experiences anomalous or unexpected behavior. It may be desirable to immediately or quickly obtain engine data in response to the field event. For instance, it may be desirable to immediately start recording certain FADEC parameter values in response to an in-flight engine flameout and restart. In other instances, it may be desirable to query the FADEC system during a mission to "look back" and compile parameter values already recorded during a preselected past time window. The systems and methods described herein enable such functionality. FIG. 10 provides a flow diagram for an example method (400) of querying a FADEC system, recording parameter values associated with selected parameters contained within the query, and transmitting the recorded data, e.g., to a remote station. The FADEC system can be associated with one or more engines, such as the one or more engines 114 of the aircraft 110 of FIG. 1, for example. It will be appreciated that exemplary method (400) can be modified, adapted, expanded, rearranged and/or omitted in various ways without deviating from the scope of the present subject matter. FIG. 11 provides a schematic view of a system 500 configured to implement method (400). FIG. 12 provides a schematic block diagram depicting a user-modifiable file of a data query being stored in one or more memory devices of the computing system of a vehicle. FIG. 13 provides a schematic view of a computing device associated with an engine of the vehicle generating a parameter reporting list.

At (402), a field event can occur. For instance, one or more of the engines 114 of the aircraft 110 of FIG. 1 can experience anomalous or unexpected behavior during operation. For example, one or more of the engines 114 of the aircraft 110 can experience an unexpected engine shutdown or flameout during flight and then can be restarted or attempted to be restarted. As yet another example, one or more of the engines 114 of the aircraft 110 can experience unexpected behavior during takeoff or during a climb phase of a flight. As a further example, one or more of the engines 114 of the aircraft 110 can experience unexpected behavior in a particular geographic area or in proximity to some natural occurring event, such as a volcanic eruption or a dust storm. Accordingly, a field event can occur when one or more engines experience anomalous or unexpected behavior during operation or upon the occurrence of some predefined event, such as the engine's proximity to an area or point of interest.

At (404), the method (400) includes generating, by one or more remote computing devices, a data query containing a user-modifiable file that includes one or more selected parameters. For instance, as shown in FIG. 11, the one or more remote computing device(s) 156 of the remote station 150 can generate a data query 508 containing a user-modifiable file 510. The user-modifiable file 510 of the data query 508 can include a header 512 and a payload 514. The header 512 includes data (e.g., metadata) indicative of, without limitation, cryptographic information, a time stamp, a query version or release number indicating the version of the data query 508, checksum information, as well as other useful information.

As depicted in FIG. 12, the payload 514 of the user-modifiable file 510 includes data 515. The data 515 of the payload 514 can include a selected parameter(s) list containing one or more selected parameters 516 to be recorded, e.g., during the current flight or engine cycle. That is, the one or more selected parameters 516 of the user-modifiable file 510 are FADEC parameters for which the computing device(s) 118 are to record parameter values for during engine operation. The selected parameters 516 can be any selectable FADEC parameter. In some embodiments, the selected parameters 516 can be non-baseline parameters. The selected parameters 516 can be represented on or defined by the user-modifiable file 510 in any suitable manner. For instance, each selected parameter 516 can be represented or defined by the user-modifiable file 510 as a memory address or location where a selected parameter 516 is stored or indexed on one or more memory devices of the computing system 115 (FIG. 1) of the aircraft 110 (FIG. 1). In this way, as will be explained below, the selected parameters 516 can be efficiently mapped with or to selectable parameters of a parameter list stored on one or more memory device, e.g., of one or more of the computing devices 118.

The data 515 of the user-modifiable file 510 can also include one or more parameter settings associated with the one or more selected parameters 516. For instance, as shown in FIG. 12, the one or more parameter settings associated with the one or more selected parameters 516 can include a data sampling rate 520 indicating a rate or frequency at which parameter values for the one or more selected parameters 516 are to be recorded, e.g., by the computing devices 118 of the FADEC system. The data sampling rate 520 can be any suitable rate, including for example, once per second, three times per second, twenty times a second, etc. The one or more parameter settings associated with the one or more selected parameters 516 can also include recording windows 518 indicating when parameter values for the one or more selected parameters 516 are to be recorded, e.g., by the computing devices 118 of the FADEC system. That is, the recording windows 518 indicate time periods in which the computing device(s) 118 are to record selected parameter values 536 associated with their respective selected parameters 516. In some implementations, the computing device(s) 118 record the one or more selected parameter values 536 associated with the one or more selected parameters 516 of the data query 508 only during their respective recording windows 518.

For the embodiment of FIG. 12, the selected parameters list of the data 515 includes a first selected parameter S-P1, a second selected parameter S-P2, a third selected parameter S-P3, and so on to the Nth selected parameter S-PN. As shown, the first selected parameter S-P1 has an associated data sampling rate DSR1 and recording window RW1, the second selected parameter S-P2 has an associated data sampling rate DSR2 and recording window RW2, the third selected parameter S-P3 has an associated data sampling rate DSR3 and recording window RW3, and so on such that the Nth selected parameter S-PN has an associated data sampling rate DSRN and recording window RWN. The data sampling rates 520 can be the same for each selected parameter 516 or they can be different. Likewise, the recording windows 518 can be the same for each selected parameter 516 or they can be different. The recording windows RW1, RW2, RW3, RWN each indicate the time period in which parameter values for their respective selected parameters are to be recorded. It will be appreciated that the data 515 of the user-modifiable file 510 can include other parameter settings associated with the one or more selected parameters 516.

The data 515 of the user-modifiable file 510 can further include a transmission rate 522 indicating the frequency or interval at which a query response file 530 (FIG. 11) is to be transmitted, e.g., from the aircraft 110 to the remote station 150. In some implementations, the transmission rate 522 provided in the data query 508 can set the transmission rate such that the query response file 530 is transmitted after all recorded parameter values (i.e., the recorded selected parameter values 536, and in some implementations, recorded baseline parameter values 538) are recorded during their respective recording windows 518 and are compiled into the query response file 530. Advantageously, in such implementations, transmissions from the aircraft 110 to the remote station 150 are minimal and thus data usage and transmission costs are minimized.

In some implementations, as noted above, the data query 508 containing the user-modifiable file 510 that includes the one or more selected parameters 516, the recording windows 518 associated with the selected parameters 516, and the data sampling rates 520 associated with the selected parameters 516 is generated by the one or more remote computing device(s) 156. For instance, in some example implementations, the remote station 150 can be an engine monitoring station. The engine monitoring station can be positioned on the ground or onboard another vehicle. The engine monitoring station can monitor engines of an aircraft fleet, such as a fleet that includes the engine(s) 114 of the aircraft 110 of FIG. 1, for example. During engine operation, the transceiver(s) 154 of the remote station 150, or engine monitoring station in this example, can receive a communication from the aircraft 110 and/or engine(s) 114 (e.g., from one or more of the communication units 125, 126) indicating that one or more of the engine(s) 114 have experienced anomalous or unexpected engine behavior relative to an expected or baseline engine behavior (e.g., as determined by a model in view of the operating and/or environmental conditions in which the aircraft 110 and/or engine(s) 114 are operating), or more broadly, that a field event has occurred.

For instance, the computing device(s) 118 can generate an in-mission or in-flight fault in response to unexpected behavior and the communication can indicate the type of in-flight fault. The received communication can be routed to the one or more remote computing device(s) 156 for processing and data analysis. Based at least in part on the received communication, the one or more remote computing device(s) 156 can select or define the selected parameters 516, the one or more recording windows 518 or time periods of interest associated with the selected parameters 516, the data sampling rates 520 associated with the selected parameters 516, and the transmission rate 522 and can generate the data query 508 containing the user-modifiable file 510 accordingly. That is, the user-modifiable file 510 of the generated data query can include the defined selected parameters 516, recording windows 518, data sampling rates 520, and transmission rate 522. As one example, the one or more remote computing device(s) 156 can define the selected parameters 516, the recording window 518, the data sampling rates 520 and the transmission rate 522 based at least in part on the in-flight fault or fault code.

The one or more remote computing device(s) 156 can define the selected parameters 516, recording window 518, data sampling rates 520, and the transmission rate 522 in response to a field event. For instance, the computing device(s) 118 and/or remote computing device(s) 156 can determine the conditions of the field event, the type of field event, etc., and based on the determined conditions, the field event type, etc., the one or more remote computing device(s) 156 can define the selected parameters 516, recording window 518, data sampling rates 520, and transmission rate 522 to generate the data query 508. Anomalous or unexpected engine behavior can also be detected by a pilot or crewmember based on observation of the engines 114 or flight deck instruments. For instance, a crewmember can send a communication to the engine monitoring station (or remote station 150) indicating the unexpected engine behavior, and based on the communication, the one or more remote computing device(s) 156 can define the selected parameters 516, recording window 518, data sampling rates 520, and transmission rate 522 to generate the data query 508 containing the user-modifiable file 510. In some implementations, the selected parameters 516, recording window 518, data sampling rates 520, and data transmission rate 522 can be defined for other suitable reasons, e.g., to perform a study or an investigation on the health of one or more components of the engines 114.

In some further implementations, the one or more remote computing device(s) 156 can define the selected parameters 516, recording windows 518, data sampling rates 520, and transmission rate 522 without receiving a communication from the aircraft 110. For example, if the engine monitoring station (e.g., the remote station 150) determines that the aircraft 110 is operating in a particular region or within proximity to a point of interest, the one or more remote computing device(s) 156 can define or select the selected parameters 516, recording windows 518, data sampling rates 520, and/or the transmission rate 522 and a data query containing a user-modifiable file can be generated accordingly. As one example situation, the aircraft 110 may be taking off at a particular high-altitude airport and the engines of one or more aircrafts that took off from the high-altitude airport prior to the aircraft 110 may have experienced and reported anomalous engine operation. The one or more remote computing device(s) 156 can define the selected parameters 516, recording window 518, data sampling rates 520, and/or the transmission rate 522 based on the communications received from the aircrafts that took off from the high-altitude airport prior to the aircraft 110 to better understand the engine conditions during takeoff from the high-altitude airport.

At (406), the method (400) includes transmitting/receiving the data query containing the user-modifiable file. The generated data query 508 containing the user-modifiable file 510 can be transmitted to the aircraft 110 in any suitable manner, such as by any of the transmission techniques described herein. The data query 508 can be transmitted to the aircraft 110, or more particularly to the FADEC system of the aircraft 110, when the aircraft 110 is performing a mission, i.e., a flight between an origin and a destination. The data query 508 can be transmitted to the aircraft 110 while the aircraft 110 is in the air, near an airport, or over the ocean, for example. For instance, transceivers 154 of the remote station 150 can transmit the data query 508 to the aircraft 110 while the aircraft 110 is performing a mission. As shown in FIG. 11, one or more of the communication units 125, 126 can receive the data query 508 from the one or more transceivers 154 of the remote station 150. In some implementations, the data query 508 is encrypted and one or more of the communication units 125, 126 can decrypt the received data query 508. The decrypted data query 508 can then be routed to the computing devices 118 of the FADEC system or some other computing device onboard the aircraft 110. Accordingly, the computing devices 118 and/or some other computing device onboard the aircraft 110 can receive the generated data query 508. In some implementations, the data query 508 is decrypted by the computing devices 118 or by some other intermediary computing device instead of the communication units 125, 126.

At (408), the method (400) includes storing the user-modifiable file of the received data query in one or more memory devices of the computing system of the vehicle. For instance, FIG. 12 provides a schematic block diagram depicting the user-modifiable file 510 being stored in one or more memory devices 146 of the computing system 115 of the aircraft 110. In some implementations, the one or more memory devices 146 where the user-modifiable file 510 is stored can be one or more memory devices of one or multiple computing devices 118. Accordingly, the user-modifiable file 510 can be routed to one or more of the computing devices 118. The computing devices 118 can receive and store the user-modifiable file 510, e.g., in one or more memory devices thereof.

In other implementations, the user-modifiable file 510 of the data query 508 can be routed to and stored in one or more computing devices onboard the aircraft 110 other than the computing devices 118. As one example, the user-modifiable file 510 can be routed to and received and stored by one or more computing devices positioned within the avionics bay 120. In other implementations, the user-modifiable file 510 can be routed to and received and stored on one or more memory devices of the communication units 125, 126. Further, in some implementations, the memory location where the user-modifiable file 510 is stored is a dedicated memory location that is configured to only store the user-modifiable file 510. In this way, the contents of the user-modifiable file 510 can be more easily found, accessed, and read, e.g., by engine reporting software executed by the computing devices 118.

At (410), the method (400) can include performing a compatibility check on the contents of the data query, and more specifically on the contents of the user-modifiable file of the data query. For instance, once the user-modifiable file 510 is transmitted and received at (406) and then stored at (408), the computing device(s) 118 and/or other computing device(s) of the aircraft 110 can determine the integrity and/or compatibility of the contents of the user-modifiable file 510 with the hardware, software, firmware, etc. of the computing device(s) 118. In one aspect of performing the compatibility check at (410), the computing device(s) and/or computing devices 118 can determine whether the user-modifiable file 510 was successfully uploaded or transmitted to the aircraft 110 by performing one or more data integrity operations, e.g., cyclic redundancy checks, checksum checks, cryptographic checksums and digital signatures, etc. In some implementations, if the user-modifiable file 510 does not pass the data integrity operation(s), the user-modifiable file 510 can be ignored. On the other hand, if the user-modifiable file 510 passes the data integrity operation(s), the computing device(s) and/or computing devices 118 can proceed to (412).

At (412), the method (400) includes designating, by reporting software executed on at least one of the one or more computing devices of the aircraft (e.g., the computing devices 118), parameters to record without modifying the reporting software, wherein the parameters to record include the one or more selected parameters of the user-modifiable file contained within the received data query. In some implementations, designating parameters to record includes generating a parameter reporting list, wherein the parameters on the parameter reporting list designate the parameters to be recorded, e.g., by the computing devices 118. The parameter reporting list can contain or include the one or more selected parameters noted in the user-modifiable file 510, and in some implementations, one or more baseline parameters 525. For instance, one or more of the computing devices 118 can generate or modify a parameter reporting list 580 containing the one or more selected parameters 516 received as part of the user-modifiable file 510 along with the one or more baseline parameters 525. That is, the computing devices 118 can generate a list of parameters to be recorded by the computing devices 118. The plurality of baseline parameters 525 can be fixed within reporting software of the FADEC system. Further, as noted previously, as used herein and in the appended claims, generating a file means creating a new file or modifying or updating an existing file. Accordingly, in some implementations, the computing devices 118 can create a new parameter recording list containing the baseline parameters 525 and the selected parameters 516. In other implementations, the computing devices 118 can modify or update an existing parameter list containing the baseline parameters 525 and selected parameters 516.

FIG. 13 provides a schematic block diagram of one computing device 118 generating a parameter reporting list 580. As shown, reporting software 590 (e.g., engine reporting software in this embodiment) is executable by the one or more processing devices of the computing device 118. Particularly, the reporting software 590 includes instructions that, when executed by the one or more processors, cause the one or more processing devices of the computing device 118 to generate the parameter reporting list 580. Further, as will be explained below, the reporting software 590 includes instructions that, when executed, cause the one or more processing devices of the computing device 118 to record values associated with the parameters in the parameter reporting list 580, e.g., during engine operation.

As depicted in FIG. 13, the computing device 118 includes a parameter list 585 that includes parameters for which the computing device 118 can record parameter values. The parameter list 585 can contain any suitable number of parameters. For this embodiment, the parameter list 585 includes baseline parameters 525 and selectable parameters 529, which can be non-baseline parameters. In some implementations, the baseline parameters 525 are always recorded by the computing device 118, e.g., during engine operation, and the selectable non-baseline parameters 529 are not generally recorded by the computing device 118 unless the computing device 118 is otherwise instructed to do so. In some embodiments, the parameter list 585 is fixed within the reporting software 590 and is modifiable only by changing the source code of the reporting software 590. For the embodiment of FIG. 13, the baseline parameters 525 include a first baseline parameter BP1, a second baseline parameter BP2, a third baseline parameter BP3, and so on to the Nth baseline parameter BPN. The selectable non-baseline parameters 529 include a first selectable parameter SP1, a second selectable parameter SP2, a third selectable parameter SP3, a fourth selectable parameter SP4, and so on to the Nth selectable parameter SPN.

To generate the parameter reporting list 580, the reporting software 590, when executed, accesses and reads the user-modifiable file 510. Particularly, the reporting software 590 first accesses the user-modifiable file 510, which is stored on the one or more memory devices 146 of the computing system 115. Once accessed, the reporting software 590, when executed, reads the selected parameters 516 contained within the user-modifiable file 510. In some implementations, the reporting software 590 can access and read, but not write, to the user-modifiable file 510. This may prevent inadvertent modification of the user-modifiable file 510. As noted above, the selected parameters 516 can be represented or defined in any suitable manner, such as by a memory address indicating where a selectable parameter 529 is indexed on the computing system 115. For the embodiment of FIG. 13, the selected parameters 516 contained within the user-modifiable file 510 include a first selected parameter S-P1 and a fourth selected parameter S-P4.

Once the reporting software 590 accesses and reads the user-modifiable file 510, the reporting software 590, when executed, maps the selected parameters 516 contained within the user-modifiable file 510 with the selectable non-baseline parameters 529. In the example embodiment of FIG. 13, the first selected parameter S-P1 corresponds with the first selectable parameter SP1 and the fourth selected parameter S-P4 corresponds with the fourth selectable parameter SP4. The first selected parameter S-P1 can be representative of a memory location where the first selectable parameter SP1 is stored on the computing device 118 and the fourth selected parameter S-P4 can be representative of a memory location where the fourth selectable parameter SP4 is stored on the computing device 118, for example. Accordingly, the reporting software 590, when executed, maps the first selected parameter S-P1 with the first selectable parameter SP1 and the fourth selected parameter S-P4 with the fourth selectable parameter SP4. The mapped parameters are designated for inclusion on the reporting parameter list 580 by the reporting software 590.

In FIG. 13, for example, the mapped first selectable parameter SP1 and fourth selectable parameter SP4 are designated for inclusion in the generated or modified parameter reporting list 580. As a result, the generated or modified parameter reporting list 580 includes baseline parameters 525, including BP1, BP2, BP3, up to the Nth or BPN baseline parameter, and selected parameters 516, including SP1 and SP4. In the event a selected parameter 516 contained within the user-modifiable file 510 is unable to be mapped to a selectable non-baseline parameter 529, the selected parameter 516 contained within the user-modifiable file 510 can be ignored by the reporting software 590. Further, an error notification can be generated, e.g., by executing the reporting software 590, and the error notification can be provided to a user and can indicate that one or more of the selected parameters 516 of the user-modifiable file 510 contained within the data query 508 was unable to be mapped to any of the selectable parameters 529 of the parameter list 585.

Moreover, in generating the parameter reporting list 580, one or more parameter settings associated with a selected parameter can be included in the generated or modified parameter reporting list 580. As one example, the data sampling rate or frequency at which values for the selected parameter are to be recorded can be linked to the selected parameter in the generated or modified parameter reporting list 580. As another example, a recording window indicating the time period in which parameter values for a selected parameter are to be recorded can be linked to the selected parameter in the generated or modified parameter reporting list 580. It will be appreciated that other parameter settings can be linked to the selected parameters 516 in the generated or modified parameter reporting list 580.

Notably, in generating the parameter reporting list 580, neither the reporting software 590 nor any other engine software is changed, altered, or otherwise modified. That is, the reporting software 590, when executed, can read selected parameters 516 from the uploaded user-modifiable file 510, map the selected parameters 516 to the selectable parameters 529 of the parameter list 585, and designate the mapped parameters for inclusion in the parameter reporting list 580 along with the baseline parameters 525 without changing, altering, or otherwise modifying the reporting software 590 or any other engine software. In this manner, parameters can be added and/or removed from the parameter reporting list 580 without need for lengthy software code certification processes, among other benefits.

At (414), the method (400) includes receiving sensor data from one or more sensors. For instance, as shown in FIG. 11, the computing devices 118 can receive sensor data from one or more engine sensors 210. The one or more sensors 210 can sense or measure values for parameters relating to the engine(s) 114, such as e.g., fan speed, core speed, temperatures at various stations along the core air flowpath, etc. Signals from the sensors 210 can be routed to the computing device(s) 118 and processed. The computing device(s) 118 can then calculate or predict values for other parameters, such as exhaust gas temperature, mass flow at various stations of the engine(s) 114, stall margin remaining, etc. In addition, in some implementations, the computing device(s) 118 can receive sensor data from one or more vehicle sensors 212 positioned onboard the aircraft 110. Sensor outputs received from the one or more vehicle sensors 212 can be received as part of vehicle data transmitted to the computing devices 118 (e.g., over data communication link 124 (FIG. 1)) from the vehicle interface unit 122. Moreover, engine data, which includes sensed and calculated values for certain engine parameters, can be transmitted to the vehicle interface unit 122 and ultimately to one or more vehicle systems 160. For instance, engine data indicative of a thrust output of the engine(s) 114 can be displayed on a display device positioned within the cockpit 116.

At (416), the method (400) includes recording engine operating data. For instance, the reporting software 590, when executed by the computing device(s) 118, can record parameter values for the one or more parameters in the generated parameter reporting list 580 based at least in part on the received sensor data while the aircraft 110 is performing the mission (e.g., a flight mission). For instance, the sensed, calculated, and/or predicted parameter values for the engine and/or aircraft parameters, including both baseline parameters 525 and selected parameters 516, can be recorded and compiled into the query response file 530 as shown in FIG. 11. The computing device(s) 118, and particularly the one or more processors of the computing device(s) 118 executing the instructions of the reporting software 590, can write to the query response file 530 continuously or on a rolling basis as data is recorded or at a predetermined interval, such as e.g., every 15 milliseconds, every 25 milliseconds, or every second. Parameter values 536 for the selected parameters 516 can be recorded by the computing device(s) 118 within their respective recording windows 518 and at their respective data sampling rates 520 specified in the data query 508. Likewise, parameter values 538 for the baseline parameters 525 can be recorded by the computing device(s) 118 at their respective data sampling rates specified in the reporting software 590 (FIG. 13). The parameter values 536, 538 can be sensed, calculated, and/or predicted values that are based on the received sensor data, e.g., at (414).

As shown best in FIG. 11, the query response file 530 includes a header 532 and a payload 534. The header 532 includes data (e.g., metadata) indicative of, without limitation, cryptographic information, a time stamp, the version or release number of the user-modifiable file 510 and/or received data query 508 used to designate the parameters to record, checksum information, communication logs, error logs, etc. as well as other information. The payload 534 of the query response file 530 includes recorded values for the parameters listed in the generated parameter reporting list 580, including recorded selected parameter values 536 associated with the selected parameters 516 and recorded baseline parameter values 538 associated with the baseline parameters 525. The query response file 530 can be a binary, machine-readable file, for example.

In some implementations, the one or more processors of the computing system 115 are configured to record data using the generated parameter reporting list 580 and the received sensor data in response to the data query 508 in-flight or during the current operation cycle of the engine(s) 114. Stated another way, parameter values for select parameters can be recorded by the computing device(s) 118 executing the reporting software 580 for a targeted time period or condition upon receiving the received data query 508. The data query 508 can be received while the aircraft 110 is in the air, on the ground, near an airport, over the ocean, etc. In this way, selected parameters of interest can be communicated to the FADEC system mid-operation of the engine(s) 114 and parameter values for the selected FADEC parameters can be recorded in real time or near real time in response to receiving a transmitted data query 508.

When the one or more processors (e.g., of one or more computing devices) determine that a user-modifiable file 510 has been received, the method (400) proceeds from (408) through (416). Particularly, the method (400) proceeds with designating, by the reporting software 590 executed on at least one of the one or more computing devices of the computing system 115, parameters to record without modifying the reporting software 590 and then recording engine operating data e.g., for at least the parameters included in the user-modifiable file 510. The recorded engine operating data, which includes the recorded selected parameter values 536 and recorded baseline parameter values 538, is compiled into the query response file 530. When the one or more processors (e.g., of one or more computing devices) determine that a user-modifiable file 510 has not been received or the recording windows 518 associated with the selected parameters 516 have expired or run their course, the reporting software 590 executed on at least one of the one or more computing devices of the computing system 115 can record parameter values for the baseline parameters 525 per normal operation. The reporting software 590, when executed, can generate or compile the query response file 530.

In some implementations, the reporting software 590, when executed, can generate or compile a query response file 530 that contains only recorded selected parameter values for the selected parameters included in the user-modifiable file 510 of the data query 508. In such implementations, at the same time, the reporting software 590, when executed, can generate a data file that includes recorded baseline parameter values for baseline parameters. In this way, the generation of a data file that includes parameter values for baseline parameters that are recorded regardless of whether a data query is received and the generation of a query response file that contains parameter values for specific queried parameters can coexist and function simultaneously.

At (418), the method (400) includes transmitting the query response file. For instance, the query response file 530 can be transmitted or otherwise downloaded from the aircraft 110 to the remote station 150 using any of these techniques described herein. For example, the query response file 530 can be wirelessly transmitted via one or more of the communication units 125, 126, e.g., to the ground station 150, to another aircraft or vehicle, etc. As another example, the query response file 530 can be wirelessly transmitted in-flight over SATCOM and/or Air to Ground (ATG) technology. As yet another example, the query response file 530 can be wirelessly transmitted over a cellular, Wi-Fi, and/or Bluetooth® network when on or near the ground (i.e., when within wireless range of a particular wireless network).

As noted above, the payload 514 of the user-modifiable file 510 can include a transmission rate 522 indicating the frequency at which the query response file 530 or a portion thereof is to be transmitted, e.g., from the aircraft 110 to the remote station 150. In some implementations, the transmission rate 522 provided in the data query 508 can set the transmission rate such that the query response file 530 is transmitted after all recorded parameter values (i.e., the recorded selected parameter values 536, and in some implementations, the recorded baseline parameter values 538) are recorded during the recording window 518 (e.g., a global recording window or when the recording windows have expired) and are compiled into the query response file 530. Advantageously, in such implementations, transmissions from the aircraft 110 to the remote station 150 are minimal and thus data usage and transmission costs are minimized.

In some implementations, the transmission rate 522 provided in the data query 508 can set the transmission rate such that the query response file 530 is transmitted in portions or as a series of data file packets. As one example, the transmission rate 522 provided in the data query 508 can set the transmission rate such that the query response file 530 is transmitted at a predetermined interval. For instance, the query response file 530 can be transmitted every second, every 5 seconds, every 15 seconds, etc. In this way, the one or more remote computing devices 156 of the engine monitoring station (e.g., remote station 150) can utilize the recorded parameter values 536, 538 associated with the selected parameters 516 and baseline parameters 525, respectively, to analyze the engine operation of the engines 114 in real time or near real time. As another example, the transmission rate 522 provided in the data query 508 can set the transmission rate such that the query response file 530 is transmitted upon the occurrence of a trigger condition, such as a file size threshold. The portions or data file packets of the query response file 530 can be reconstituted into the complete file, e.g., by the remote computing device(s) 156. In addition, the query response file 530 can be decrypted by the remote computing device(s) 156 if the query response file 530 is encrypted. The reconstituted and decrypted query response file 530 can be made available for visualization, analysis, archiving, etc., e.g., by the remote computing device(s) 156.

In some instances, it may be desirable to stop recording parameter values for the selected parameters defined in the uploaded user-modifiable file 510 and transmitting the recorded selected parameter values to a remote station via a query response file 530 prior to the expiration of the recording windows associated with the selected parameters. In such instances, a second data query can be transmitted to the vehicle 110. The second data query can be received by the computing device associated with an engine of the vehicle 110, such as one or more of the computing devices 118. The second data query can include a user-modifiable file that, when accessed and read, can cause the computing device to cease recording parameter values for the selected parameters and causing them to be transmitted.

In addition, in some implementations, a computing device associated with one or more of the engines 114 is configured to record parameter values for all possible parameters or at least more parameters than the baseline parameters. In such implementations, an entity can transmit an in-flight or in-operation parameter data query 508 to the vehicle 110, such as an aircraft. The parameter data query 508 can contain a user-modifiable file 510 that includes a list of one or more selected parameters 516 for which recorded parameter values are to be compiled into a query response file 530 based at least in part on a preselected past time window. The past time window can indicate the time period in which recorded parameter values for the selected parameters 516 are to be compiled into the query response file 530. The past time window is a period of time that has already occurred. Accordingly, the parameter data query 508 transmitted to the vehicle can be a "look back" request. This may allow an entity that has discovered unexpected engine behavior to "look back" at parameter values for selected parameters 516 that were recorded during the past time window, which can be selected as the time period corresponding to the unexpected engine behavior, to better understand the conditions of the engine during the unexpected behavior.

Reporting software 590 executable by the computing device associated with the one or more engines 114, such as a computing device 118, can access the user-modifiable file 510 and can generate a parameter reporting list 580 using the selected parameters 516. The parameter reporting list 580 can also include baseline parameters 525, which are parameters for which values are typically recorded regardless of whether a data query is received. Notably, neither the reporting software 590 nor any other engine software is modified in adding the selected parameters 516 to the parameter reporting list 580. In this way, lengthy certification processes are not needed despite the addition of the new parameters to the parameter reporting list 580, among other benefits. Parameter values for the parameters of the generated parameter reporting list 580 that were recorded during the past time period can be compiled into the query response file 530. The query response file 530 can be transmitted to the remote station 150 for analysis. The remote station 150, or remote computing devices 156 thereof, can analyze the recorded selected parameter values 536 associated with the selected parameters 516 and can send additional data queries to the vehicle 110 to further monitor the engines 114 and/or request that other parameters values be recorded for other past time periods.

The system 500 and method (400) described above enable in-flight or in-operation FADEC parameter queries. This may allow engine monitoring centers to query a FADEC system on an aircraft in-flight, or more broadly during operation, for data from specified parameters. Recorded parameter values for the specified parameters can then be transmitted to one or more remote stations, e.g., for analysis. Thus, the system 500 and method (400) provide a number of advantages. For instance, in-flight or in-operation FADEC parameter queries may increase the speed at which a parameter reporting list can be updated, e.g., from weeks or months to minutes as the reporting software executed by the computing devices 118 is not modified. Moreover, ground-based analytics and/or engineering teams can optimize operating costs by obtaining real time or near real time data as data queries can be sent to an aircraft or other vehicle to immediately request parameter values for selected parameters from specific engines of a fleet when needed. In addition, in-flight or in-operation FADEC parameter queries allow for engine monitoring stations to pinpoint data requests to a specific engine, time window, and parameter list. Moreover, aircraft and/or other vehicles of a fleet may remain in-service for a longer period, or conversely may drive earlier repairs to avoid possible out-station Aircraft On Ground (AOG) events.

Figure 14:
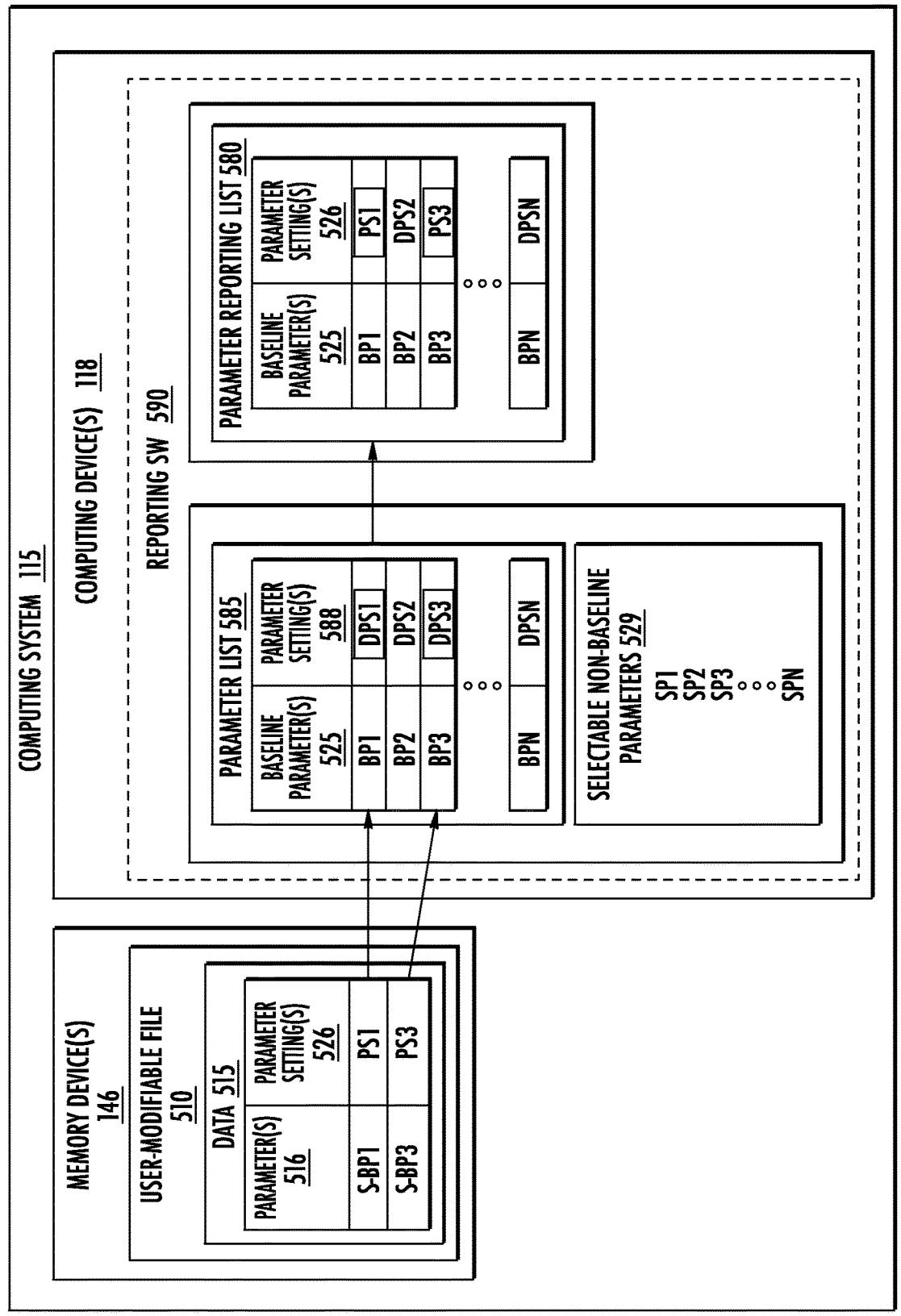
FIG. 14 provides a schematic view of a computing device of a vehicle propulsion system generating a parameter reporting list in which one or more parameter settings are changed.

In some implementations of system 500 or method (400), it may be desirable to change a parameter setting (e.g., a data sampling rate or recording window) of one or more of the parameters stored within the parameter list fixed within the reporting software. By way of example, FIG. 14 provides a schematic view of a computing device of a vehicle propulsion system generating a parameter reporting list 580 in which one or more parameter settings are changed. The computing device can be one of the computing device 118 and the vehicle propulsion system can be engine 114 of aircraft 110 (FIG. 1). The computing system 115 has one or more memory devices and one or more processors.

With reference to FIG. 14, the one or more processors are configured to receive a user-modifiable file 510 containing data 515 that includes parameter settings 526 associated with respective selected parameters 516. For instance, the user-modifiable file 510 can be received from a communication unit (e.g., communication unit 125 or 126; FIG. 1). The communication unit can receive the user-modifiable file 510 from a remote station via a data query (e.g., data query 508; FIG. 11). In this example, the user-modifiable file 510 includes selected parameters 516, including a first selected parameter S-BP1 and a third selected parameter S-BP3. The user-modifiable file 510 also includes parameter settings 526 associated with the selected parameters 516. For instance, a first parameter setting PS1 is associated with the first selected parameter S-BP1 and a third parameter setting PS3 is associated with the third selected parameter S-BP3. The first and third parameter settings PS1, PS3 can represent any suitable parameter setting, such as a data sampling rate or a recording window.

The one or more processors of the computing device 118 are configured to access and read the user-modifiable file 510 by executing reporting software 590 on at least one of the one or more processors (e.g., of the computing device 118). Once the user-modifiable file 510 is accessed and read, the one or more processors of the computing device 118 are configured to link or map the parameter settings 526 of the user-modifiable file 510 to a parameter of a parameter list 585. That is, each parameter setting associated with a selected parameter of the user-modifiable file 510 is linked or mapped to a parameter of the parameter list 585. Each baseline parameter 525 of the master parameter list 585 has one or more associated default or current parameter settings 588. In depicted example of FIG. 14, the first selected parameter S-BP1 of the user-modifiable file 510 corresponds with a first baseline parameter BP1 having an associated default or present first parameter setting DPS1. The third selected parameter S-BP3 of the user-modifiable file 510 corresponds with a third baseline parameter BP3 having an associated default or present third parameter setting DPS3. Accordingly, the first selected parameter S-BP1 of the user-modifiable file 510 is mapped to the first baseline parameter BP1 of the parameter list 585, and thus, the first parameter setting PS1 is mapped to the first baseline parameter BP1 of the parameter list 585. Similarly, the third selected parameter S-BP3 of the user-modifiable file 510 is mapped to the third baseline parameter BP3 of the parameter list 585, and thus, the third parameter setting PS3 is mapped to the third baseline parameter BP3 of the parameter list 585.

The one or more processors are configured to generate, by executing the reporting software 590 on the at least one of the one or more processors (e.g., of the computing device 118), a parameter reporting list 580 containing the parameters and their associated parameter settings mapped thereto. Notably, the reporting software 590 is not modified during mapping and generating. Stated another way, the reporting software 590, when executed, is not modified in mapping the parameter settings 526 to the parameters within the parameter list 585 and is not modified in generating the parameter reporting list 580. For the depicted example of FIG. 14, the parameter reporting list 580 is generated by the executed reporting software 590 such that the first baseline parameter BP1 has the first parameter setting PS1 (instead of the first default parameter setting DPS1), and such that the third baseline parameter BP3 has the third parameter setting PS3 (instead of the third default parameter setting DPS3). The parameter settings 526 for the second baseline parameter BP2 and all other parameters within the parameter reporting list 580 remain unchanged as shown.

After generating the parameter reporting list 580, the one or more processors are configured to receive sensor data from one or more sensors (e.g., engine sensors, aircraft sensors, etc.). Further, the one or more processors are configured to record parameter values for the parameters 525 (and in some instances selected parameters 516) in the generated parameter reporting list 580 based at least in part on the received sensor data and their respective parameter settings 526, including parameter settings mapped to their respective parameters 525 (e.g., PS1 and PS3).

The one or more processors can generate, by executing the reporting software 590, a query response file 530 (FIG. 11) that includes the parameter values recorded for the one or more parameters in the generated parameter reporting list 580. The one or more processors can also route the query response file 530, e.g., to a communication unit. Particularly, the one or more processors can cause a communication unit (e.g., the communication unit 125 of FIG. 1) to transmit at least a portion of the data query file 530 to a remote station (e.g., the remote station 150 of FIG. 1). The remote station can be a ground station or a second vehicle, for example. The data query file 530 can be transmitted to a remote station during the same flight or engine operating cycle in which the initial data query was received.

Although various embodiments have been described herein wherein the parameter list 585 distinguishes between baseline and non-baseline parameters, in some implementations of system 500 and method (400), the parameter list 585 does not distinguish between baseline and non-baseline parameters. In such embodiments, all possible parameters of the parameter list 585 can be selected and designated for inclusion in the generated parameter reporting list 580.

Figure 15:
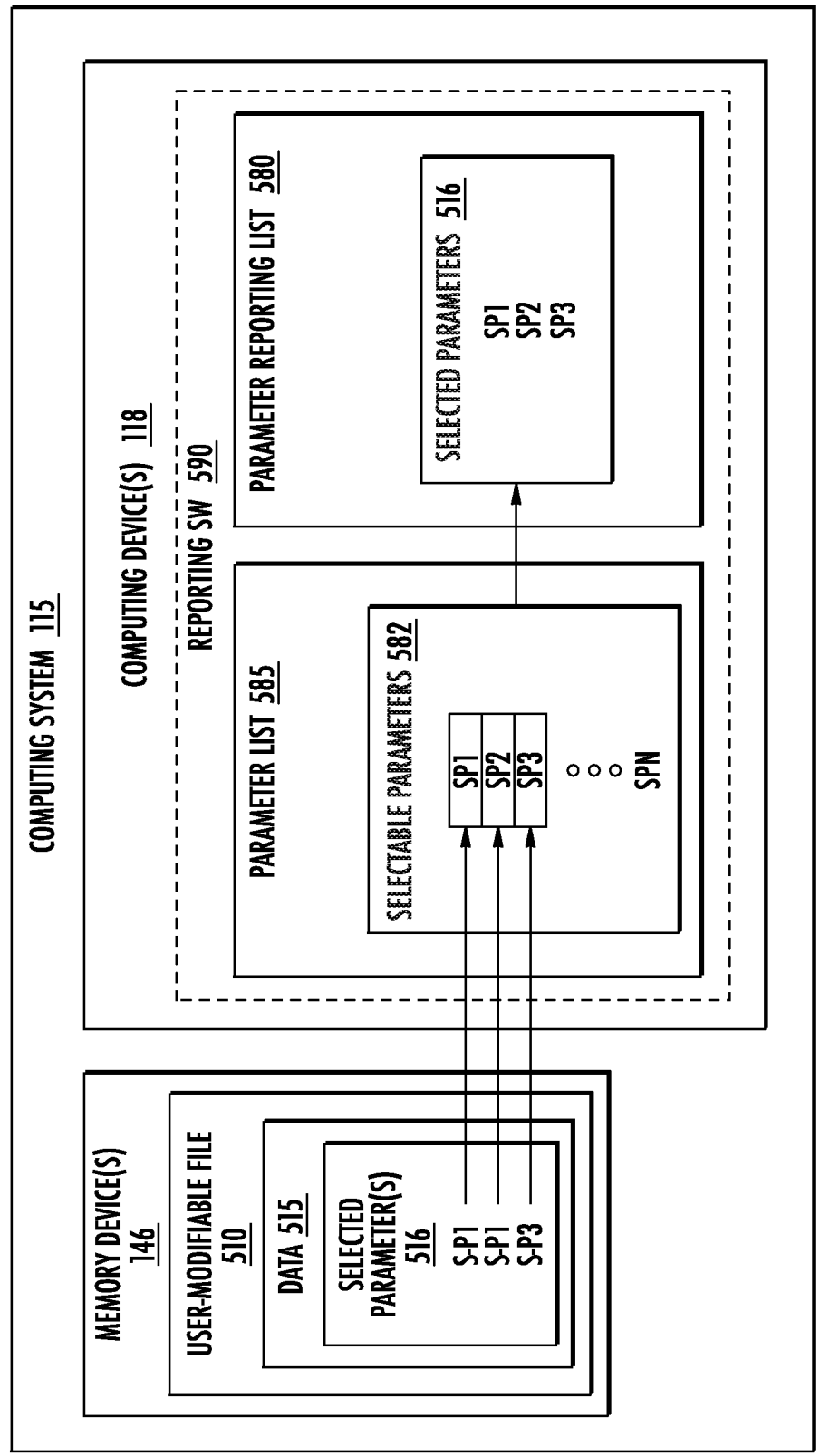
FIG. 15 provides a schematic view of a computing device of a vehicle propulsion system generating a parameter reporting list.

By way of example, FIG. 15 provides a schematic view of a computing device of a vehicle propulsion system generating a parameter reporting list. For this embodiment, the computing device can be computing device 118 and the vehicle propulsion system can be engine 114 of aircraft 110 (FIG. 1). The computing system 115 has one or more memory devices and one or more processors configured to receive a user-modifiable file 510 containing data 515 indicating one or more selected parameters 516 to record, e.g., during operation of the propulsion system. In some implementations, the data 515 of the user-modifiable file 510 (received as part of the data query 508; FIG. 11) indicates the one or more selected parameters 516 to record by representing each of the one or more selected parameters by a memory address or address structure. Particularly, the memory addresses representing the one or more selected parameters 516 to record can each indicate a memory location where the one or more selected parameters 516 are stored on the one or more memory devices of the computing system 115 (e.g., memory locations on the one or more memory devices of the computing device 118). In other implementations, the data 515 of the user-modifiable file 510 can indicate the one or more selected parameters 516 to record by other designations, such as by parameter name as defined in the reporting or control software, by part of a parameter name as defined in the reporting or control software, by a specific nomenclature or code as defined in the reporting or control software, by a position of a parameter within a parameter list, etc.

The one or more processors are further configured to generate, by executing reporting software 590 on at least one of the one or more processors, a parameter reporting list 580 containing the one or more selected parameters 516 without modifying the reporting software 590. In some implementations, in generating, by executing the reporting software 590 on at least one of the one or more processors, the parameter reporting list 580, the one or more processors are configured to read the user-modifiable file 510 containing the data 515 indicating the one or more selected parameters 516 to record. For instance, one or more processors of the computing device 118 can access and read the user-modifiable file 510 stored in the one or more memory devices 146, e.g., of a computing device of the computing system 115. In some embodiments, the one or more memory devices 146 are components of the computing device 118. In other embodiments, the one or more memory devices 146 are components of some other computing device onboard the aircraft 110. The received user-modifiable file 510 can be stored in a dedicated memory location. For the depicted embodiment of FIG. 15, the selected parameters 516 contained within the data 515 of the user-modifiable file 510 include a first selected parameter S-P1, a second selected parameter S-P2, and a third selected parameter S-P3.

After reading the user modifiable file 510, in generating the parameter reporting list 580, the one or more processors are configured to map the one or more selected parameters 516 with selectable parameters 582 of a parameter list 585 fixed within the reporting software 590. For the embodiment of FIG. 15, the parameter list 585 includes a first selectable parameter SP1, a second selectable parameter SP2, a third selectable parameter SP3, and so on to an Nth selectable parameter SPN. As depicted, the one or more processors map the selected parameters 516 (the first selected parameter S-P1, the second selected parameter S-P2, and the third selected parameter S-P3 in this example) with their respective selectable parameters 582 of the parameter list 585 (the first selectable parameter SP1, the second selectable parameter SP2, and the third selectable parameter SP3 in this example). Accordingly, the selectable parameters 582 of the parameter list 585 that are mapped with the one or more selected parameters 516 are designated for inclusion in the parameter reporting list 580.

In some implementations, the data 515 of the user-modifiable file 510 contains one or more parameter settings associated with the one or more selected parameters 516. As one example, the one or more parameter settings associated with the one or more selected parameters include a data sampling rate indicating a rate at which the parameter values for the one or more selected parameters are to be recorded. As another example, the one or more parameter settings associated with the one or more selected parameters include a recording window indicating when the parameter values for the one or more selected parameters are to be recorded. The parameter settings can be linked to their associated selectable parameters 582 and included in the parameter reporting list 580.

Once the parameter reporting list 580 is generated, the one or more processors are further configured to receive sensor data from one or more sensors (e.g., engine sensors, aircraft sensors, etc.). Further, the one or more processors are configured to record parameter values for the one or more selected parameters 516 in the generated parameter reporting list 580 based at least in part on the received sensor data. The one or more processors can generate, by executing the reporting software 590, a query response file that includes the parameter values recorded for the one or more selected parameters in the generated parameter reporting list 580. The one or more processors can also provide the query response file. For instance, the one or more processors can cause a communication unit (e.g., the communication unit 125 of FIG. 1) to transmit at least a portion of the query response file to a remote station (e.g., the remote station 150 of FIG. 1). The remote station can be a ground station or a second vehicle, for example. The data query file can be transmitted to a remote station during the same flight or engine operating cycle in which the initial data query was received.

FADEC Self-Select Parameters to Report in Response to Target Operating Conditions Many aircraft or vehicle engine problems occur on only a subset of an engine fleet. In some instances, it may be difficult to identify each engine in a fleet experiencing anomalous or unexpected behavior in response to a field event or particular operating conditions. For instance, it may be difficult to identify each engine of a fleet that may be subjected to certain field events, such as high ground temperatures, increased levels of volcanic ash, increased levels of dust or sand, or take offs at high altitude. It also may be difficult to identify each engine of a fleet experiencing unexpected behavior in response to certain operating conditions, such as when the exhaust gas temperature reaches a threshold within a predefined altitude range. Further, it may be difficult to identify each engine of a fleet experiencing problems during a phase of operation or flight, such as during engine start up, the climb phase of flight, or during a step climb.

In some instances, recording only the FADEC baseline parameters may be insufficient to properly observe and analyze the anomalous or unexpected engine operation. Accordingly, in such instances, it may be desirable to record selected non-baseline FADEC parameters in addition to the baseline parameters. Particularly, it may be desirable to record selected non-baseline FADEC parameters when specific target conditions are met. As will be described more fully below, systems, methods, aircrafts, engines, controllers, devices, and non-transitory computer-readable media for recording and communicating engine data are provided herein that allow an entity (e.g., an airframe manufacturer, an airline, an engine manufacturer, etc.) to upload or transmit a user-modifiable file that includes a set of target conditions and selected parameters to each aircraft or vehicle in a fleet or a designated subset thereof. The computing device(s) can monitor the operating conditions of the engine(s) and/or the aircraft to which the engine(s) are mounted, and when the target conditions are met, the computing device(s) can record parameter values associated with the one or more selected FADEC parameters. When the target conditions are no longer met, the computing device(s) can cease recording parameter values associated with the selected parameters. By allowing the computing device(s) to self-identify the target conditions, data usage is minimized while retaining the ability to quickly identify the correct subset of aircraft engines subject to the field event or operating conditions that cause anomalous or unexpected behavior.

Figure 16:
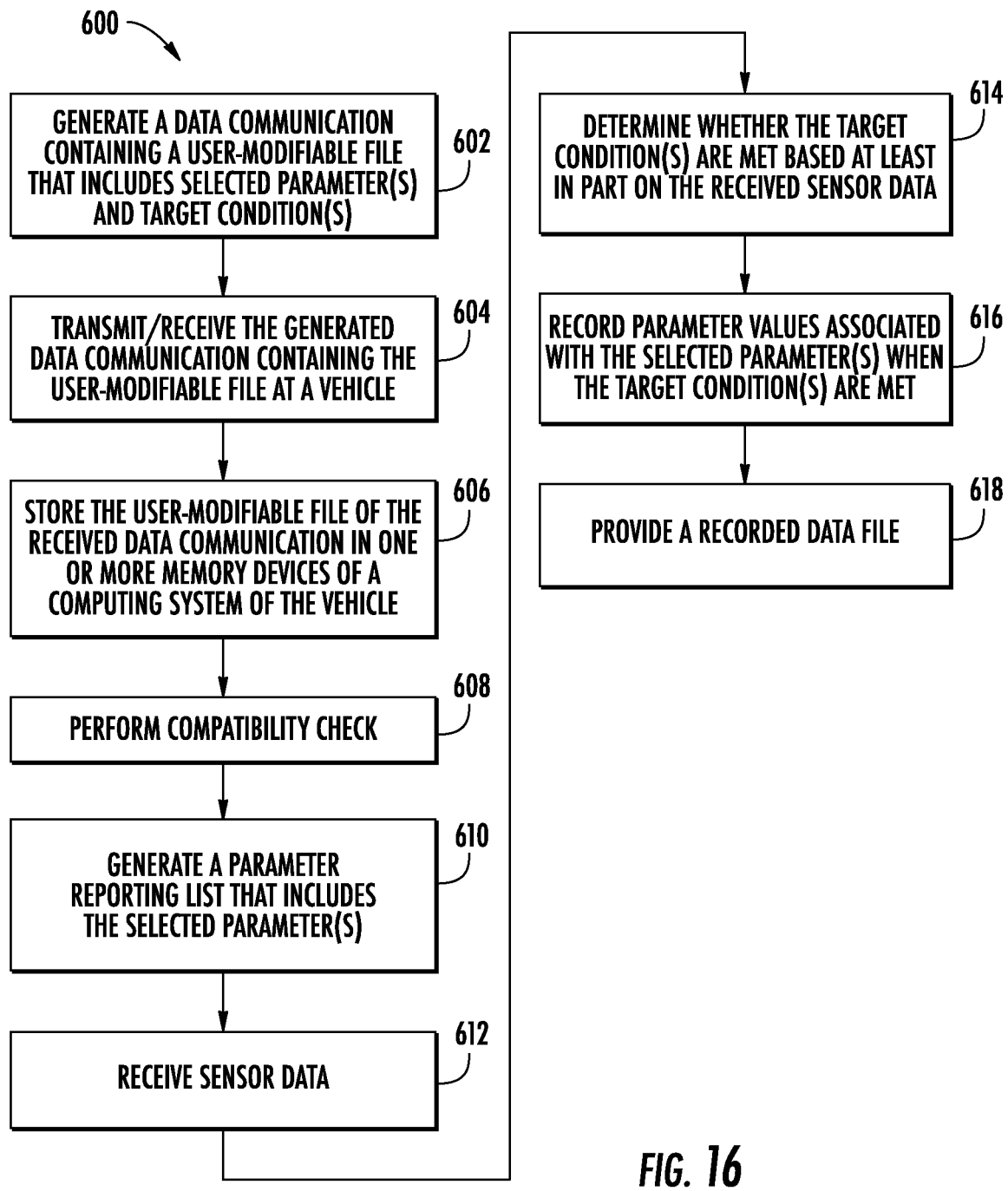
FIG. 16 provides a flow diagram for an example method of monitoring select parameters when one or more target conditions are met according to example embodiments of the present disclosure.
Figure 17:
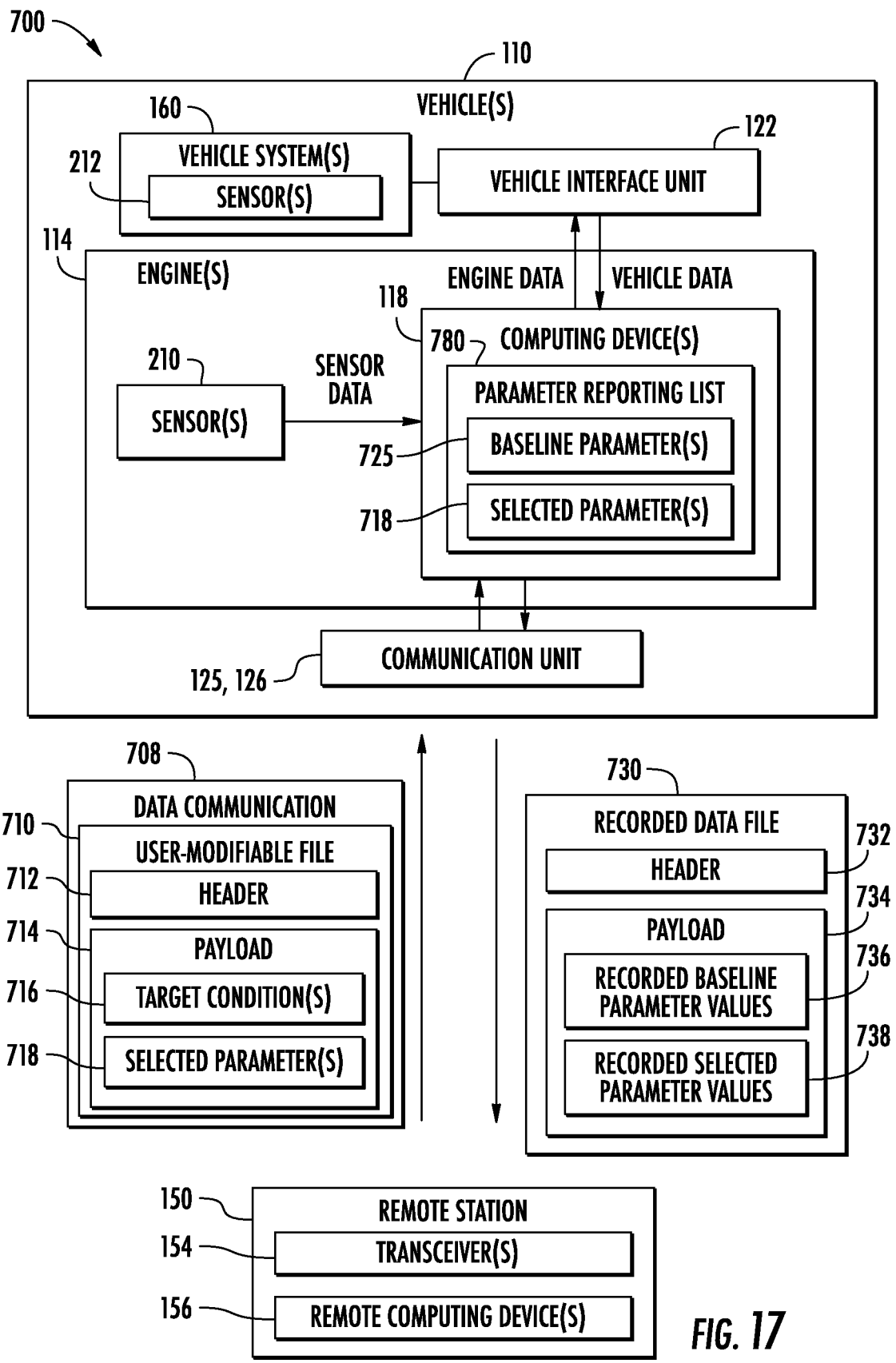
FIG. 17 provides a schematic view of a system configured to implement the method of FIG. 16.
Figure 18:
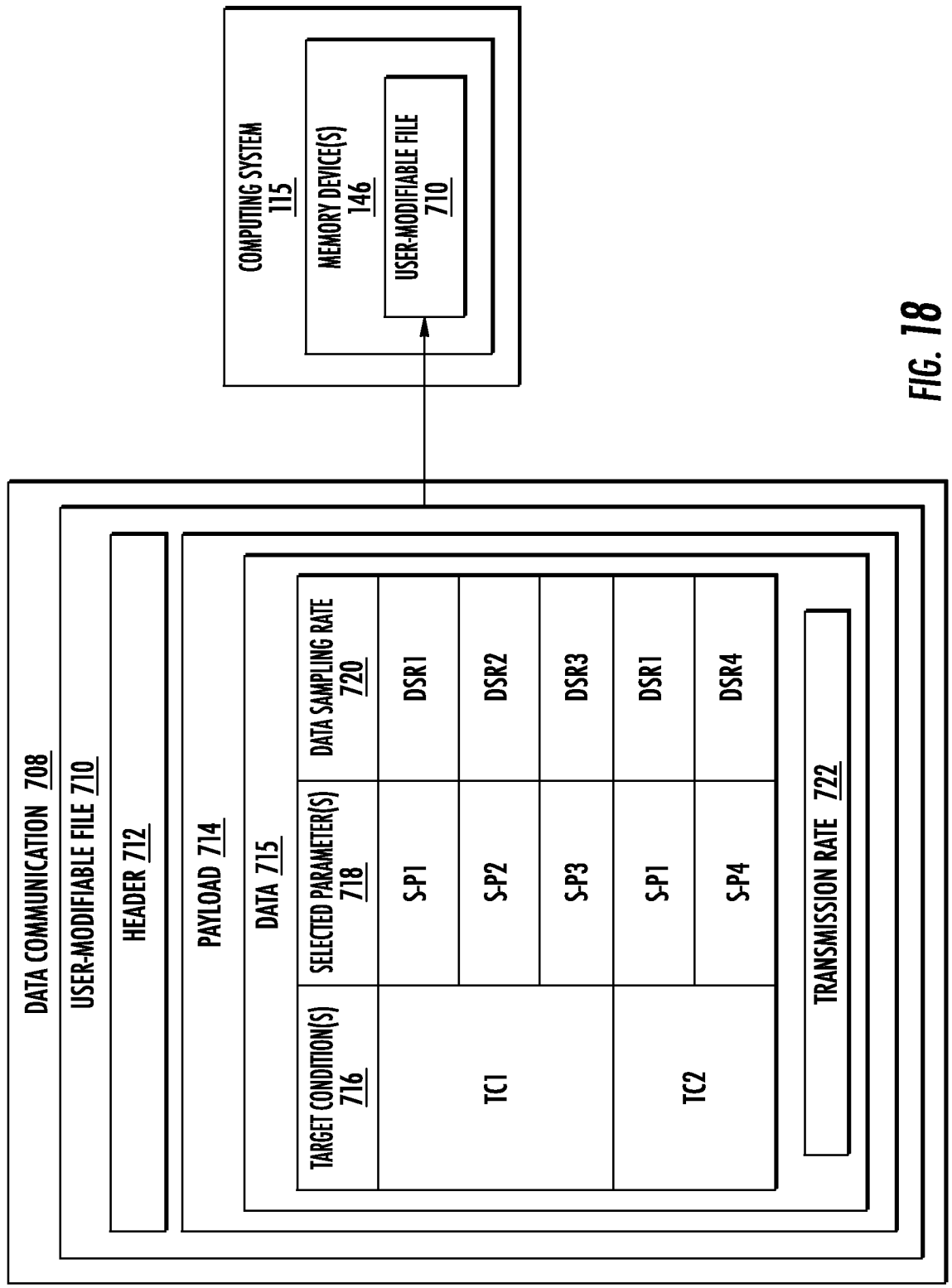
FIG. 18 provides a schematic block diagram depicting a user-modifiable file of a data communication being stored in one or more memory devices of a computing system of an aircraft.
Figure 19:
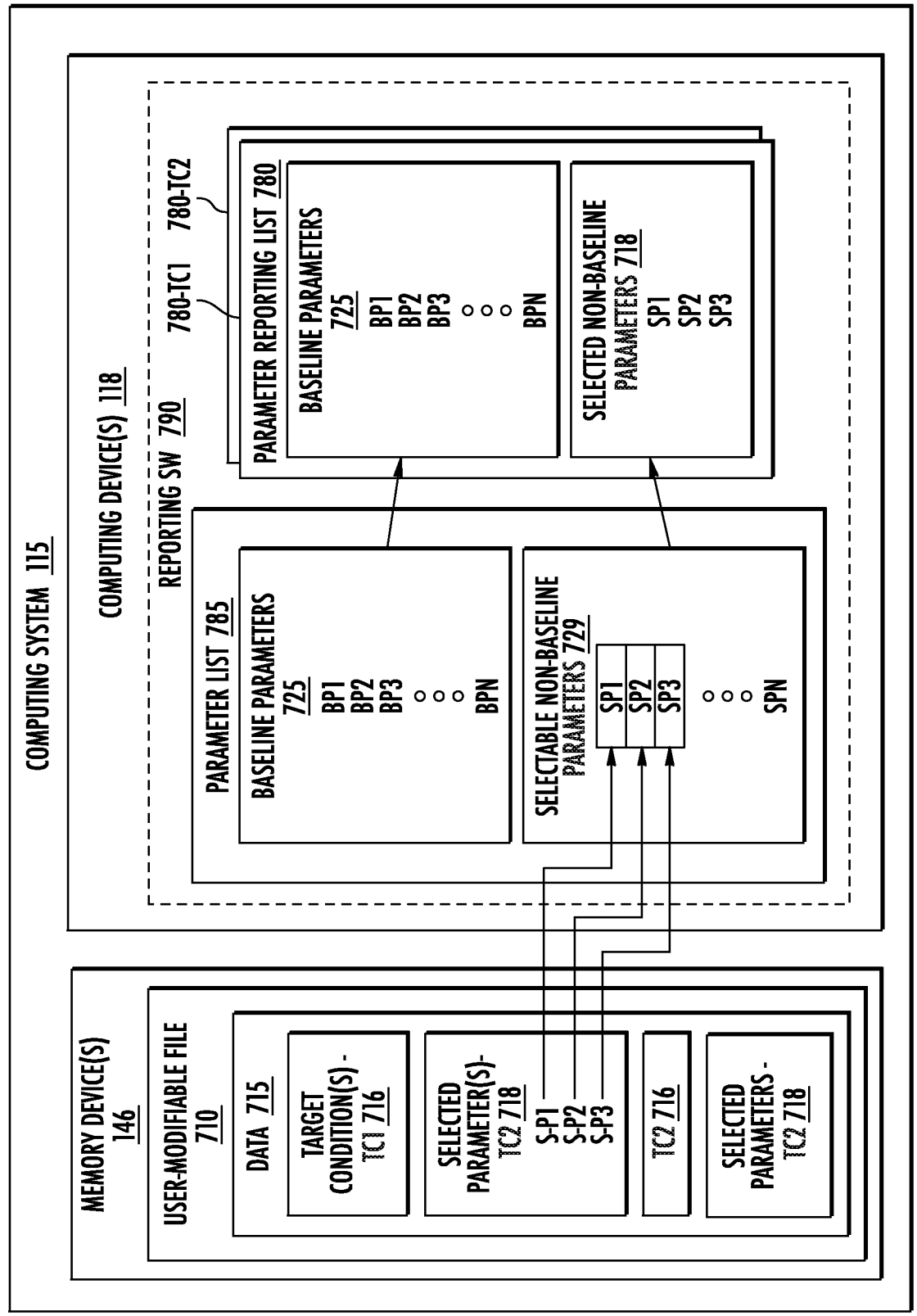
FIG. 19 provides a schematic view of a computing device associated with an engine of an aircraft generating a parameter reporting list.

Referring now generally to FIGS. 1, 16, 17, 18, and 19, an example manner in which a computing device associated with an engine can self-select parameters to record in response to one or more target conditions being met will now be provided. FIG. 16 provides a flow diagram for an example method (600) of monitoring an engine and communicating engine data. For instance, the engine can be one or more of the engines 114 of the aircraft 110 of FIG. 1. It will be appreciated that exemplary method (600) can be modified, adapted, expanded, rearranged and/or omitted in various ways without deviating from the scope of the present subject matter. FIG. 17 provides a schematic view of a system 700 configured to implement method (600). FIG. 18 provides a schematic block diagram depicting a user-modifiable file of a data communication being stored in one or more memory devices of a computing system of a vehicle. FIG. 19 provides a schematic view of a computing device associated with an engine of a vehicle generating a parameter reporting list.

At (602), the method (600) includes generating, by one or more remote computing devices, a data communication containing a user-modifiable file that includes one or more target conditions and one or more selected parameters to record when one, some, or all of the one or more target conditions are met. For instance, as shown in FIG. 17, the one or more remote computing device(s) 156 of the remote station 150 can generate a data communication 708 containing a user-modifiable file 710. In some implementations, as will be explained herein, the computing device(s) 118 only record parameter values associated with the selected parameters of the data communication when the target condition(s) are met; thus, strain on processing resources and data usage can be minimized.

The user-modifiable file 710 of the data communication 708 can include a header 712 and a payload 714. The header 712 includes data (e.g., metadata) indicative of, without limitation, cryptographic information, a time stamp, a version or release number of the data communication 708, checksum information, as well as other useful information. The payload 714 of the user-modifiable file 710 includes data 715 (FIG. 18). The data 715 of the payload 714 can include the target condition(s) 716 and one or more selected parameters 718 to record when one, some, or all the target condition(s) 716 are met.

The target condition(s) 716 can be any condition, constraint, and/or setting in which it is desirable to record certain FADEC parameters, e.g., the one or more selected parameters 718. The target condition(s) 716 can be an algorithm that sets forth a set of rules, settings, and/or conditions, that when met, trigger the computing devices 118 to record values for the selected parameters 718. The target conditions algorithm can be executed by reporting software on one or more processors or logic units of a computing device, for example. Example target conditions 716 are provided below.

In some implementations, the target condition(s) 716 can include a defined geographic area. As one example, the defined geographic area can be defined as an area within five hundred (500) kilometers (≈310 miles) of a landmark, such as e.g., an active volcano. As another example, the defined geographic area can be a region defined by a plurality of vertices. For instance, the defined geographic area can be defined by vertices set at the following locations: Bermuda; San Juan, Puerto Rico; and Miami, FL, USA. In other implementations, the target condition 716 can be a plurality of defined geographic areas.

In some implementations, the target condition(s) 716 can be a threshold or a plurality of thresholds. As one example, the threshold can be a predetermined exhaust gas temperature of the engine(s) 114. As yet another example, the threshold can be predetermined altitude. As a further example, for rotorcraft or other vehicles capable of performing a hover maneuver, the threshold can be a time at hover. In some implementations, the target condition(s) 716 are a predefined range. As one example, the predefined range can be an altitude range, e.g., 8,000-10,000 meters. As another example, the predefined range can be a compressor discharge pressure range. As a further example, the predefined range can be an outside or ambient temperature range. As another example, the predefined range can be a throttle setting range.

Furthermore, in some implementations, the target condition(s) 716 can include a rate of change of a sensed and/or calculated value. As one example, the rate of change of a sensed and/or calculated value can be a rate of change of fuel to a combustor of one of the engine(s) 114 of the aircraft 110. As another example, the rate of change of a sensed and/or calculated value can be a rate of change of a temperature at the combustor of one of the engine(s) 114.

In some implementations, the target condition(s) 716 can be a phase of flight of an aircraft to which the engine(s) 114 provide propulsion. As one example, the phase of flight can be taxiing from the tarmac of an airport to the runway, takeoff, climb, cruise, descent, and/or landing. In some implementations, the target condition(s) 716 can be a mode of operation of the engine(s). For instance, the mode of operation can be start up, transient, or steady state operation. In some further implementations, the target condition(s) 716 can be a set of predefined operating conditions of the engine(s) 114 and/or aircraft 110. For instance, the set of predefined operating conditions can include a combination of one or more of the example target conditions noted herein.

As noted above, the data 715 of the user-modifiable file 710 includes one or more selected parameters 718. The one or more selected parameters 718 of the user-modifiable file

710 are FADEC parameters for which the computing device(s) 118 are to record parameter values for, e.g., when one or more target conditions are met. The selected parameters 718 can be associated with one or more target condition(s) 716. In this way, when the target condition(s) 716 are met, parameter values for the selected parameters 718 associated with the met target conditions can be recorded by the computing device(s) 118.

In some implementations, the selected parameters 718 can be one or more non-baseline parameters, e.g., one or more parameters that are not typically recorded during normal engine operation. In some implementations, the selected parameters 718 can be any selectable FADEC parameters. The selected parameters 718 can be represented on or defined by the user-modifiable file 710 in any suitable manner. For instance, each selected parameter 718 can be represented or defined by the user-modifiable file 710 as a memory address or location where a selected parameter 718 is stored or indexed on one or more memory devices of the computing system 115 (FIG. 1) of the aircraft 110 (FIG. 1). In this way, as will be explained below, the selected parameters 718 can be efficiently mapped with or to selectable parameters of a parameter list stored on one or more memory device, e.g., of one or more of the computing devices 118.

The data 715 of the user-modifiable file 710 can also include one or more parameter settings associated with the one or more selected parameters 718. For instance, as shown in FIG. 18, the one or more parameter settings associated with the one or more selected parameters 718 can include one or more data sampling rates 720 indicating a rate or frequency at which parameter values for the one or more selected parameters 718 are to be recorded, e.g., by the computing devices 118 of the FADEC system. The data sampling rate 720 can be any suitable rate, including for example, once per second, three times per second, twenty times a second, etc. The data 715 can include other parameter settings associated with the one or more selected parameters 176 as well.

For the embodiment of FIG. 18, the data 715 of the user-modifiable file 710 includes two target conditions 716, including a first target condition TC1 and a second target condition TC2. The first target condition TC1 can be a set of related conditions or a single condition or constraint. Likewise, the second target condition TC2 can be a set of related conditions or a single condition or constraint. The selected parameters 718 associated with the first target condition TC1 include a first selected parameter S-P1, a second selected parameter S-P2, and a third selected parameter S-P3. The first selected parameter S-P1 has an associated data sampling rate DSR1, the second selected parameter S-P2 has an associated data sampling rate DSR2, and the third selected parameter S-P3 has an associated data sampling rate DSR3. The data sampling rates 720 of the selected parameters 718 associated with the first target condition TC1 can be the same for each selected parameter 718 or they can be different. The selected parameters 718 associated with the second target condition TC2 include the first selected parameter S-P1 and a fourth selected parameter S-P4. The first selected parameter S-P1 has an associated data sampling rate DSR1 and the fourth selected parameter S-P4 has an associated data sampling rate DSR4. The data sampling rates 720 of the selected parameters 718 associated with the second target condition TC2 can be the same for each selected parameter 718 or they can be different. Notably, a selected parameter may be associated with more than one target condition. In this example, the first selected parameter S-P1 is associated with both the first and second target conditions TC1, TC2. It will be appreciated that the data 715 of the user-modifiable file 710 can include other parameter settings associated with the one or more selected parameters 718 as well as other target conditions and associated selected parameters and settings.

The data 715 of the user-modifiable file 710 can further include a transmission rate 722 indicating the frequency or interval at which a recorded data file 730 (FIG. 17) is to be transmitted, e.g., from the aircraft 110 to the remote station 150. The recorded data file 730 can include recorded selected parameter values 738, and in some implementations, recorded baseline parameter values 736. In some implementations, the transmission rate 722 provided in the data communication 708 can set the transmission rate such that the recorded data file 730 is transmitted after the target conditions are no longer met. In some implementations, the transmission rate 722 provided in the data communication 708 can set the transmission rate such that the recorded data file 730 is transmitted after the target conditions are no longer met for a predetermined time, e.g., five seconds. Additionally or alternatively, in other implementations, the transmission rate 722 provided in the data communication 708 can set the transmission rate such that the recorded data file 730 is transmitted upon the occurrence of a trigger condition, such as a file size threshold.

In some implementations, as noted above, the data communication 708 containing the user-modifiable file 710 that includes the target condition(s) 716, the selected parameter(s) 718 and associated parameter settings is generated by the one or more remote computing device(s) 156. For instance, in some example implementations, the remote station 150 can be an engine monitoring station. The engine monitoring station can be positioned on the ground or onboard another vehicle. The engine monitoring station can monitor engines of an aircraft fleet, such as a fleet that includes the engine(s) 114 of the aircraft 110 of FIG. 1, for example. The data communication 708 containing the user-modifiable file 710 can be generated in response to a field event or detected anomalous or unexpected behavior of one or more engines of a fleet. The parameters included in the user-modifiable file 710 can be selected based on reported field event. However, it will be appreciated that the parameters included in the user-modifiable file 710 can be selected based on any suitable criteria and/or for any reason.

For instance, a computing device associated with an engine of a fleet can generate a fault communication in response to unexpected behavior and the fault communication can indicate the type of fault or problem experienced by the engine. The received fault communication can be routed to the one or more remote computing device(s) 156 for processing and data analysis. Based at least in part on the received fault communication, the one or more remote computing device(s) 156 can select or define the target conditions 716, selected parameters 718 and their associated parameter settings, and the transmission rate 722 and can generate the data communication 708 containing the user-modifiable file 710 accordingly. In some implementations, the target conditions 716, selected parameters 718 and their associated parameter settings, and the transmission rate 722 can be defined in the user-modifiable file 710 for other suitable reasons, e.g., to perform a study or an investigation on the health of one or more components of the engines 114.

At (604), the method (600) includes transmitting/receiving the data communication containing the user-modifiable file. The generated data communication 708 containing the user-modifiable file 710 can be transmitted to the aircraft 110 in any suitable manner, such as by any of the transmission techniques described herein. The data communication 708 can be transmitted to the aircraft 110 when the aircraft 110 is in the air, near an airport, parked at an airport, or over the ocean, for example. As one example, transceivers 154 of the remote station 150 can transmit the data communication 708 to the aircraft 110. As shown in FIG. 17, one or more of the communication units 125, 126 can receive the data communication 708 from the one or more transceivers 154 of the remote station 150. In some instances, the aircraft 110 can receive the data communication 708 while the engine(s) 114 are not in operation.

In some implementations, the data communication 708 is encrypted and one or more of the communication units 125, 126 can decrypt the received data communication 708. The decrypted data communication 708 can then be routed to the computing devices 118 of the FADEC system or some other computing device onboard the aircraft 110. Accordingly, the computing devices 118 and/or some other computing device onboard the aircraft 110 can receive the generated data communication 708. In some implementations, the data communication 708 is decrypted by the computing devices 118 or by some other intermediary computing device instead of the communication units 125, 126.

Further, in some implementations, the data communication 708 can be transmitted to and received by each engine and/or aircraft in a fleet. In other implementations, the data communication 708 can be transmitted to and received by a designated number of engines and/or aircrafts in a fleet. One advantage of pushing the data communication 708 to all or a portion of the aircraft in a fleet is that no specific knowledge as to whether a particular engine or aircraft in a fleet is experiencing or subject to experiencing anomalous or unexpected engine operation is required.

At (606), the method (600) includes storing the user-modifiable file of the received data communication in one or more memory devices of the computing system of the vehicle. For instance, FIG. 18 provides a schematic block diagram depicting the user-modifiable file 710 being stored in one or more memory devices 146 of the computing system 115 of the aircraft 110. In some implementations, the one or more memory devices 146 where the user-modifiable file 710 is stored can be one or more memory devices of one or more computing devices 118. Accordingly, the user-modifiable file 710 can be routed to one or more of the computing devices 118. The computing devices 118 can receive and store the user-modifiable file 710, e.g., in one or more memory devices thereof.

In other implementations, the user-modifiable file 710 of the data communication 708 can be routed to and stored in one or more computing devices onboard the aircraft 110 other than the computing devices 118. As one example, the user-modifiable file 710 can be routed to and received and stored by one or more computing devices positioned within the avionics bay 120. In other implementations, the user-modifiable file 710 can be routed to and received and stored on one or more memory devices of the communication units 125, 126. Further, in some implementations, the memory location where the user-modifiable file 710 is stored is a dedicated memory location that is configured to only store the user-modifiable file 710. In this way, the contents of the user-modifiable file 710 can be more easily found, accessed, and read, e.g., by engine reporting software executed by the computing devices 118.

At (608), the method (600) can include performing a compatibility check on the contents of the data communication, and more specifically on the contents of the user-modifiable file of the data communication. For instance, once the user-modifiable file 710 is transmitted and received at (604) and then stored at (606), the computing device(s) 118 and/or other computing device(s) of the aircraft 110 can determine the integrity and/or compatibility of the contents of the user-modifiable file 710 with the hardware, software, firmware, etc. of the computing device(s) 118 and/or other computing device(s) of the aircraft 110. In one aspect of performing the compatibility check at (608), the computing device(s) and/or computing devices 118 can determine whether the user-modifiable file 710 was successfully uploaded or transmitted to the aircraft 110 by performing one or more data integrity operations, e.g., cyclic redundancy checks, checksum checks, cryptographic checksums and digital signatures, etc. In some implementations, if the user-modifiable file 710 does not pass the data integrity operation(s), the user-modifiable file 710 can be ignored. On the other hand, if the user-modifiable file 710 passes the data integrity operation(s), the computing device(s) and/or computing devices 118 can proceed to (610).

At (610), the method (600) includes designating, by reporting software executed on at least one of the one or more computing devices of the aircraft (e.g., the computing devices 118), parameters to record without modifying the reporting software, wherein the parameters to record include the one or more selected parameters of the user-modifiable file contained within the received data communication. In some implementations, designating parameters to record includes generating a parameter reporting list, wherein the parameters on the parameter reporting list designate the parameters to be recorded, e.g., by the computing devices 118 when the associated target conditions are met. The parameter reporting list can contain or include the one or more selected parameters noted in the user-modifiable file 710, and in some implementations, one or more baseline parameters 725. For instance, one or more of the computing devices 118 can generate or modify a parameter reporting list 780 containing the one or more selected parameters 718 received as part of the user-modifiable file 710 along with the one or more baseline parameters 725. That is, the computing devices 118 can generate a list of parameters to be recorded by the computing devices 118, e.g., when the target condition(s) 716 are met. The plurality of baseline parameters 725 can be fixed within reporting software of the FADEC system. Further, as noted previously, as used herein and in the appended claims, generating a file means creating a new file or modifying or updating an existing file. Accordingly, in some implementations, the computing devices 118 can create a new parameter recording list containing the baseline parameters 725 and the selected parameters 718. In other implementations, the computing devices 118 can modify or update an existing parameter list containing the baseline parameters 725 and selected parameters 718.

FIG. 19 provides a schematic block diagram of one computing device 118 generating a parameter reporting list 780. As shown, reporting software 790 (e.g., engine reporting software in this embodiment) is executable by the one or more processing devices of the computing device 118. Particularly, the reporting software 790 includes instructions that, when executed by the one or more processors, cause the one or more processing devices of the computing device 118 to generate the parameter reporting list 780. Further, as will be explained below, the reporting software 790 includes instructions that, when executed, cause the one or more processing devices of the computing device 118 to record values associated with the parameters in the parameter reporting list 780, e.g., during engine operation and when the target condition(s) 716 are met.

As depicted in FIG. 19, the computing device 118 includes a parameter list 785 that includes parameters that the computing device 118 can record. The parameter list 785, or master parameter list, can be stored on one or more memory devices of the computing device 118. The parameter list 785 can contain any suitable number of parameters. For this embodiment, the parameter list 785 includes baseline parameters 725 and selectable parameters 729, which can be non-baseline parameters. In some implementations, the baseline parameters 725 are always recorded by the computing device 118, e.g., during engine operation, and the selectable non-baseline parameters 729 are generally not recorded by the computing device 118 unless the computing device 118 is otherwise instructed to do so. In some embodiments, the parameter list 785 is fixed within the reporting software 790 executable by one or more processors of the computing device 118 and is modifiable only by changing the source code of the reporting software 790. For the embodiment of FIG. 19, the baseline parameters 725 include a first baseline parameter BP1, a second baseline parameter BP2, a third baseline parameter BP3, and so on to the Nth baseline parameter BPN. The selectable non-baseline parameters 729 include a first selectable parameter SP1, a second selectable parameter SP2, a third selectable parameter SP3, and so on to the Nth selectable parameter SPN.

To generate the parameter reporting list 780, the reporting software 790, when executed, accesses and reads the user-modifiable file 710. Particularly, the reporting software 790 first accesses the user-modifiable file 710, which is stored on the one or more memory devices 146 of the computing system 115. Once accessed, the reporting software 790, when executed, reads the selected parameters 718 contained within the user-modifiable file 710. In some implementations, the reporting software 790 can access and read, but not write, to the user-modifiable file 710. This may prevent inadvertent modification of the user-modifiable file 710. As noted above, the selected parameters 718 can be represented or defined in any suitable manner, such as by a memory address indicating where a selectable parameter 729 is indexed on the computing system 115. For the embodiment of FIG. 19, the selected parameters 718 contained within the user-modifiable file 710 include a first selected parameter S-P1, a second selected parameter S-P2, and a third selected parameter S-P3.

Once the reporting software 790 accesses and reads the user-modifiable file 710, the reporting software 790, when executed, maps the selected parameters 718 contained within the user-modifiable file 710 with the selectable non-baseline parameters 729. In the example embodiment of FIG. 19, the first selected parameter S-P1 corresponds with the first selectable parameter SP1, the second selected parameter S-P2 corresponds with the second selectable parameter SP2, and the third selected parameter S-P3 corresponds with the third selectable parameter SP3. The first selected parameter S-P1 can be representative of a memory location where the first selectable parameter SP1 is stored on the computing device 118, the second selected parameter S-P2 can be representative of a memory location where the second selectable parameter SP2 is stored on the computing device 118, and the third selected parameter S-P3 can be representative of a memory location where the third selectable parameter SP3 is stored on the computing device 118, for example. Accordingly, the reporting software 790, when executed, maps the first selected parameter S-P1 with the first selectable parameter SP1, the second selected parameter S-P2 with the second selectable parameter SP2, and the third selected parameter S-P3 with the third selectable parameter SP3. The mapped parameters are designated for inclusion on the reporting parameter list 780 by the reporting software 790.

In FIG. 19, for example, the mapped first selectable parameter SP1, the second selectable parameter SP2, and the third selectable parameter SP3 are designated for inclusion in the generated or modified parameter reporting list 780. As a result, the generated or modified parameter reporting list 780 includes baseline parameters 725, including BP1, BP2, BP3, up to the Nth or BPN baseline parameter, and selected parameters 718, including SP1, SP2, and SP3. In the event a selected parameter 718 contained within the user-modifiable file 710 is unable to be mapped to a selectable non-baseline parameter 729, the selected parameter 718 contained within the user-modifiable file 710 can be ignored by the reporting software 790. Further, an error notification can be generated, e.g., by executing the reporting software 790, and the error notification can be provided to a user and can indicate that one or more of the selected parameters 718 of the user-modifiable file 710 contained within the data communication 708 was unable to be mapped to any of the selectable parameters 729 of the parameter list 785.

Moreover, in generating the parameter reporting list 780, one or more parameter settings associated with a selected parameter can be included in the generated or modified parameter reporting list 780. As one example, the data sampling rate or frequency at which values for the selected parameter are to be recorded can be linked to the selected parameter in the generated or modified parameter reporting list 780. It will be appreciated that other parameter settings can be linked to the selected parameters 718 in the generated or modified parameter reporting list 780.

Notably, in generating the parameter reporting list 780, neither the reporting software 790 nor any other engine software is changed, altered, or otherwise modified. That is, the reporting software 790, when executed, can read selected parameters 718 from the uploaded user-modifiable file 710, map the selected parameters 718 to the selectable parameters 729 of the parameter list 785, and designate the mapped parameters for inclusion in the parameter reporting list 780 along with the baseline parameters 725 without changing, altering, or otherwise modifying the reporting software 790 or any other engine software. In this manner, parameters can be added and/or removed from the parameter reporting list 780 without need for lengthy software code certification processes, among other benefits.

In some implementations, particularly where the user-modifiable file 710 includes multiple sets of target conditions and associated selected parameters as is the case for the embodiment of FIG. 19, multiple parameter reporting lists can be generated. For example, in FIG. 19, the parameter reporting list 780 is shown being generated using the selected parameters 718 associated with the first target conditions TC1. The parameter reporting list generated using the selected parameters 718 associated with the first target conditions TC1 is denoted as 780-TC1. The same process described above can be used to generate a parameter reporting list for the selected parameters 718 associated with the second target conditions TC2. The selected parameters 718 associated with the second target conditions TC2 can be those depicted in FIG. 18 and described above, for example. The parameter reporting list generated using the selected parameters 718 associated with the second target conditions TC2 is denoted as 780-TC2. Accordingly, the one or more memory devices of the computing device 118 can store a plurality of generated parameter reporting lists. As will be explained further below, parameter values can be recorded for the parameters of one or more of the parameter reporting lists depending on whether the target conditions associated with the parameter reporting list are met. In some implementations, when no target conditions are met, the computing device 118 can record parameter values for the baseline parameters 725 of the parameter list 785.

At (612), the method (600) includes receiving sensor data from one or more sensors. For instance, as shown in FIG. 17, the computing devices 118 can receive sensor data from one or more engine sensors 210. The one or more sensors 210 can sense or measure values for parameters relating to the engine(s) 114, such as e.g., fan speed, core speed, temperatures at various stations along the core air flowpath, etc. Signals from the sensors 210 can be routed to the computing device(s) 118 and processed. The computing device(s) 118 can then calculate or predict values for other parameters, such as exhaust gas temperature, mass flow at various stations of the engine(s) 114, stall margin remaining, etc. In addition, in some implementations, the computing device(s) 118 can receive sensor data from one or more vehicle sensors 212 positioned onboard the aircraft 110. Sensor outputs received from the one or more vehicle sensors 212 can be received as part of vehicle data transmitted to the computing devices 118 (e.g., over data communication link 124 (FIG. 1)) from the vehicle interface unit 122. Moreover, engine data, which includes sensed and calculated values for certain engine parameters, can be transmitted to the vehicle interface unit 122 and ultimately to one or more vehicle systems 160. For instance, engine data indicative of a thrust output of the engine(s) 114 can be displayed on a display device positioned within the cockpit 116.

At (614), the method (600) includes determining whether the target condition(s) are met based at least in part on the received sensor data. For instance, the computing device(s) 118 can use the received sensor data to determine whether the target condition(s) 716 are met. The computing device(s) 118 can use sensed and/or calculated values to determine whether the target condition(s) 716 are met. The sensor data can be received from the one or more engine sensors 210 and/or the one or more vehicle or aircraft sensors 212 as noted above.

As one example, as noted above, the target condition can be a defined geographic area. In such implementations, the computing device(s) 118 can receive vehicle data indicative of the geographic location of the aircraft 110 and thus the engine(s) 114 mounted to the aircraft 110. For instance, one of the vehicle systems 160 can include a navigation system equipped with a GPS. The GPS can provide aircraft position information, e.g., coordinates, to the computing device(s) 118. The computing device(s) 118 can determine whether the aircraft 110 and its associated engine(s) 114 are within the defined geographic area. In this example, when the aircraft 110 and thus the engine(s) 114 are operating in the defined geographic area, the computing device(s) 118 determined that the target condition 716 is met. As will be explained below at (616), when the target condition 716 is met, which in this example is when the aircraft 110 and engine(s) 114 are operating in the defined geographic area, the computing device(s) 118 are configured to record parameter values for the one or more selected parameters 716 compiled in the parameter reporting list 780. When the aircraft 110 and engine(s) 114 are not operating in the defined geographic area, the computing device(s) 118 determined that the target condition 716 is not met. Accordingly, the computing device(s) 118 do not record parameter values for the one or more selected parameters 716. In some implementations, when the target condition(s) 716 are not met, the computing device(s) 118 can record parameter values for the baseline parameters 725 within the parameter list 785.

As another example, the target condition can be a threshold. In such implementations, in determining whether the target condition is met based at least in part on the received sensor data at (614), the computing device(s) 118 are configured to determine whether the threshold is exceeded based at least in part on the received sensor data. For instance, one or more sensor outputs received from the engine sensors 210 and/or aircraft sensors 212 can be utilized by the computing device(s) 118 to determine whether the threshold is exceeded. Sensor outputs can be used directly and/or values can be calculated and/or predicted based on the sensor outputs. To determine whether the threshold is exceeded, the computing device(s) 118 can compare a sensed/calculated/predicted value that is based on one or more sensor outputs to the threshold. For instance, the computing device(s) 118 can compare a calculated exhaust gas temperature of the engine(s) 114 with an exhaust gas temperature threshold. In this example, when the threshold is exceeded, the computing device(s) 118 determine that the target condition 716 is met and thus the computing device(s) 118 are configured to record parameter values for the one or more selected parameters 718. When the threshold is not exceeded, the computing device(s) 118 determined that the target condition 716 is not met and thus the computing device(s) 118 are configured to not record parameter values for the one or more selected parameters 718. As used herein, the term "exceed" in the context of thresholds can mean a value that is greater than a threshold or a value that is less than a threshold.

As yet another example, the target condition can be a predefined range. In such implementations, in determining whether the target condition is met based at least in part on the one or more sensor outputs at (614), the computing device(s) 118 are configured to determine whether a sensed/calculated/predicted value is within the predefined range. The sensed/calculated/predicted value can be based on the received sensor data. For instance, one or more sensor outputs received from the engine sensors 210 and/or aircraft sensors 212 can be utilized by the computing device(s) 118 to determine whether the sensed/calculated/predicted value is within the predefined range. Sensor outputs can be used directly and/or values can be calculated or predicted based on the sensor outputs. For instance, as one example, to determine whether the target condition is met, the computing device(s) 118 can compare a sensed/calculated/predicted compressor discharge pressure with a predefined pressure range. When the sensed/calculated/predicted value is within the predefined range, the computing device(s) 118 determine that the target condition 716 is met and thus the computing device(s) 118 are configured to record parameter values for the one or more selected parameters 718. When the parameter value is not within the predefined range, the computing device(s) 118 determine that the target condition 716 is not met and thus the computing device(s) 118 are configured to not record parameter values for the one or more selected parameters 718. In some embodiments, the predefined range can be a non-contiguous predefined range.

As another example, the target condition can be a rate of change of a set/sensed/calculated/predicted value. In such implementations, in determining whether the target condition is met based at least in part on the received sensor data at (614), the computing device(s) 118 are configured to determine whether the rate of change of the sensed/calculated/predicted value has exceeded a predefined rate of change. For instance, if a sensed/calculated/predicted rate of change of fuel to the combustor of the engine(s) 114 exceeds a predefined rate of change of fuel to the combustor, the computing device(s) 118 can determine that the rate of change of the fuel to the combustor has exceeded the predefined rate of change of fuel to the combustor. When the rate of change of the sensed/calculated/predicted value has exceeded the predefined rate of change, the computing device(s) 118 determine that the target condition 716 is met and the computing device(s) 118 are configured to record values for the one or more selected parameters 718. When the rate of change of the sensed/calculated/predicted value has not exceeded the predefined rate of change, the computing device(s) 118 determine that the target condition 716 is not met and thus the computing device(s) 118 are configured to not record the one or more selected parameters 718. As used herein, "exceed" in the context of rates of change can mean a rate that has a greater rate of change than a predefined rate or a rate that has a slower rate of change than a predefined rate.

At (616), the method (600) includes recording parameter values for parameters of the generated parameter reporting list when the target condition(s) are met. For instance, when the target condition(s) 716 are met as determined by the computing device(s) 118 at (614), the reporting software 790, when executed by the computing device(s) 118, can record parameter values for the one or more parameters in the generated parameter reporting list 780 based at least in part on the received sensor data. For instance, the sensed, calculated, and/or predicted parameter values for the engine and/or aircraft parameters, including parameter values for both baseline parameters 725 and selected parameters 718, can be recorded and compiled into the recorded data file 730 as shown in FIG. 17. The computing device(s) 118, and particularly the one or more processors of the computing device(s) 118 executing the instructions of the reporting software 790, can write the sensed, calculated, and/or predicted parameter values to the recorded data file 730 continuously or on a rolling basis as data is recorded or at a predetermined interval, such as e.g., every 15 milliseconds, every 25 milliseconds, or every second. Parameter values 738 for the selected parameters 718 can be recorded by the computing device(s) 118 at their respective data sampling rates 720 (FIG. 18) specified in the data communication 708. Likewise, parameter values 736 for the baseline parameters 725 can be recorded by the computing device(s) 118 at their respective data sampling rates, e.g., specified in the reporting software 790 (FIG. 19). The recorded parameter values 738, 736 can be sensed, calculated, and/or predicted values that are based on the received sensor data. The reporting software 790, when executed by the one or more processors of the computing device(s) 118, can generate or compile the recorded data file 730 containing the recorded parameter values 736, 738.

As shown best in FIG. 17, the recorded data file 730 includes a header 732 and a payload 734. The header 732 includes data (e.g., metadata) indicative of or indicating, without limitation, cryptographic information, a time stamp, the version or release number of the user-modifiable file 710 and/or received data communication 708 used to designate the parameters for which parameter values are to be recorded when defined target condition(s) are met, checksum information, communication logs, error logs, etc. as well as other information. The payload 734 of the recorded data file 730 includes recorded values for the parameters listed in the generated parameter reporting list 780, including recorded selected parameter values 738 associated with the selected parameters 718 and recorded baseline parameter values 736 associated with the baseline parameters 725. The recorded data file 730 can be a binary, machine-readable file, for example.

When the target condition(s) 716 are not met as determined at (614), the computing device(s) 118 are configured to not record parameter values for the one or more selected parameters 718. The computing device(s) 118 can continue recording parameter values associated with the baseline parameters 725, however. In this way, the one or more selected parameters 718 are selectively recorded based on whether the target condition(s) are met and the baseline parameters 725 are recorded regardless of whether the target condition(s) 716 are met. That is, the computing device(s) 118, by executing the reporting software 790, are configured to record parameter values for baseline parameters 725 that are fixed within the reporting software 790 regardless of whether the target condition(s) 716 are met.

Advantageously, the computing device(s) 118 do not record the additional parameter values for the selected parameters 718 when the engine(s) 114 are not experiencing the identified target conditions, which avoids the expense of satellite or other costly data transmission charges when such data is not needed or desired for analysis. In this way, the generation of a file with recorded parameter values for baseline parameters can occur when target condition(s) 718 are not met, and when target condition(s) 718 are met, generation of a recorded data file 730 that contains parameter values for selected parameters (and in some implementations parameter values for baseline parameters) can occur. In some implementations, a file that includes recorded parameter values for baseline parameters and a recorded data file 730 can coexist and function simultaneously.

The computing device(s) 118 can continue to monitor whether the target condition(s) 716 are met. In some implementations, the reporting software 790, when executed by the one or more processors of the computing device(s) 118, can record parameter values for the selected parameters 718 only when the target condition(s) 716 are met and can generate or compile the recorded data file 730 containing the recorded selected parameter values 738 (and in some implementations the recorded baseline parameter values 736). In some implementations, the reporting software 790, when executed by the one or more processors of the computing device(s) 118, can record parameter values for the selected parameters 718 for a predetermined recording time after the target condition(s) 716 are initially determined as met. That is, in such implementations, if the target condition(s) 716 are determined to be met at (614), the reporting software 790, when executed by the one or more processors of the computing device(s) 118, can record parameter values for the selected parameters 718 (and for the baseline parameters in some implementations) for a predetermined recording time (e.g., five minutes) regardless of whether the target condition(s) 716 are met throughout the predetermined recording time. When the predetermined recording time elapses or expires, the computing device(s) 118 can cease recording parameter values for the selected parameters 718.

At (618), the method (600) includes providing the recorded data file. For instance, the recorded data file 730 can be downloaded or otherwise transmitted to other sources in a number of suitable ways. As one example, the recorded data file 730 can be wirelessly transmitted from the aircraft 110 via one or more of the communication units 125, 126, e.g., to ground station 150, to another aircraft or vehicle, etc. In some embodiments, the recorded data file 730 can be wirelessly transmitted in-flight over SATCOM and/or Air to Ground (ATG) technology. As another example, the recorded data file 730 can be wirelessly transmitted over a cellular, Wi-Fi, and/or Bluetooth® network. In yet other implementations, the recorded data file 730 can be transmitted via a wired connection, e.g., to a portable device 142 (FIG. 3). The portable device 142 can be implemented, for instance, on a laptop, tablet, mobile device, or other suitable computing device. The portable device 142 can be used by maintenance professionals to retrieve the recorded data file 730. In some implementations, the recorded data file 730 can be encrypted by a computing device onboard the aircraft 110. For instance, the recorded data file 730 can be encrypted by the computing device(s) 118 and/or one or more of the communication units 125, 126 prior to being transmitted from the aircraft 110.

In some implementations, the recorded data file 730 can be transmitted to another source in accordance with the transmission rate 722 provided in the data communication 708. As noted above, the user-modifiable file 710 of the data transmission 708 can include a transmission rate 722 indicating the frequency at which the recorded data file 730 or a portion thereof is to be transmitted, e.g., from the aircraft 110 to the remote station 150. In some implementations, the transmission rate 722 provided in the data communication 708 can set the transmission rate such that the recorded data file 730 is transmitted immediately after the target condition(s) 716 are no longer met. In some implementations, the transmission rate 722 provided in the data communication 708 can set the transmission rate such that the recorded data file 730 is transmitted while the target condition(s) 716 are still met.

In some implementations, the recorded data file 730 can be transmitted as a single file or can be parsed and sent in portions or data packets. For instance, in some implementations, the recorded data file 730 is transmitted in portions or as a series of data file packets at a predetermined interval. For example, the recorded data file 730 can be transmitted every second, every 5 seconds, every 15 seconds, etc., e.g., while the target condition(s) 716 are met and the computing device(s) 118 are actively recording parameter values and compiling them into the recorded data file 730. In this way, the one or more remote computing devices 156 of remote station 150 (e.g., an engine monitoring station) can utilize the recorded parameter values 736, 738 to analyze the engine operation of the engines 114 in real time or near real time. As another example, the transmission rate 722 provided in the data communication 708 can set the transmission rate such that the recorded data file 730 is transmitted upon the occurrence of a trigger condition, such as a file size threshold. The portions or data file packets of the recorded data file 730 can be reconstituted into the complete file, e.g., by the remote computing device(s) 156. The reconstituted and decrypted recorded data file 730 can be made available for visualization, analysis, archiving, etc., e.g., by the remote computing device(s) 156.

In some implementations, when the trigger or target condition(s) are met, the computing device(s) 118 are configured to generate a notification indicating that the target condition(s) have been met. The notification can be transmitted from the aircraft 110 to, e.g., a remote station. For instance, one or more of the communication units 125, 126 can be used to transmit the notification to the remote station 150. By receiving notifications of when particular engines have met the target conditions, the specific engine conditions during the period in which the target conditions were met can be analyzed in real time, and if necessary, further data communications can be transmitted to the aircraft 110 with instructions for expanding or narrowing the scope of parameter values to record.

For instance, in some implementations, the computing device(s) 118 can receive a plurality of data communications each having target condition(s) and associated selected parameters for which parameter values are to be recorded when the target condition(s) are met. The reporting software 790, when executed by one or more processors of the computing device(s) 118, can generate a plurality of parameter reporting lists based on the received data communications, e.g., in a manner described above. Each of the generated parameter reporting lists can be stored on one or more memory devices of the computing device(s) 118. Multiple parameter reporting lists can be activated at once when the target conditions associated with the parameter reporting lists are met. The recorded parameter values for the parameters of the activated parameter reporting lists can be compiled into the same or different recorded data files. When compiled into the same recorded data files, the recorded parameter values can be tagged with identification information, e.g., identifying its associated target conditions and/or its associated data communication.

Figure 20:
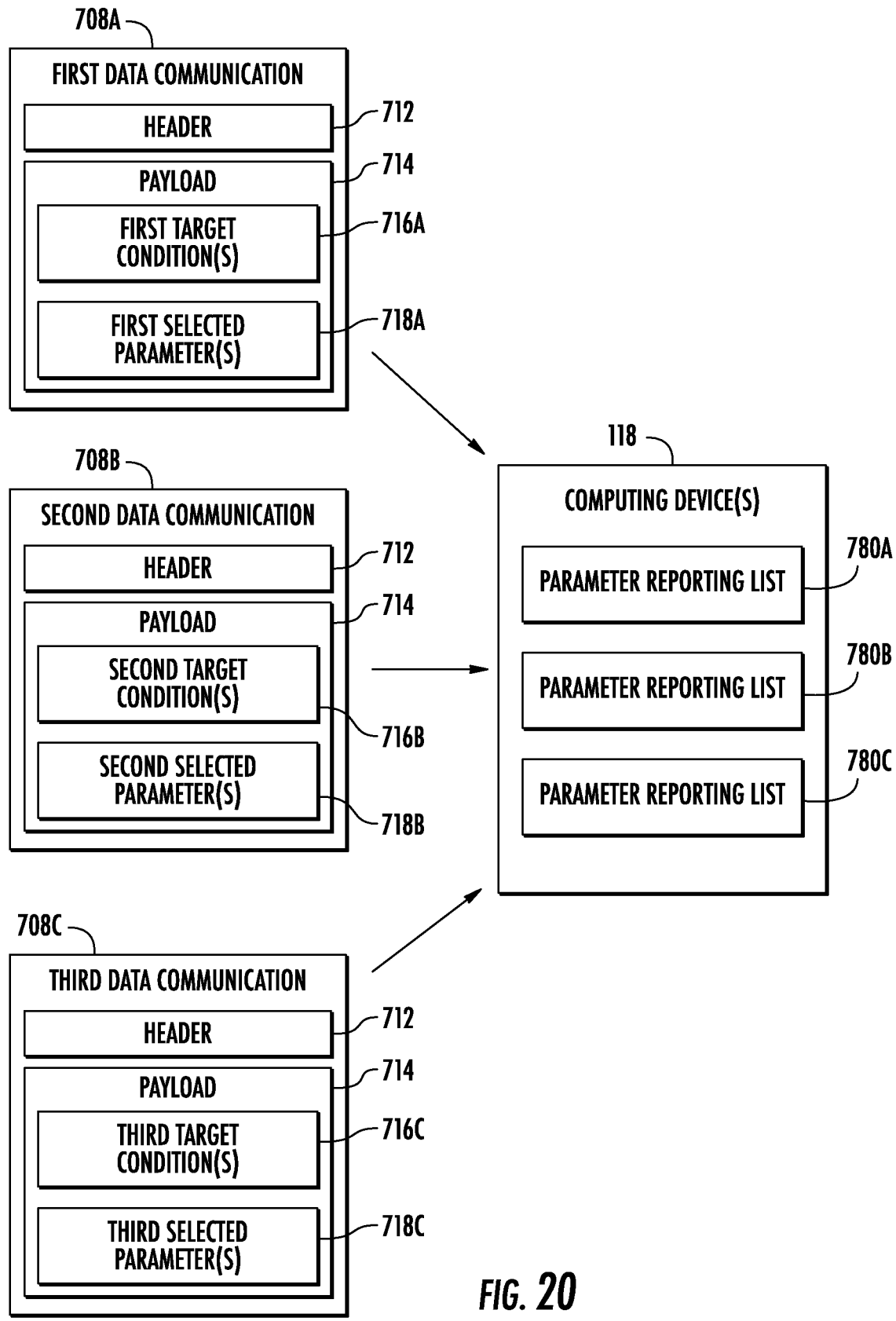
FIG. 20 provides a schematic view depicting a computing device associated with an aircraft engine receiving a plurality of data communications each having target condition(s) and associated selected parameters for which parameter values are to be recorded when the target condition(s) are met according to example embodiments of the present disclosure.

For instance, FIG. 20 provides a schematic view depicting the computing device 118 associated with an aircraft engine receiving a plurality of data communications each having target condition(s) and associated selected parameters for which parameter values are to be recorded when the target condition(s) are met. Particularly, for the depicted embodiment of FIG. 20, the computing device 118 receives a first data communication 708A containing a first set of target condition(s) 716A and first selected parameter(s) 718A. When the first set of target condition(s) 716A are met, parameter values associated with the first selected parameter(s) 718A are to be recorded by the computing device 118. The computing device 118 also receives a second data communication 708B containing a second set of target conditions 716B and second selected parameter(s) 718B. When the second set of target conditions 716B are met, parameter values associated with the second selected parameter(s) 718B are to be recorded. The computing device 118 further receives a third data communication 708C containing a third set of target conditions 716C and third selected parameter(s) 718C. When the third set of target conditions 716C are met, parameter values associated with the third selected parameter(s) 718C are to be recorded. The first selected parameter(s) 718A, second selected parameter(s) 718B, and third selected parameter(s) 718C can include separate or overlapping parameters for which parameter values are to be recorded. The data communications 708A, 708B, 708C can be received simultaneously or at different times. The data communications 708A, 708B, 708C can also include parameter settings associated with their respective selected parameters.

The reporting software 790, when executed by one or more processors of the computing device(s) 118, can generate a plurality of parameter reporting lists based on the received data communications 708A, 708B, 708C, e.g., in a manner described above. As shown in FIG. 20, a first parameter reporting list 780A is generated using the target conditions and selected parameters included in the user-modifiable file of the first data communication 708A, a second parameter reporting list 780B is generated using the target conditions and selected parameters included in the user-modifiable file of the second data communication 708B, and a third parameter reporting list 780C is generated using the target conditions and selected parameters included in the user-modifiable file of the third data communication 708C. The parameter reporting lists 780A, 780B, 780C are generated by one or more processors of the computing device(s) 118 executing the reporting software 790.

Each of the generated parameter reporting lists 780A, 780B, 780C can be stored on one or more memory devices of the computing device(s) 118. One or more of the parameter reporting lists 780A, 780B, 780C can be activated when their associated target condition(s) are met. As noted above, the parameter values recorded for the parameters of the activated parameter reporting lists can be compiled into the same or different recorded data files. When compiled into the same recorded data file, the recorded parameter values can be tagged with identification information, e.g., identifying its associated target conditions and/or its associated data communication. For instance, the reporting software 790 can organize the parameter values in the recorded data file 730 according to their associated target condition(s). In this way, the engine operating data may be easier to process and analyze.

When the target condition(s) associated with one of the activated parameter reporting lists are no longer met or a predetermined reporting time has elapsed, that parameter reporting list can be deactivated by the reporting software 790 being executed on the computing device(s) 118. When a parameter reporting list becomes deactivated, the computing device(s) 118 no longer record parameter values for the parameters of that parameter reporting list.

Advantageously, by allowing a computing device associated with an engine to self-select which parameter values to record when set target condition(s) are met, parameter values can be intelligently and efficiently recorded by only those engines in the fleet meeting the target conditions. This provides a significantly faster way to record specific parameters when target conditions are met across a fleet of engines compared to conventional techniques and avoids the expense of having an entire fleet continuously reporting data when only a handful of engines are experiencing a specific issue. In addition, using the target conditions approach, no knowledge of which engines or aircraft require monitoring or which engines meet the target conditions is required. Data communications can be pushed or rolled out to the entire fleet or a subset thereof and only those engines that meet the target conditions need report back parameter values for the selected parameters. The expense of satellite or other costly extra data for engines not experiencing the identified target conditions can be avoided as well, among other benefits. Further, notably, the parameter reporting list for which parameter values are recorded when the target conditions are met can be generated without modifying the reporting software, or more broadly, any engine software, which eliminates the need for lengthy software code recertification processes.

With sufficiently-fast turnaround times in updating the parameters to record, the parameters to record can be modified over a period of days or weeks as a problem is better understood. Multiple iterations of user-modifiable files can be transmitted to the vehicle as needed. User-modifiable files can be updated concurrent with off-engine analysis and refinement. The user-modifiable files can be generated to include any number of selected parameters selected from among defined FADEC parameters (~10,000 total). The user-modifiable files and thus the selected parameters to record can be phased out once they are no longer needed.

Figure 21:
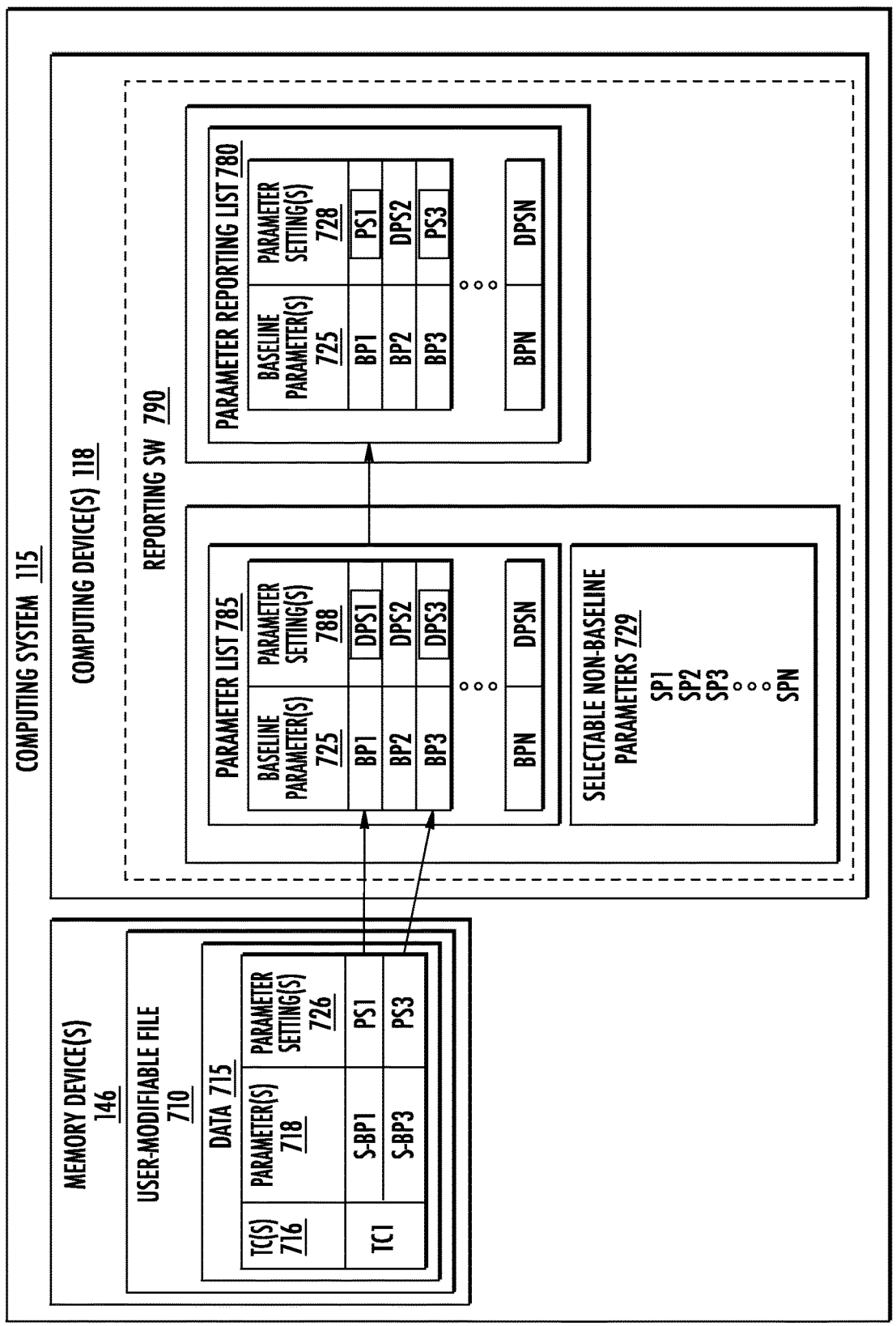
FIG. 21 provides a schematic view of a computing device of a vehicle propulsion system generating a parameter reporting list in which one or more parameter settings are changed.

In some implementations of system 700 or method (600), it may be desirable to change a parameter setting (e.g., a data sampling rate) of one or more of the parameters stored within the parameter list fixed within the reporting software when certain target conditions are met. By way of example, FIG. 21 provides a schematic view of a computing device of a vehicle propulsion system generating a parameter reporting list 780 in which one or more parameter settings are changed. The computing device can be computing device 118 and the vehicle propulsion system can be engine 114 of aircraft 110 (FIG. 1). The computing system 115 has one or more memory devices and one or more processors.

With reference to FIG. 21, the one or more processors are configured to receive a user-modifiable file 710 containing data 715 that includes parameter settings 726 associated with respective selected parameters 718. The selected parameters 718 and associated parameter settings 726 are associated with target condition(s) 716 (e.g., a first set of target condition(s) TC1). For instance, the user-modifiable file 710 can be received from a communication unit (e.g., communication unit 125 or 126; FIG. 1). The communication unit can receive the user-modifiable file 710 from a remote station via a data communication (e.g., data communication 708; FIG. 17). In this example, the user-modifiable file 710 includes selected parameters 718, including a first selected parameter S-BP1 and a third selected parameter S-BP3. The user-modifiable file 710 also includes parameter settings 726 associated with the selected parameters 718. For instance, a first parameter setting PS1 is associated with the first selected parameter S-BP1 and a third parameter setting PS3 is associated with the third selected parameter S-BP3. The first and third parameter settings PS1, PS3 can represent any suitable parameter setting, such as a data sampling rate.

The one or more processors of the computing device 118 are configured to access and read the user-modifiable file 710 by executing reporting software 790 on at least one of the one or more processors (e.g., of the computing device 118). Once the user-modifiable file 710 is accessed and read, the one or more processors of the computing device 118 are configured to link or map the parameter settings 726 of the user-modifiable file 710 to a parameter of a parameter list 785. That is, each parameter setting associated with a selected parameter of the user-modifiable file 710 is linked or mapped to a parameter of the parameter list 785. Each baseline parameter 725 of the master parameter list 785 has one or more associated default or current parameter settings 788. In depicted example of FIG. 21, the first selected parameter S-BP1 of the user-modifiable file 710 corresponds with a first baseline parameter BP1 having an associated default or present first parameter setting DPS1. The third selected parameter S-BP3 of the user-modifiable file 710 corresponds with a third baseline parameter BP3 having an associated default or present third parameter setting DPS3. Accordingly, the first selected parameter S-BP1 of the user-modifiable file 710 is mapped to the first baseline parameter BP1 of the parameter list 785, and thus, the first parameter setting PS1 is mapped to the first baseline parameter BP1 of the parameter list 785. Similarly, the third selected parameter S-BP3 of the user-modifiable file 710 is mapped to the third baseline parameter BP3 of the parameter list 785, and thus, the third parameter setting PS3 is mapped to the third baseline parameter BP3 of the parameter list 785.

The one or more processors are configured to generate, by executing the reporting software 790 on the at least one of the one or more processors (e.g., of the computing device 118), a parameter reporting list 780 containing the parameters and their associated parameter settings mapped thereto. Notably, the reporting software 790 is not modified during mapping and generating. Stated another way, the reporting software 790, when executed, is not modified in mapping the parameter settings 726 to the parameters within the parameter list 785 and is not modified in generating the parameter reporting list 780. For the depicted example of FIG. 21, the parameter reporting list 780 is generated by the executed reporting software 790 such that the first baseline parameter BP1 has the first parameter setting PS1 (instead of the first default parameter setting DPS1), and such that the third baseline parameter BP3 has the third parameter setting PS3 (instead of the third default parameter setting DPS3). The parameter settings 726 for the second baseline parameter BP2 and all other parameters within the parameter reporting list 780 remain unchanged as shown.

After generating the parameter reporting list 780, the one or more processors are configured to receive sensor data from one or more sensors (e.g., engine sensors, aircraft sensors, etc.). Further, when the target condition(s) 716 are met (e.g., target condition(s) TC1), the one or more processors are configured to record parameter values for the parameters 725 (and in some instances selected parameters 718) in the generated parameter reporting list 780 based at least in part on the received sensor data and their respective parameter settings 726, including parameter settings mapped to their respective parameters 725 (e.g., PS1 and PS3).

The one or more processors can generate, by executing the reporting software 790, a recorded data file 730 (FIG. 17) that includes the parameter values recorded for the one or more parameters in the generated parameter reporting list 780. The one or more processors can also route the recorded data file 730, e.g., to a communication unit. Particularly, the one or more processors can cause a communication unit (e.g., the communication unit 125 of FIG. 1) to transmit at least a portion of the recorded data file 730 to a remote station (e.g., the remote station 150 of FIG. 1). The remote station can be a ground station or a second vehicle, for example. The recorded data file 730 can be transmitted to a remote station during the same flight or engine operating cycle in which the data communication was received or at a later time, e.g., when the aircraft 110 is parked at an airport.

Although various embodiments have been described herein wherein the parameter list 785 distinguishes between baseline and non-baseline parameters, in some implementations of system 700 and method (600), the parameter list 785 does not distinguish between baseline and non-baseline parameters. In such embodiments, all possible parameters of the parameter list 785 can be selected and designated for inclusion in the generated parameter reporting list 780.

Figure 22:
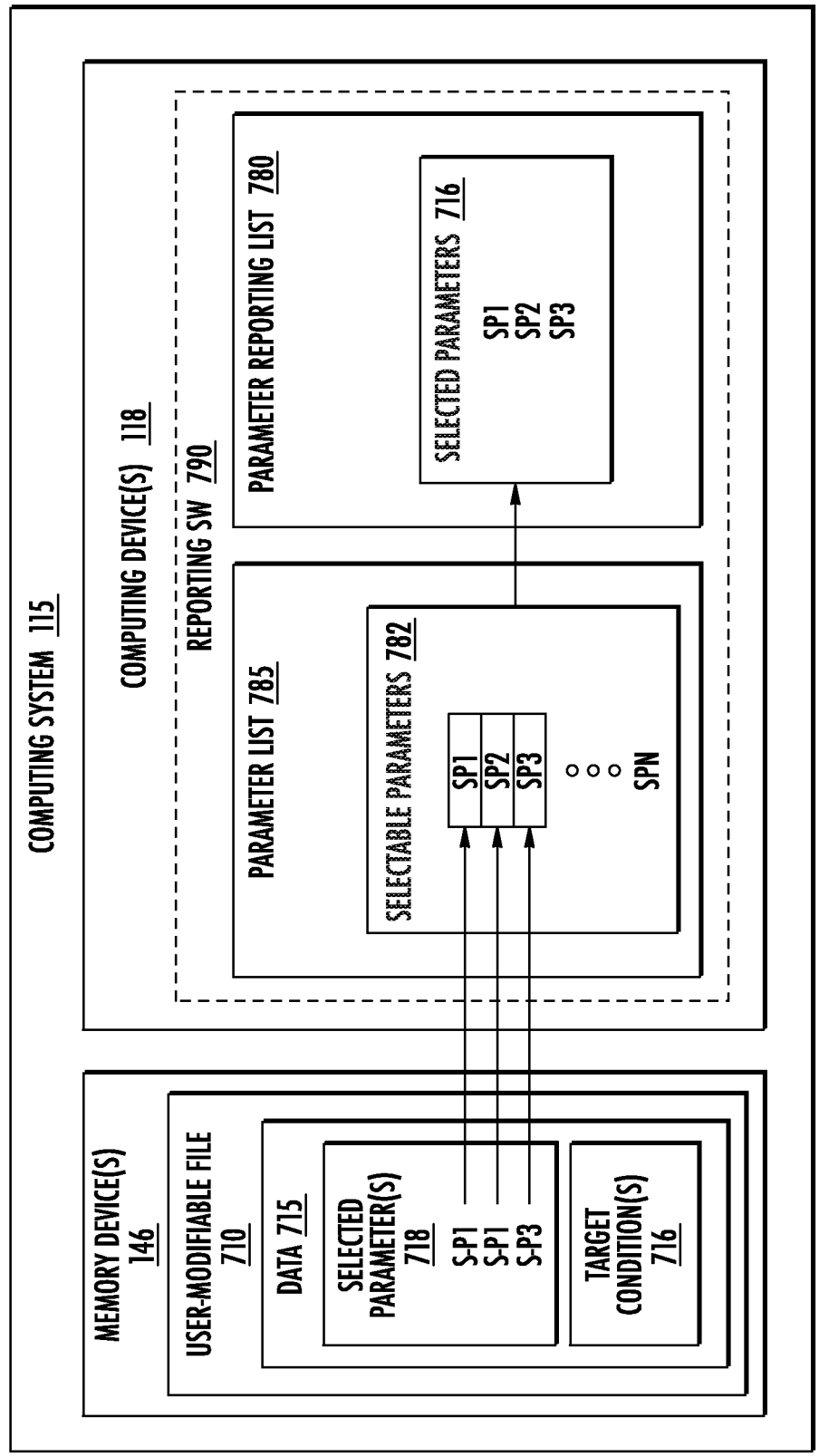
FIG. 22 provides a schematic view of a computing device of a vehicle propulsion system generating a parameter reporting list.

By way of example, FIG. 22 provides a schematic view of a computing device of a vehicle propulsion system generating a parameter reporting list. For this embodiment, the computing device can be computing device 118 and the vehicle propulsion system can be engine 114 of aircraft 110 (FIG. 1). The computing system 115 has one or more memory devices and one or more processors configured to receive a user-modifiable file 710 containing data 715 indicating one or more selected parameters 718 for which parameter values are to be recorded when target condition(s) 716 are met. In some implementations, the data 715 of the user-modifiable file 710 (received as part of the data communication 708; FIG. 17) indicates the one or more selected parameters 718 for which values are to be recorded when target condition(s) are met by representing each of the one or more selected parameters by a memory address or address structure. Particularly, the memory addresses representing the one or more selected parameters 718 to record can each indicate a memory location where the one or more selected parameters 718 are stored on the one or more memory devices of the computing system 115 (e.g., memory locations on the one or more memory devices of the computing device 118). In other implementations, the data 715 of the user-modifiable file 710 can indicate the one or more selected parameters 718 to record by other designations, such as by parameter name as defined in the reporting or control software, by part of a parameter name as defined in the reporting or control software, by a specific nomenclature or code as defined in the reporting or control software, by a position of a parameter within a parameter list, etc.

The one or more processors are further configured to generate, by executing reporting software 790 on at least one of the one or more processors, a parameter reporting list 780 containing the one or more selected parameters 718 without modifying the reporting software 790. In some implementations, in generating, by executing the reporting software 790 on at least one of the one or more processors, the parameter reporting list 780, the one or more processors are configured to read the user-modifiable file 710 containing the data 715 indicating the one or more selected parameters 718 for which parameter values are to be recorded when one or more target condition(s) 716 are met. For instance, one or more processors of the computing device 118 can access and read the user-modifiable file 710 stored in the one or more memory devices 146, e.g., of a computing device of the computing system 115. In some embodiments, the one or more memory devices 146 are components of the computing device 118. In other embodiments, the one or more memory devices 146 are components of some other computing device onboard the aircraft 110. The received user-modifiable file 710 can be stored in a dedicated memory location. For the depicted embodiment of FIG. 22, the selected parameters 718 contained within the data 715 of the user-modifiable file 710 include a first selected parameter S-P1, a second selected parameter S-P2, and a third selected parameter S-P3. The selected parameters S-P1, S-P2, and S-P3 are associated with a set of target conditions 716.

After reading the user modifiable file 710, in generating the parameter reporting list 780, the one or more processors are configured to map the one or more selected parameters 718 with selectable parameters 782 of a parameter list 785 fixed within the reporting software 790. For the embodiment of FIG. 22, the parameter list 785 includes a first selectable parameter SP1, a second selectable parameter SP2, a third selectable parameter SP3, and so on to an Nth selectable parameter SPN. As depicted, the one or more processors map the selected parameters 718 (the first selected parameter S-P1, the second selected parameter S-P2, and the third selected parameter S-P3 in this example) with their respective selectable parameters 782 of the parameter list 785 (the first selectable parameter SP1, the second selectable parameter SP2, and the third selectable parameter SP3 in this example). Accordingly, the selectable parameters 782 of the parameter list 785 that are mapped with the one or more selected parameters 718 are designated for inclusion in the parameter reporting list 780.

In some implementations, the data 715 of the user-modifiable file 710 contains one or more parameter settings associated with the one or more selected parameters 718. As one example, the one or more parameter settings associated with the one or more selected parameters include a data sampling rate indicating a rate at which the parameter values for the one or more selected parameters are to be recorded when the target condition(s) 716 are met. The parameter settings can be linked to their associated selectable parameters 782 and included in the parameter reporting list 780.

Once the parameter reporting list 780 is generated, the one or more processors are further configured to receive sensor data from one or more sensors (e.g., engine sensors, aircraft sensors, etc.). Further, when the target condition(s) 716 are met or a predetermined recording time has not elapsed, the one or more processors are configured to record parameter values for the one or more selected parameters 718 in the generated parameter reporting list 780 based at least in part on the received sensor data and in accordance with their respective parameter settings. The one or more processors can generate, by executing the reporting software 790, a recorded data file that includes the parameter values recorded for the one or more selected parameters in the generated parameter reporting list 780. The one or more processors can also provide the recorded data file. For instance, the one or more processors can cause a communication unit (e.g., the communication unit 125 of FIG. 1) to transmit at least a portion of the recorded data file to a remote station (e.g., the remote station 150 of FIG. 1). The remote station can be a ground station or a second vehicle, for example. The recorded data file can be transmitted to a remote station during the same flight or engine operating cycle in which the data communication was received or at a later time, e.g., when the aircraft 110 is parked.

Figure 23:
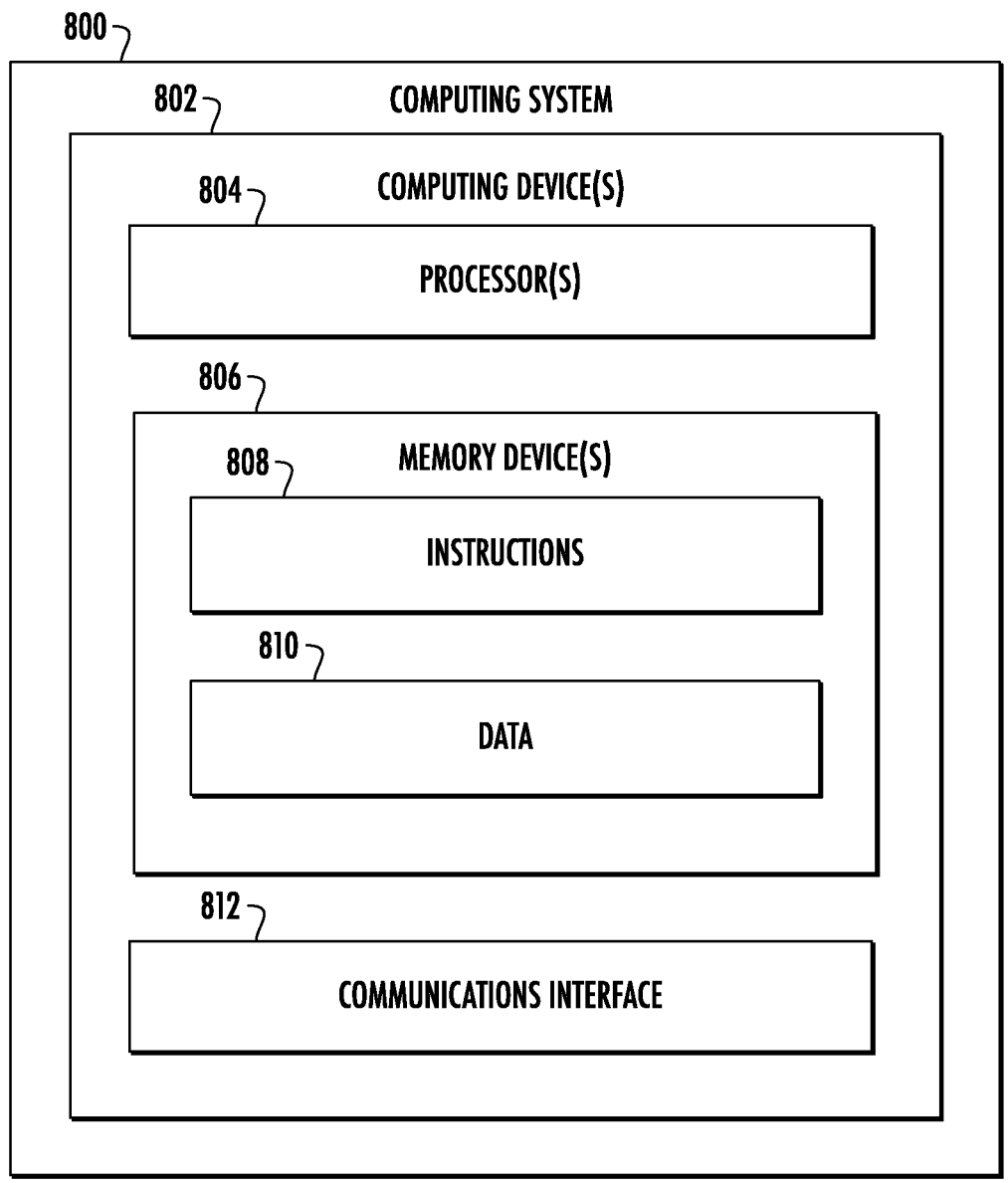
FIG. 23 provides a schematic view of a computing system for implementing one or more aspects of the present disclosure according to example embodiments of the present disclosure.

FIG. 23 provides a block diagram of an example computing system 800 that can be used to implement methods and systems described herein according to example embodiments of the present disclosure. Computing system 800 is one example of a suitable computing system for implementing the controller/computing elements described herein. computing device(s) 118, ground computing device(s) 156, other onboard computing devices, computing units of the communication units 125, 126, and other computing devices and/or controllers noted herein can be constructed and operate in a similar manner as computing system 800.

As shown in FIG. 23, the computing system 800 can include one or more computing device(s) 802. The one or more computing device(s) 802 can include one or more processor(s) 804 and one or more memory device(s) 806. The one or more processor(s) 804 can include any suitable processing device, such as a microprocessor, microcontroller, integrated circuit, logic device, or other suitable processing device. The one or more memory device(s) 806 can include one or more computer-readable media, including, but not limited to, non-transitory computer-readable media, RAM, ROM, hard drives, flash drives, and other memory devices.

The one or more memory device(s) 806 can store information accessible by the one or more processor(s) 804, including computer-readable instructions 808 that can be executed by the one or more processor(s) 804. The instructions 808 can be any set of instructions that when executed by the one or more processor(s) 804, cause the one or more processor(s) 804 to perform operations. The instructions 808 can be software written in any suitable programming language or can be implemented in hardware. In some embodiments, the instructions 808 can be executed by the one or more processor(s) 804 to cause the one or more processor(s) 804 to perform operations.

The memory device(s) 806 can further store data 810 that can be accessed by the processors 804. For example, the data 810 can include sensor data, a global list of FADEC parameters, model data, logic data, etc., as described herein. The data 810 can include one or more table(s), function(s), algorithm(s), model(s), equation(s), etc. according to example embodiments of the present disclosure.

The one or more computing device(s) 802 can also include a communication interface 812 used to communicate, for example, with the other components of system. The communication interface 812 can include any suitable components for interfacing with one or more network(s), including for example, transmitters, receivers, ports, controllers, antennas, or other suitable components.

Figure 24:
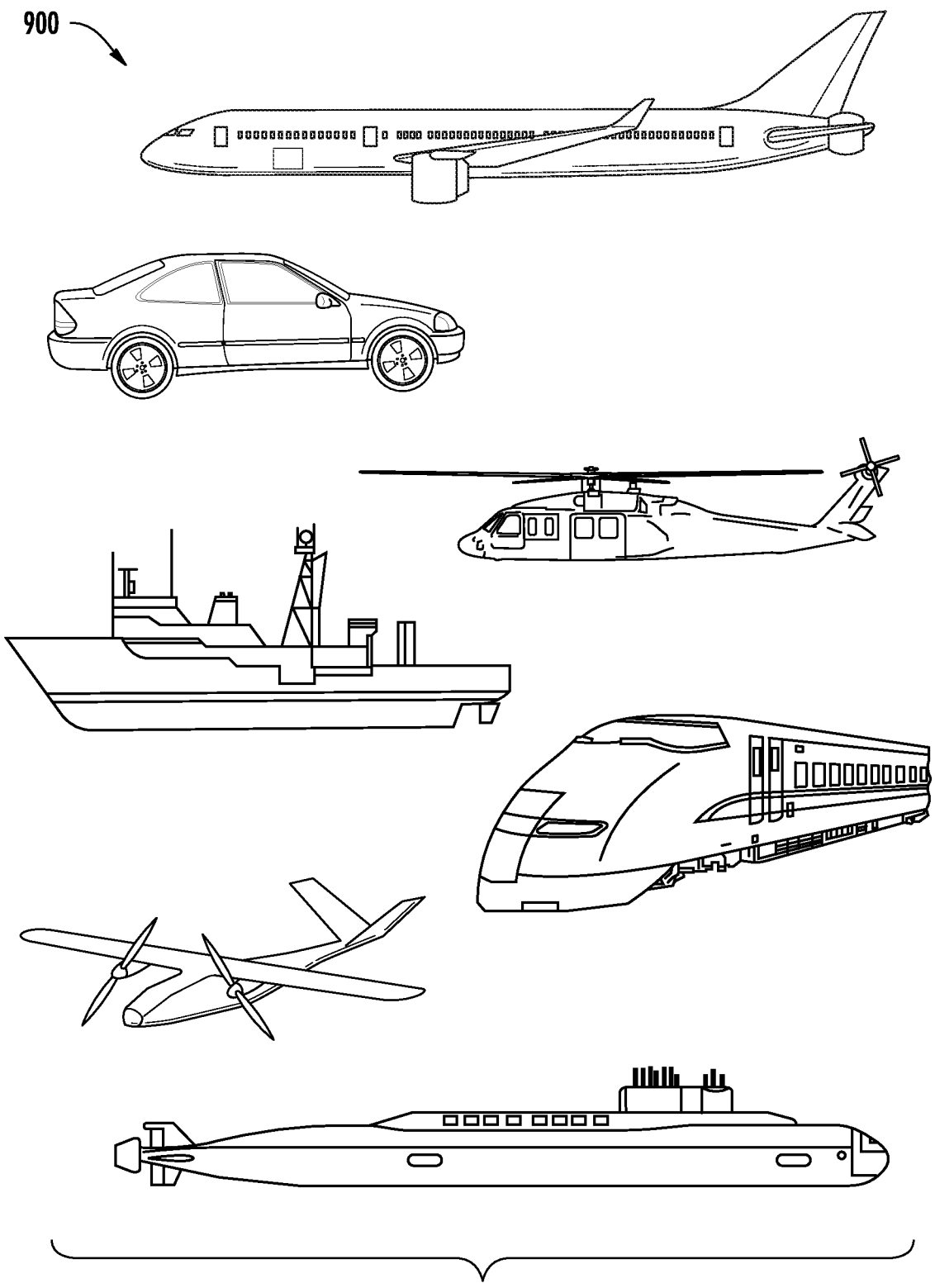
FIG. 24 provides example vehicles according to example embodiments of the present disclosure.

FIG. 24 provides example vehicles 900 according to example embodiments of the present disclosure. The systems and methods of the present disclosure can be implemented on an aircraft, helicopter, automobile, boat, submarine, amphibious vehicle, train, unmanned aerial vehicle or drone and/or on any other suitable vehicle, as well as stationary industrial turbines, e.g., for power generation. While the present disclosure is described herein with reference to an aircraft implementation, this is intended only to serve as an example and not to be limiting. One of ordinary skill in the art would understand that the systems and methods of the present disclosure can be implemented on other vehicles without deviating from the scope of the present disclosure.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of monitoring an engine of a propulsion system of a vehicle, the method comprising:
   starting, by a computing system comprising one or more processors, the engine of the propulsion system;
   outputting, by one or more sensors comprising at least one onboard vehicle sensor or an engine sensor, sensor data;
   receiving while the engine is operating, by the one or more processors of the computing system associated with the engine of the propulsion system of the vehicle, a data query containing a user-modifiable file uploaded from a remote station, the user-modifiable file including data indicating at least one of: a target condition and one or more selected parameters for which parameter values are to be recorded;

storing the user-modifiable file received from the remote station in a non-transitory computer readable medium;

in response to the starting of the engine and determining that the user-modifiable file is available, determining whether the target condition is met based on the sensor data outputted by the one or more sensors;

designating, by reporting software executed on at least one of the one or more processors, parameters to record without modifying the reporting software based on the one or more selected parameters accessed by the reporting software from the user-modifiable file, wherein the parameters to record include the one or more selected parameters;

mapping, by executing the reporting software, selected parameters to a corresponding parameter reporting list fixed within the reporting software; and generating, by executing the reporting software, at least one of: the corresponding parameter reporting list containing at least one of the parameters, a parameter setting mapped thereto, one or more baseline parameters, and one or more of the received one or more selected parameters, based on onboard vehicle sensor data from the one or more sensors, calculated values, or predicted values, without modifying the reporting software;

initiating, by executing the reporting software, recording of the parameter values of one or more parameters associated with the corresponding parameter reporting list in response to the target condition being met; and transmitting a recorded data file to the remote station, the recorded data file comprising the recorded parameter values.

2. The method of claim 1, further comprising:
receiving, by executing the reporting software, the sensor data from the one or more sensors of the vehicle;
determining, by the one or more processors, whether the target condition is met based at least in part on the received sensor data;
recording, by executing the reporting software, selected parameter values for the one or more selected parameters and baseline parameter values for the one or more baseline parameters in the generated corresponding parameter reporting list, based at least in part on the received sensor data, and the parameter setting mapped to the parameter; and
compiling, by executing the reporting software, the parameter values for the one or more selected parameters contained within the generated corresponding parameter reporting list, recorded selected parameter values and recorded baseline parameter values into a query response file.

3. The method of claim 2, further comprising: transmitting at least a portion of the query response file to the remote station.

4. The method of claim 2, wherein the parameter values are recorded by the computing system associated with the engine during a past time window to be compiled into the query response file when the target condition is met.

5. The method of claim 2, wherein the parameter values are recorded during operation of the propulsion system.

6. The method of claim 1, wherein the data query is received while the vehicle is performing a mission or while the vehicle is on ground.

7. The method of claim 1, wherein the one or more processors is located on the vehicle.

8. The method of claim 1, wherein the vehicle is an aerial vehicle.

9. The method of claim 1, further comprising:
generating, by the reporting software, a data file that includes the parameter values recorded for the one or more parameters;
providing, by the one or more processors of the computing system, the data file to a communication unit of the vehicle; and
transmitting, by the communication unit, at least a portion of the data file to the remote station.

10. A vehicle, comprising:
a propulsion system comprising at least one engine; one or more sensors comprising at least one onboard vehicle sensor or an engine sensor and configured to output sensor data;
a computing system associated with the at least one engine of the propulsion system, having one or more memory devices and one or more processors, the computing system configured to:
start the at least one engine;
receive a data query from a user-modifiable file uploaded from a remote station, the user-modifiable file including data indicating a target condition and one or more selected parameters for which parameter values are to be recorded when the target condition is met;
store the user-modifiable file received from the remote station in a non-transitory computer readable medium;
in response to the start of the at least one engine and a determination that the user-modifiable file is available, determine whether the target condition is met based on the sensor data outputted by the one or more sensors;
generate, by executing reporting software on at least one of the one or more processors, a parameter reporting list containing one or more baseline parameters and the one or more selected parameters based on at least one of: calculated values, predicted values, or the sensor data received from the one or more sensors, and based on the one or more selected parameters accessed by the reporting software from the user-modifiable file without modifying the reporting software;
initiate, by executing the reporting software, recording of the parameter values of one or more parameters associated with the parameter reporting list in response to the target condition being met; and
transmit a recorded data file to the remote station, the recorded data file comprising the recorded parameter values.

11. The vehicle of claim 10, wherein the computing system is further configured to:
receive the sensor data from the one or more sensors;
determine whether the target condition is met based at least in part on the received sensor data;
record, upon determining that the target condition is met, the parameter values for the one or more selected parameters and the one or more baseline parameters in the generated parameter reporting list based at least in part on the received sensor data.

12. The vehicle of claim 11, wherein the computing system is further configured to: compile, by executing the reporting software, the parameter values for the one or more selected parameters contained within the generated parameter reporting list, the recorded selected parameter values and the recorded baseline parameter values into a query response file.

13. The vehicle of claim 12, wherein the computing system is further configured to transmit at least a portion of the query response file to the remote station.

14. The vehicle of claim 12, wherein the parameter values are recorded by the computing system associated with the at least one engine within the vehicle during a past time window to be compiled into the query response file when the target condition is met.

15. The vehicle of claim 11, wherein the parameter values are recorded during operation of the propulsion system.

16. The vehicle of claim 10, wherein the data query is received while the vehicle is performing a mission.

17. The vehicle of claim 10, wherein the data query is received by the one or more processors located on the vehicle.

18. The vehicle of claim 10, wherein the vehicle is an aerial vehicle.

19. The vehicle of claim 10, wherein receipt of the data query occurs while the vehicle is on ground.

20. An engine of a propulsion system for a vehicle, comprising:
   one or more sensors positioned onboard the vehicle or the engine;
   an engine controller associated with the engine of the propulsion system and communicatively coupled with the one or more sensors, the engine controller having one or more memory devices and one or more processing devices, the one or more memory devices storing computer-readable reporting software executable by the one or more processing devices to perform operations, the engine controller configured to:
   start the engine;
   receive data from a user-modifiable file uploaded to the vehicle from a remote station received at the vehicle, the data containing a target condition and one or more selected parameters for which parameter values are to be recorded by the engine controller when the target condition is met;
   store the user-modifiable file received from the remote station in a non-transitory computer readable medium;
   generate, without modifying the computer-readable reporting software, a parameter reporting list containing the one or more selected parameters based on the one or more selected parameters accessed by the computer-readable reporting software from the user-modifiable file;
   receive sensor data from one or more sensors positioned onboard the vehicle; in response to the start of the engine and a determination that the user-modifiable file is available, determine whether the target condition is met based at least in part on the received sensor data;
   when the target condition is met, record the parameter values associated with the one or more selected parameters in the generated parameter reporting list; and
   transmit a recorded data file to the remote station, the recorded data file comprising the recorded parameter values.

* * * * *